US009660503B2

United States Patent
Koga et al.

(10) Patent No.: US 9,660,503 B2
(45) Date of Patent: May 23, 2017

(54) ROTATING ELECTRIC MACHINE INCLUDING A COOLING DEVICE FOR COOLING A FLUID IN THE ROTATING ELECTRIC MACHINE

(75) Inventors: Kiyonori Koga, Chiyoda-ku (JP); Masao Akiyoshi, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 303 days.

(21) Appl. No.: 14/397,317

(22) PCT Filed: Jul. 18, 2012

(86) PCT No.: PCT/JP2012/068152
§ 371 (c)(1),
(2), (4) Date: Oct. 27, 2014

(87) PCT Pub. No.: WO2014/013561
PCT Pub. Date: Jan. 23, 2014

(65) Prior Publication Data
US 2015/0115753 A1    Apr. 30, 2015

(51) Int. Cl.
*H02K 9/08* (2006.01)
*H02K 9/18* (2006.01)
(Continued)

(52) U.S. Cl.
CPC ............... *H02K 9/08* (2013.01); *H02K 9/12* (2013.01); *H02K 9/18* (2013.01); *H02K 9/19* (2013.01)

(58) Field of Classification Search
CPC .. H02K 9/08; H02K 9/00; H02K 9/06; H02K 9/12; H02K 9/19; H02K 5/18; H02K 5/20; H02K 1/20; H02K 1/32
(Continued)

(56) References Cited

U.S. PATENT DOCUMENTS 5,844,333 A    12/1998 Sheerin
2015/0069866 A1*    3/2015 Koga ..................... H02K 9/19
310/54

FOREIGN PATENT DOCUMENTS

JP    52-40321 Y1    9/1977
JP    57-42561 U    3/1982
(Continued)

OTHER PUBLICATIONS

International Search Report (PCT/ISA/210) mailed on Oct. 23, 2012, by the Japanese Patent Office as the International Searching Authority for International Application No. PCT/JP2012/068152.
(Continued)

*Primary Examiner* — Michael Andrews
(74) *Attorney, Agent, or Firm* — Buchanan Ingersoll & Rooney PC

(57) ABSTRACT

A cooling device mounted in the interior of a frame of a rotating electric machine is configured in such a manner that at least one of the end-face portions between a first end-face portion through which a cooling fluid flows into the cooling device and a second end-face portion from which the cooling fluid flows out thereof is placed tilting with respect to a minimum-width's direction of a frame's internal flow-path in vicinity to the cooling device, or with respect to at least one of an inflow direction and outflow direction of the cooling fluid.

19 Claims, 29 Drawing Sheets

(51) Int. Cl.
*H02K 9/12* (2006.01)
*H02K 9/19* (2006.01)

(58) Field of Classification Search
USPC .............................. 310/64, 65, 52–63, 60 A
See application file for complete search history.

(56) References Cited

FOREIGN PATENT DOCUMENTS

| JP | 61-117577 U | 7/1986 |
| JP | 6-22504 A | 1/1994 |
| JP | 6-339251 A | 12/1994 |
| JP | 2007-282366 A | 10/2007 |
| JP | 2009-148140 A | 7/2009 |

OTHER PUBLICATIONS

Extended European Search Report dated May 24, 2016, issued by the European Patent Office in the corresponding European Application No. 12881227.8. (6 pages).

* cited by examiner

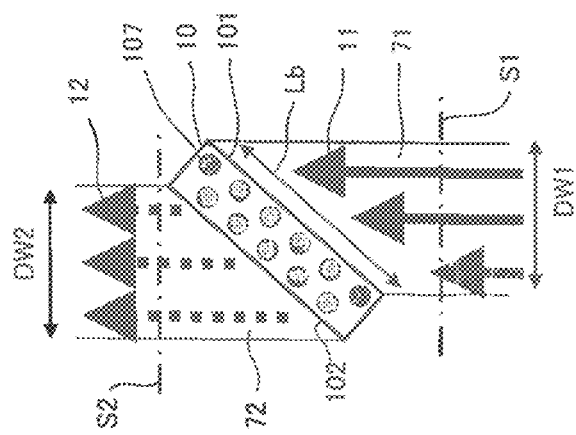
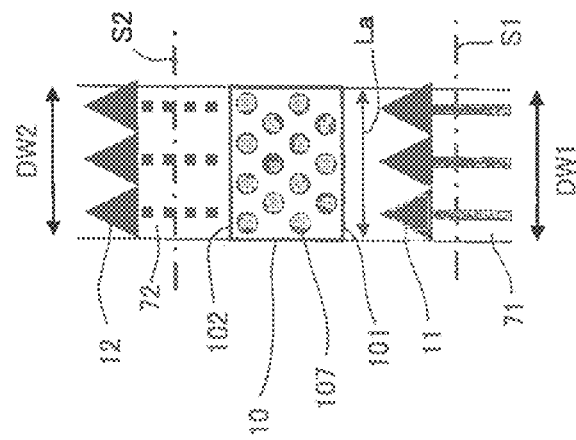

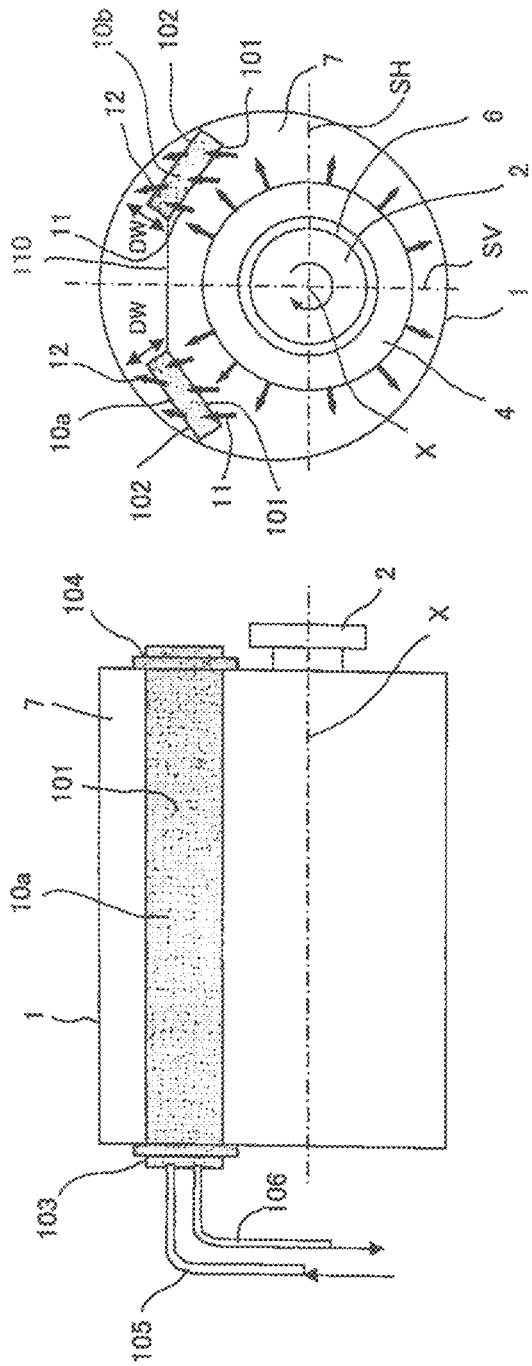

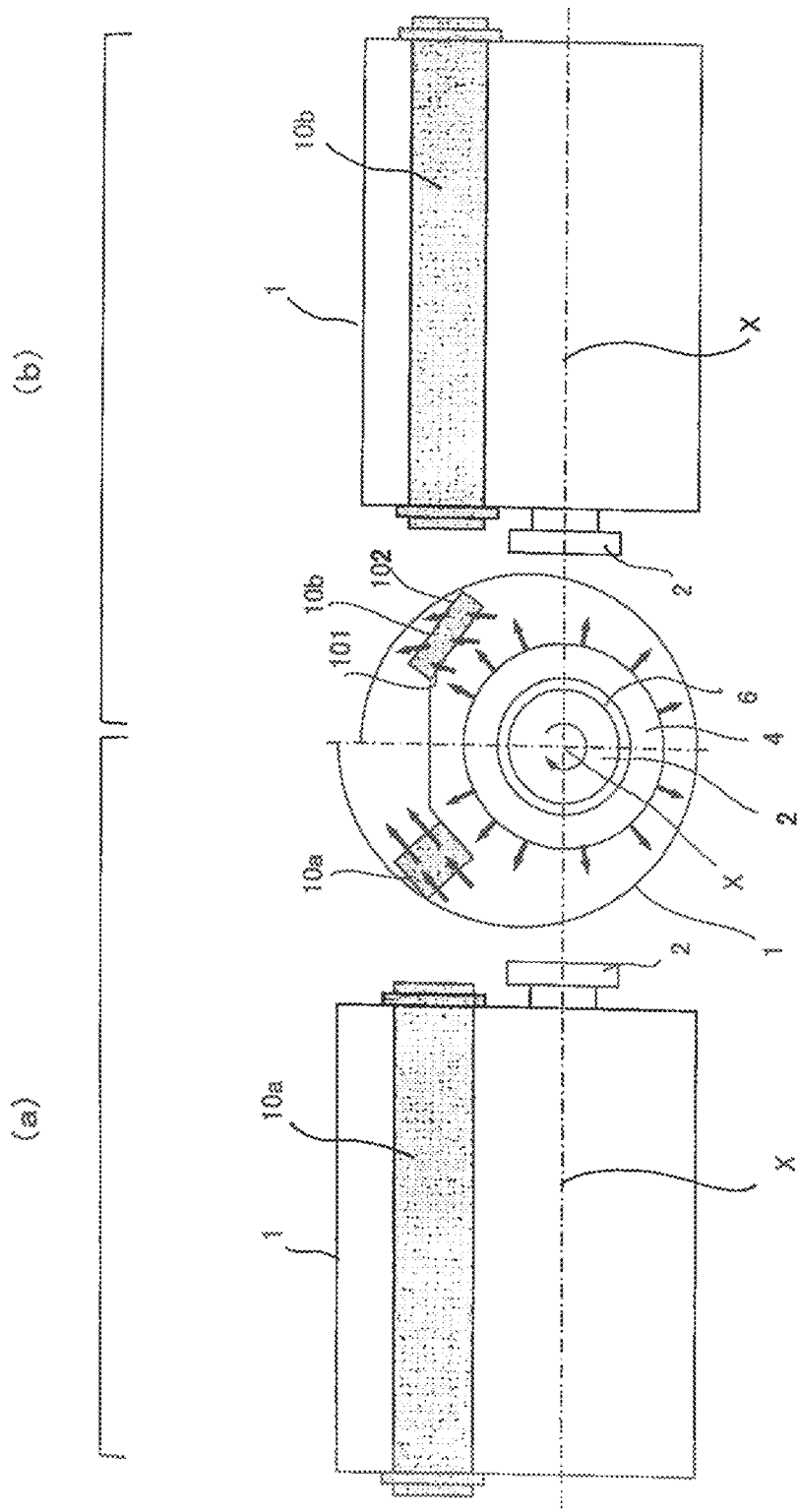

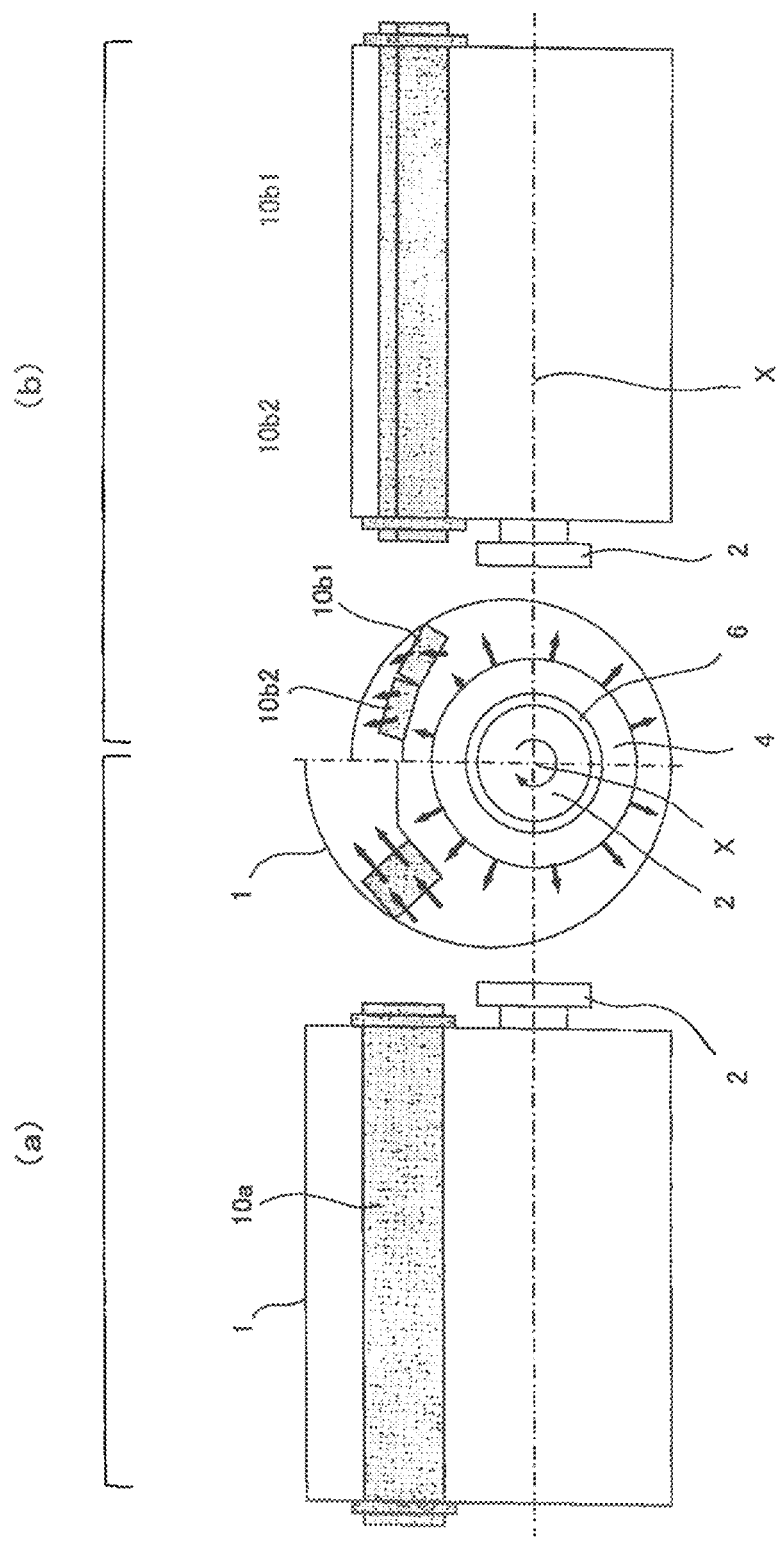

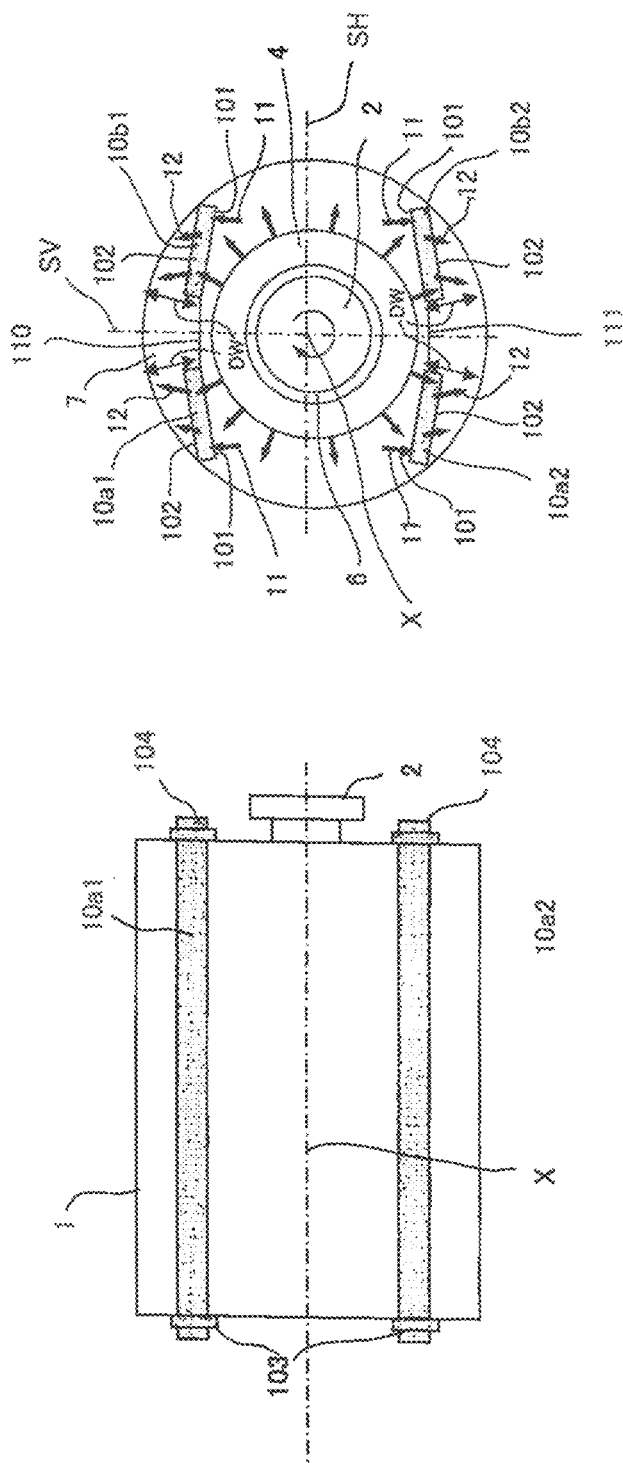

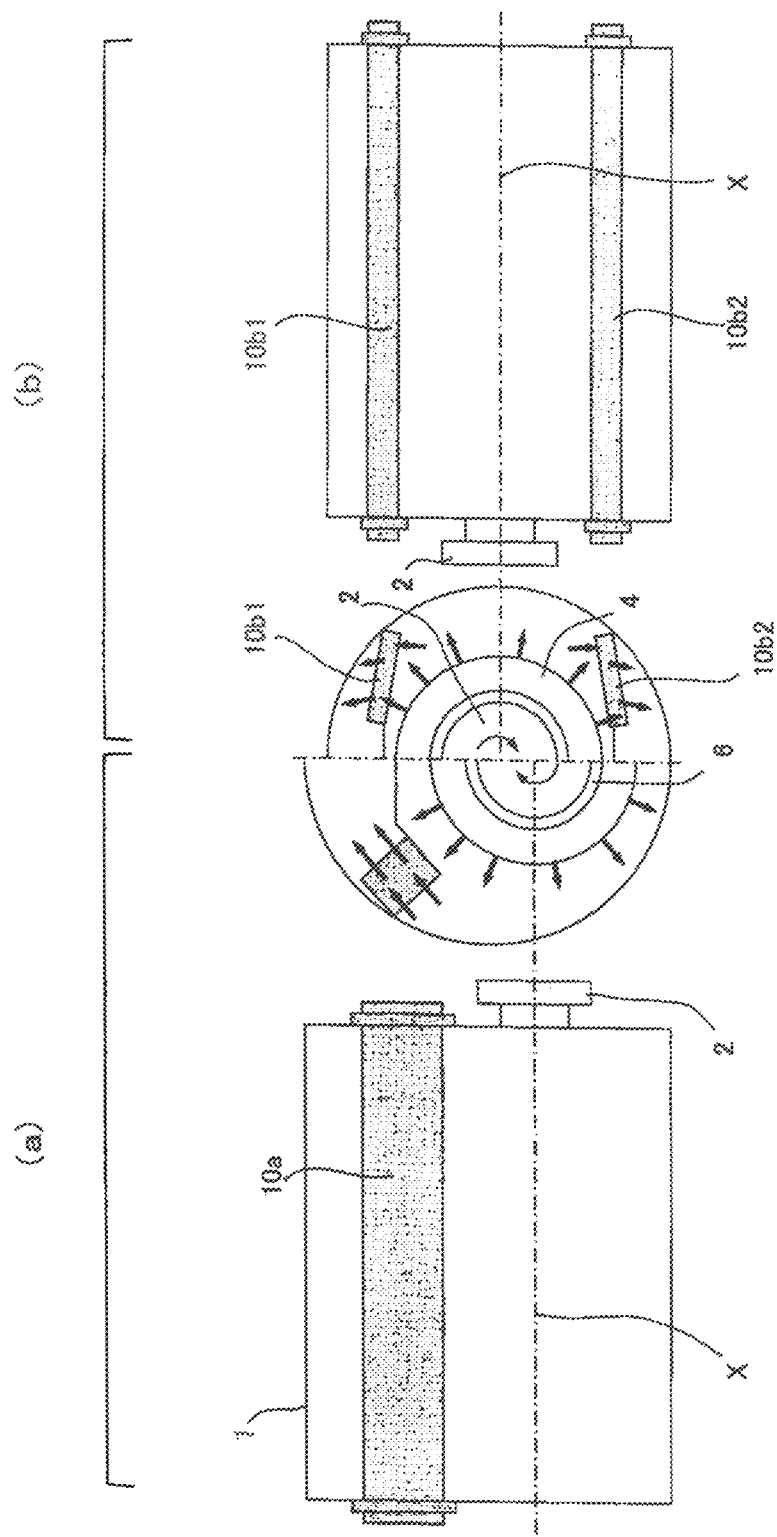

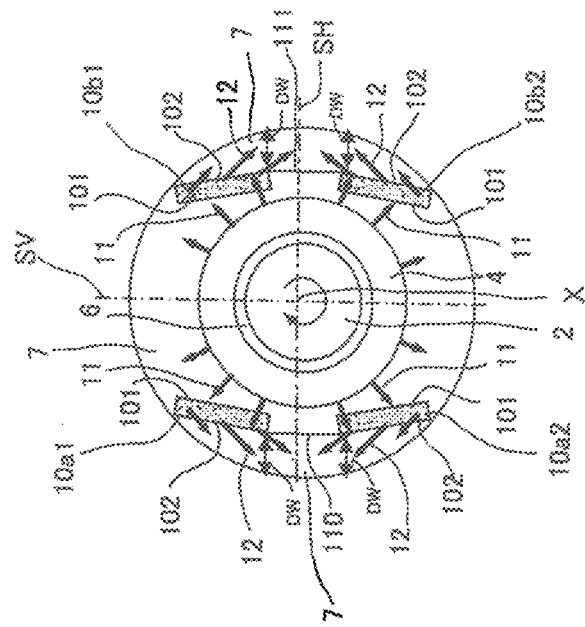
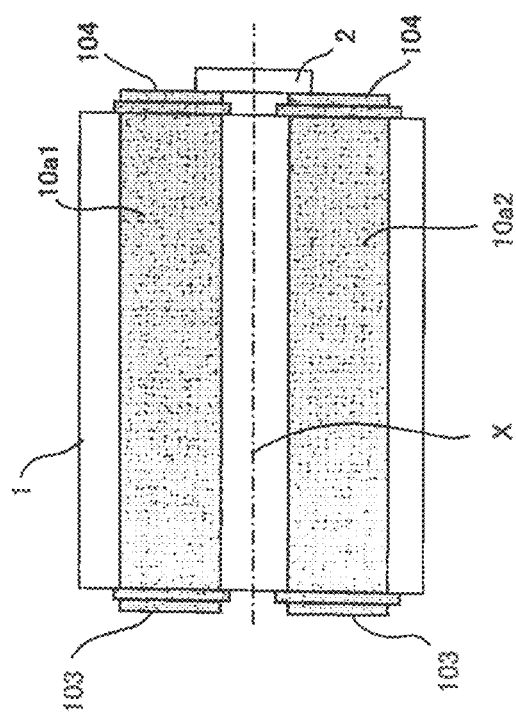

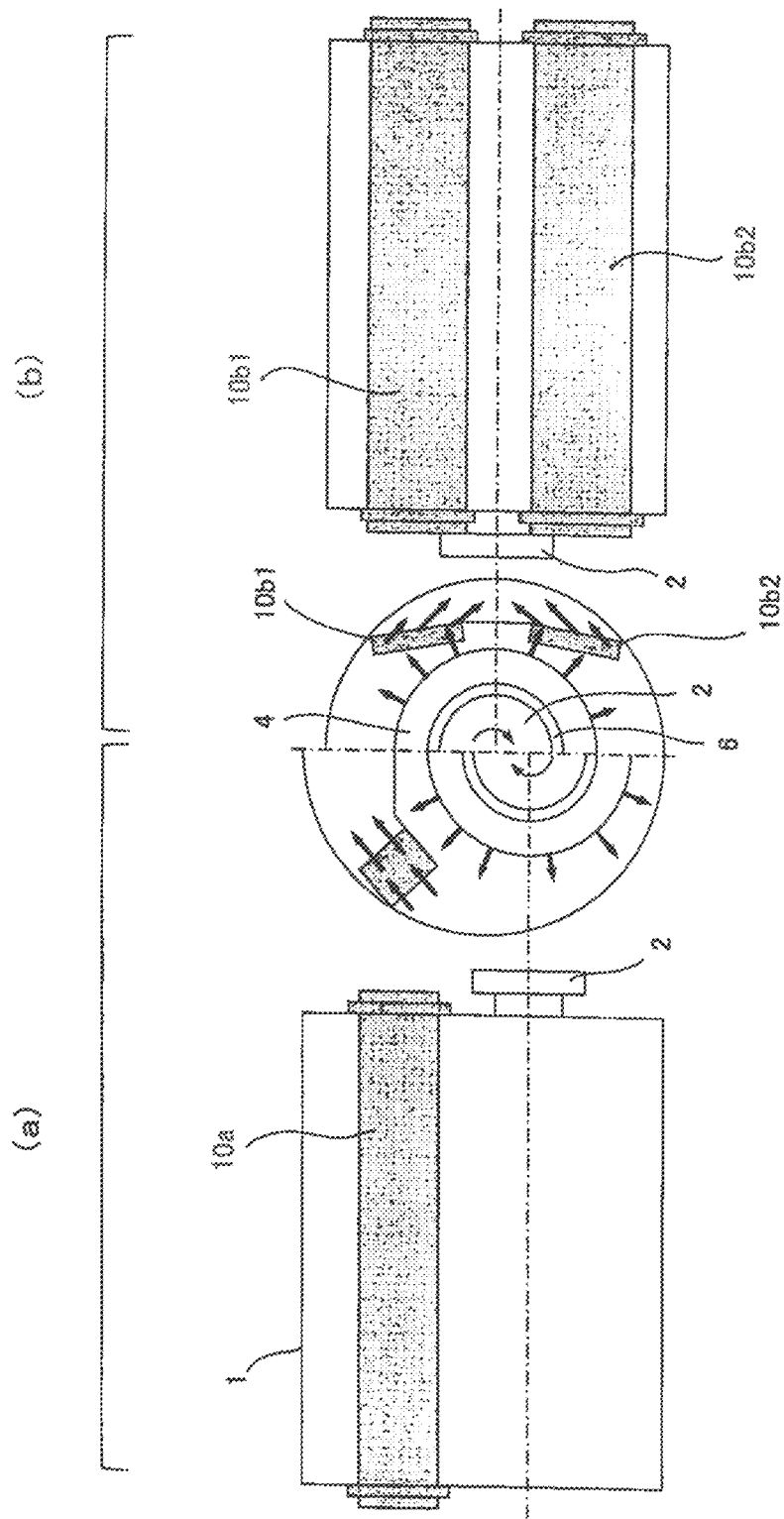

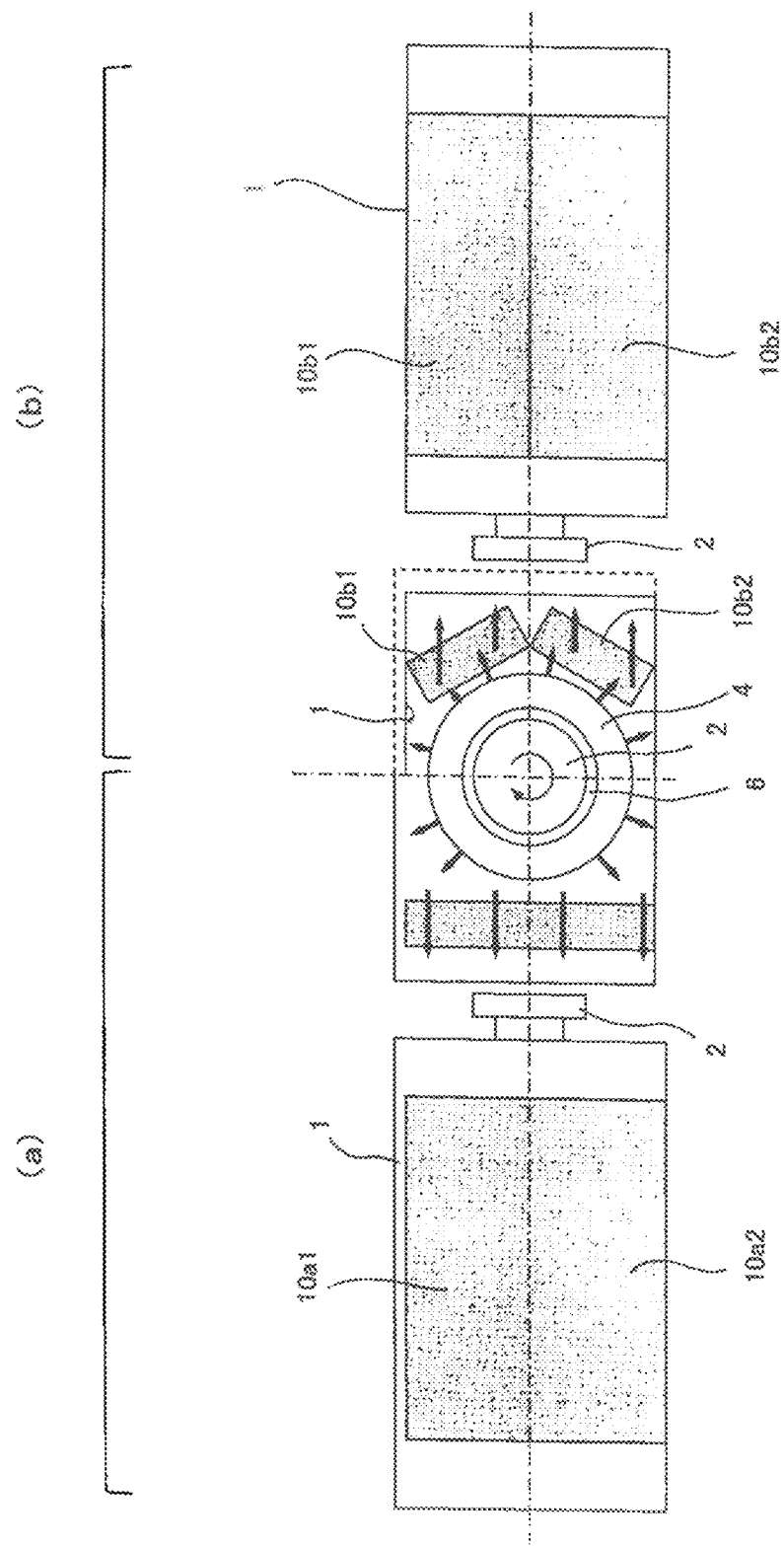

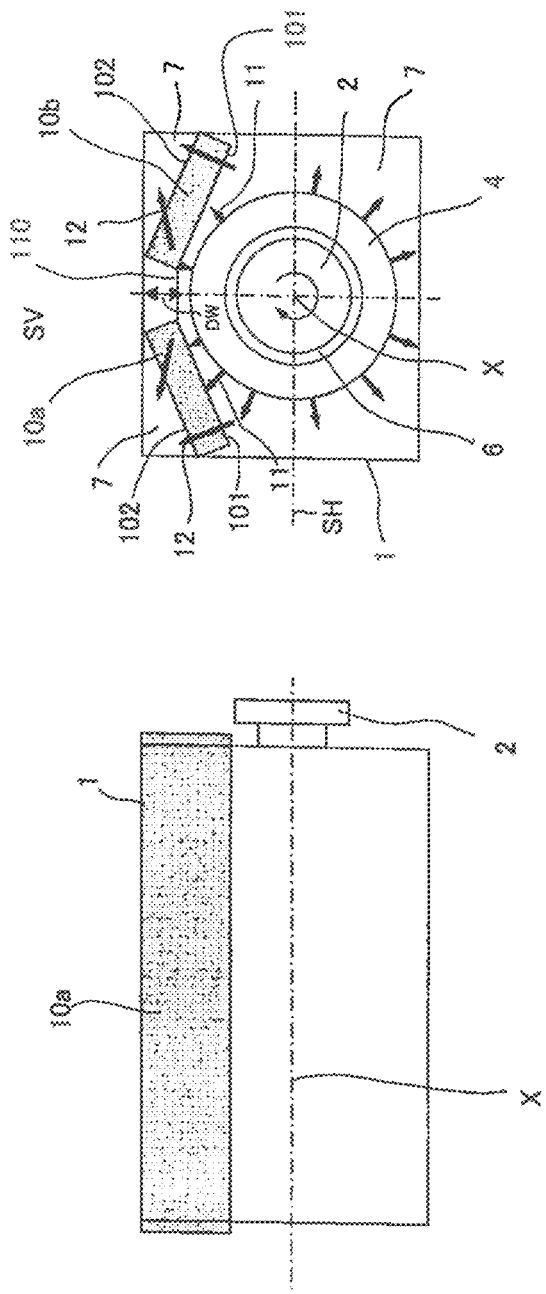

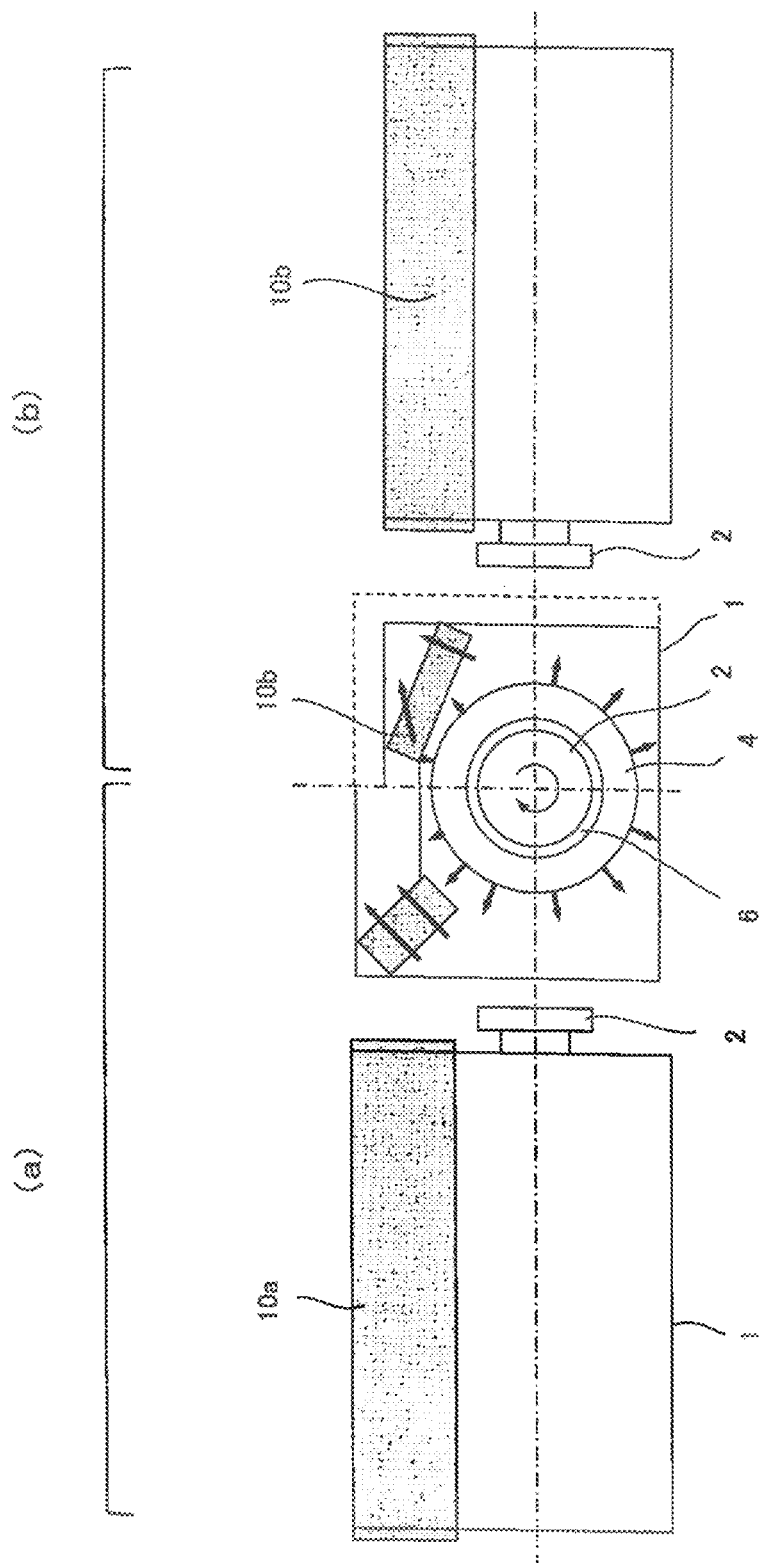

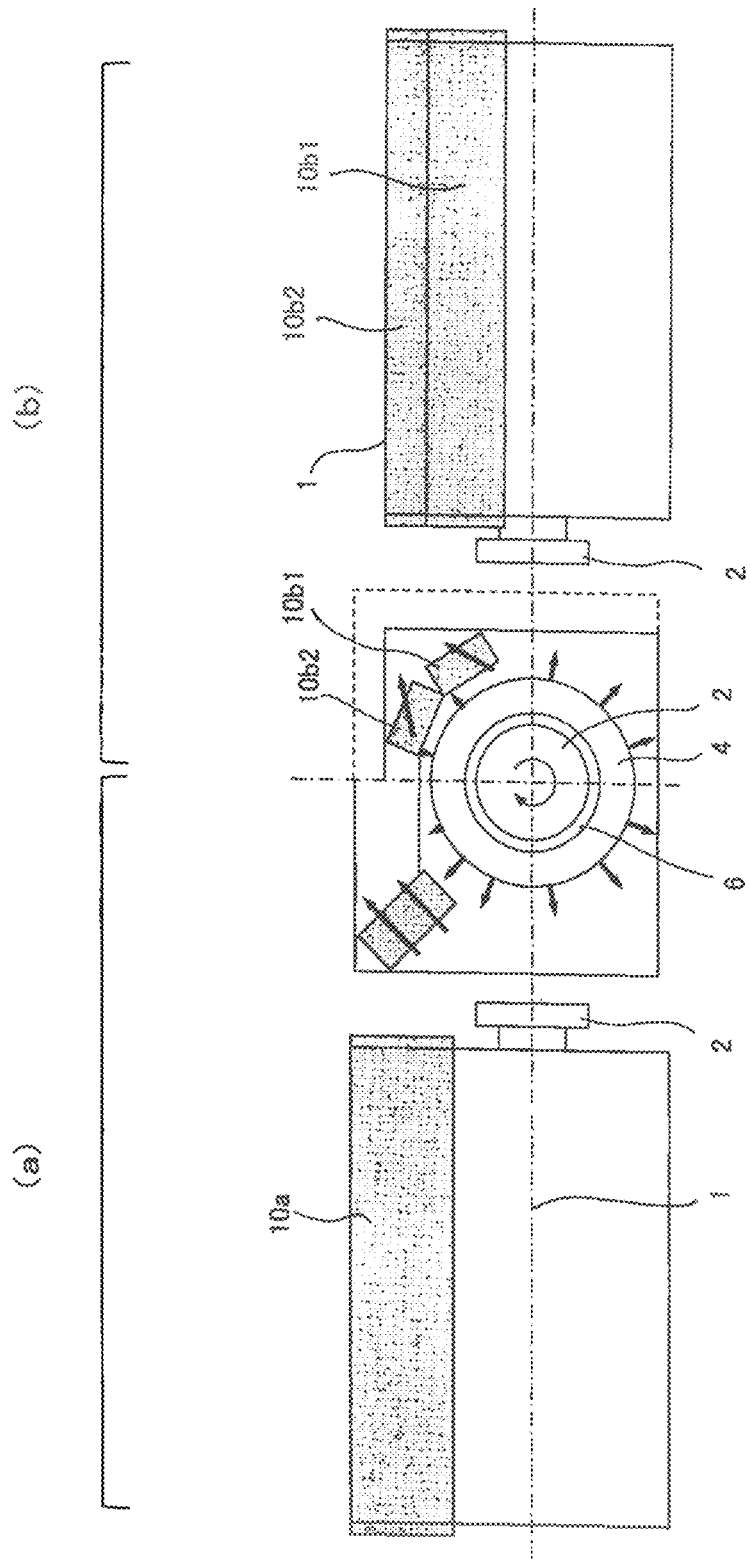

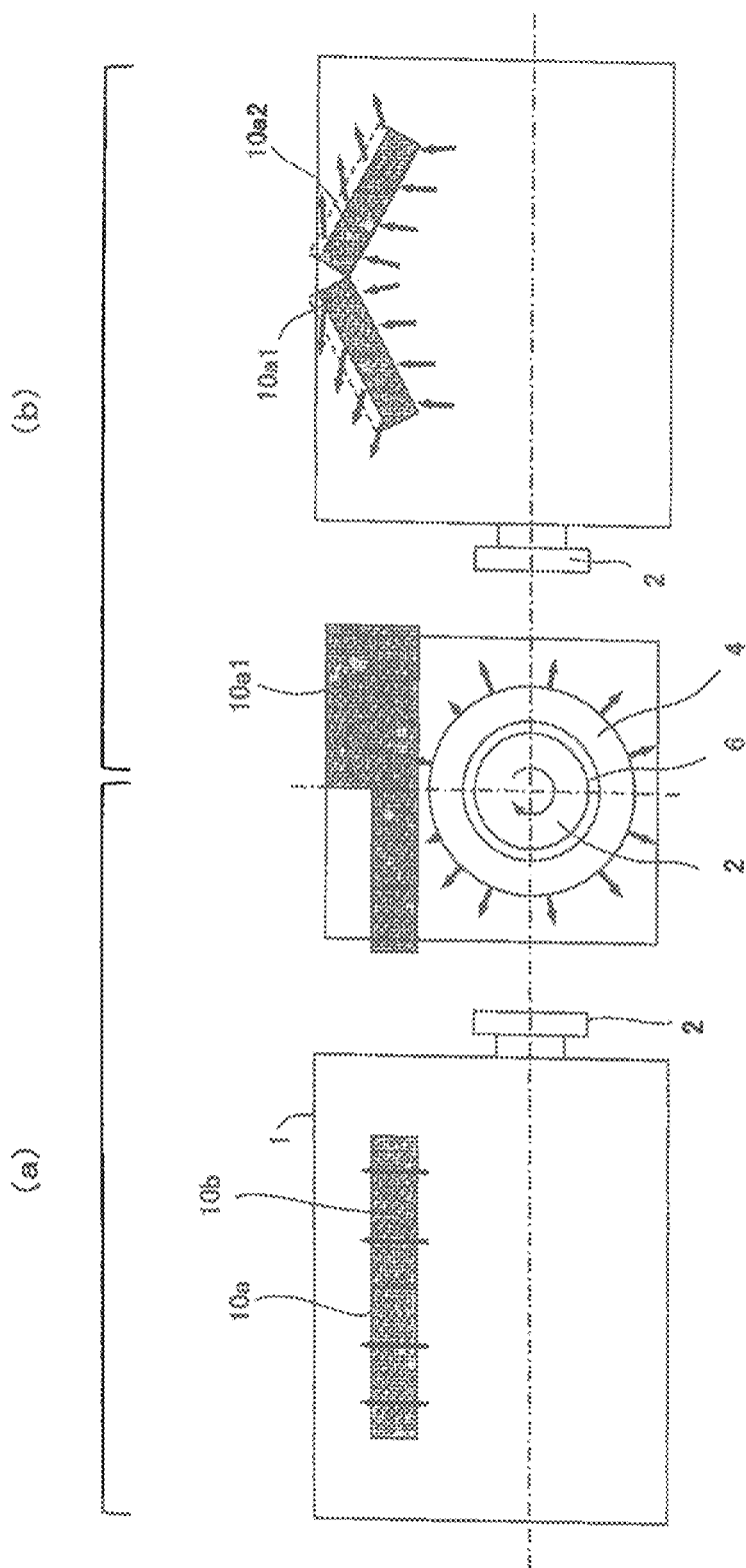

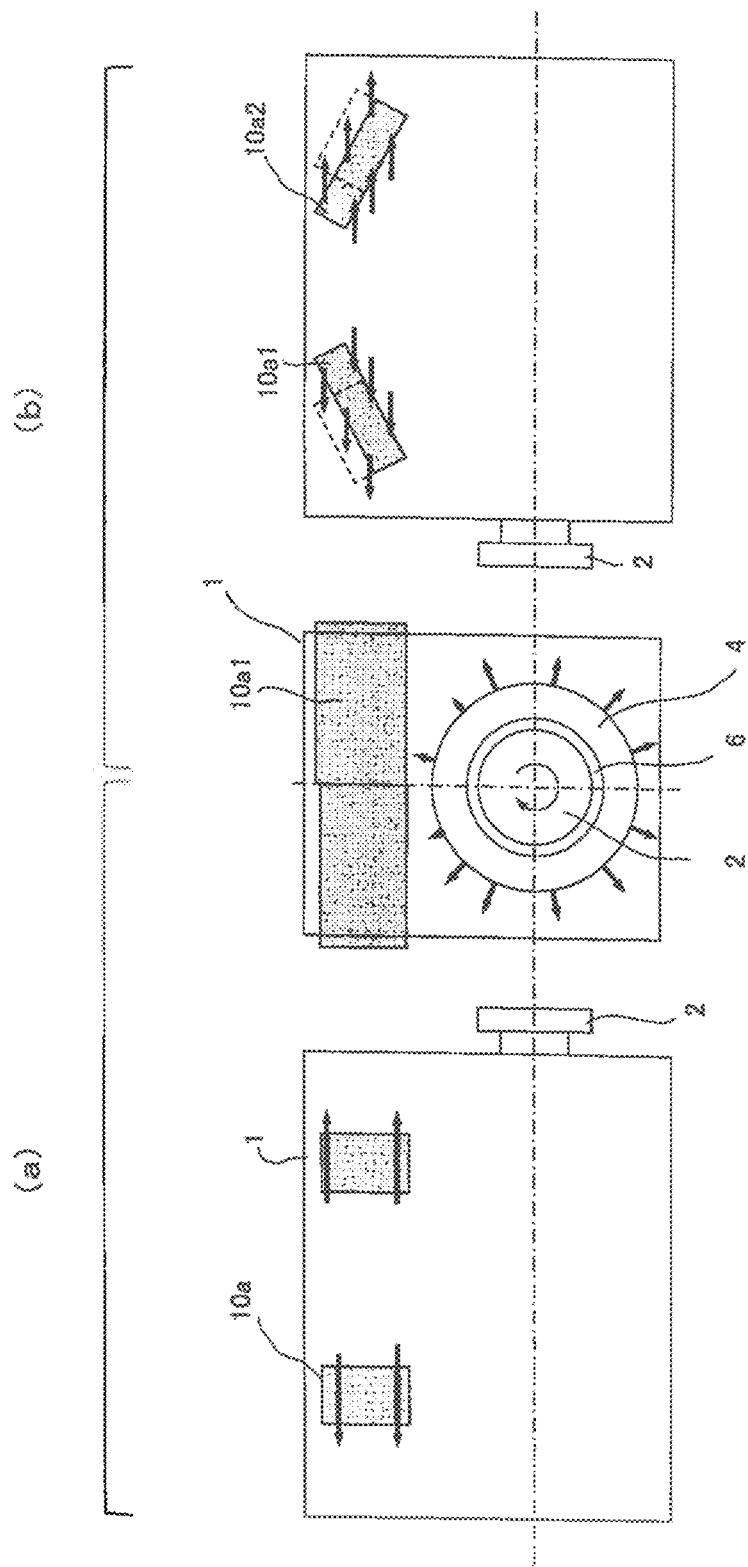

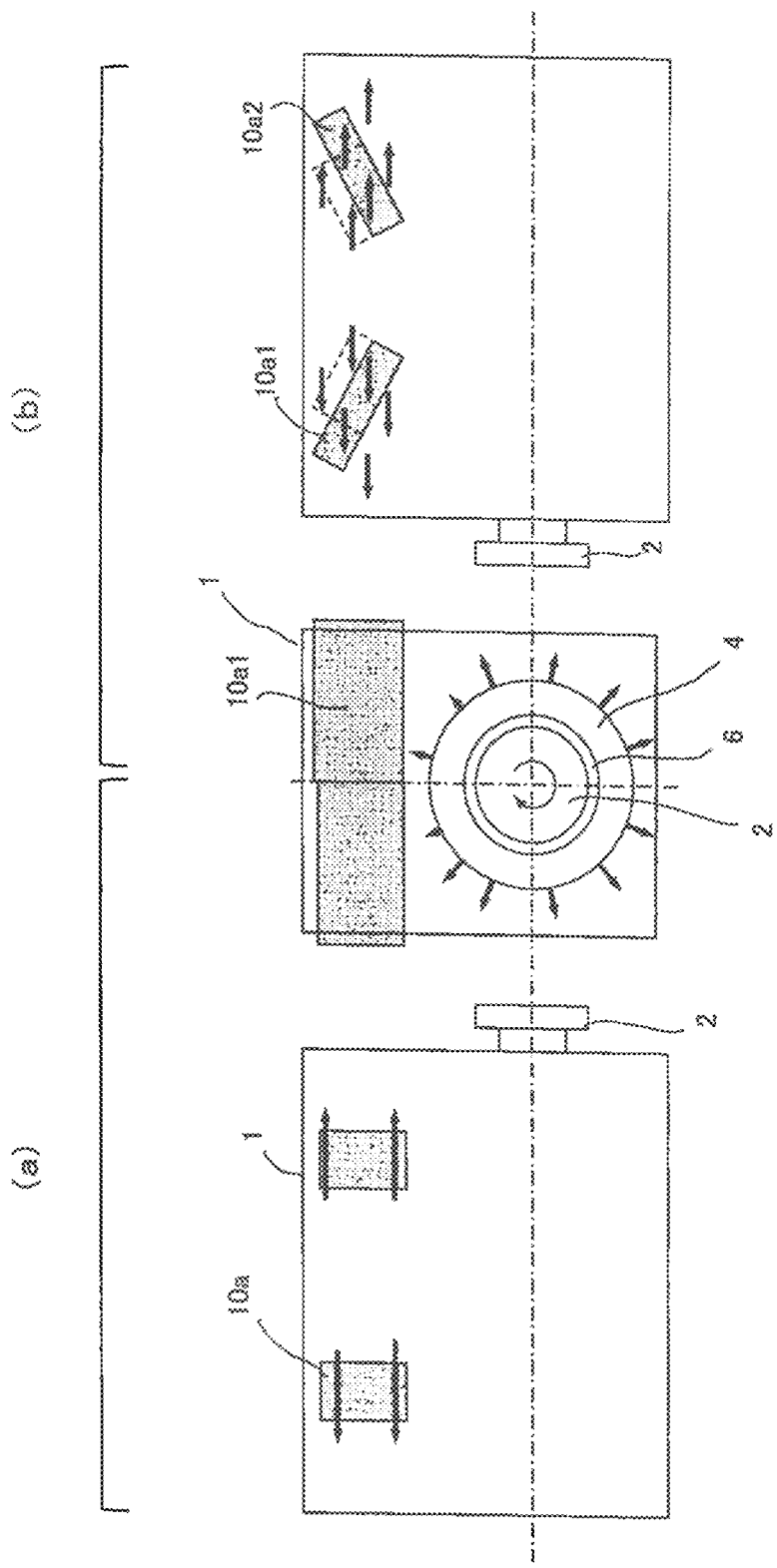

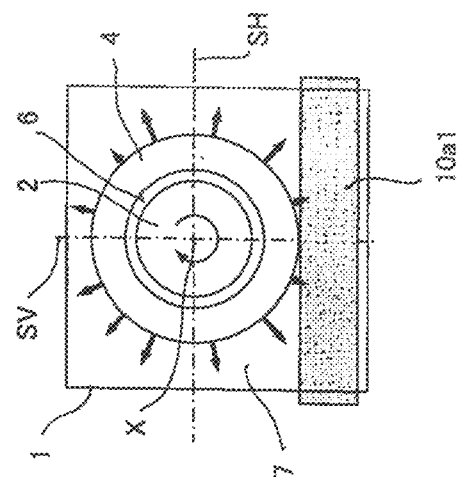
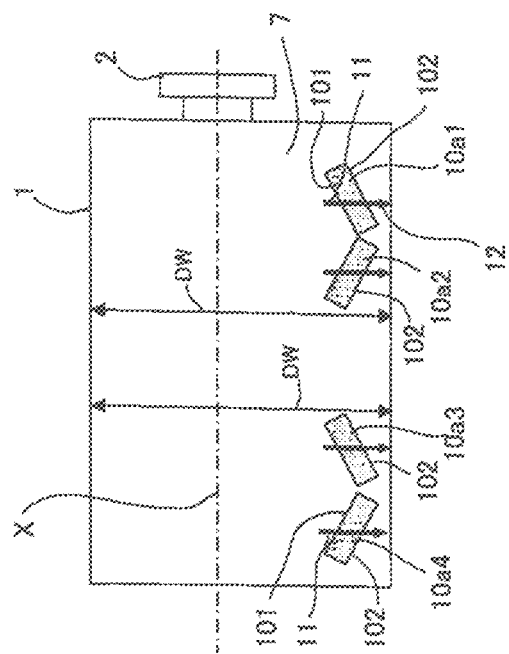

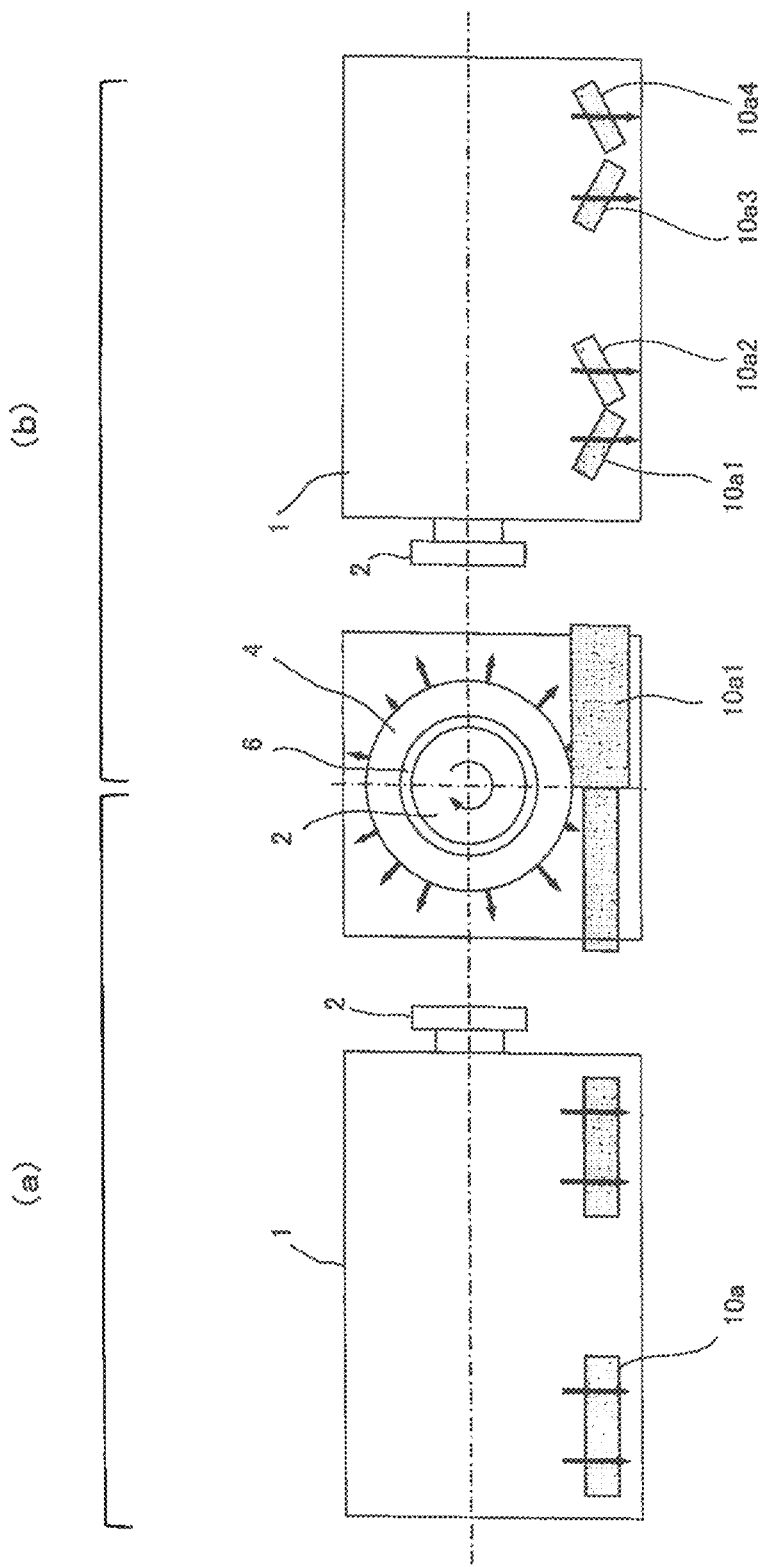

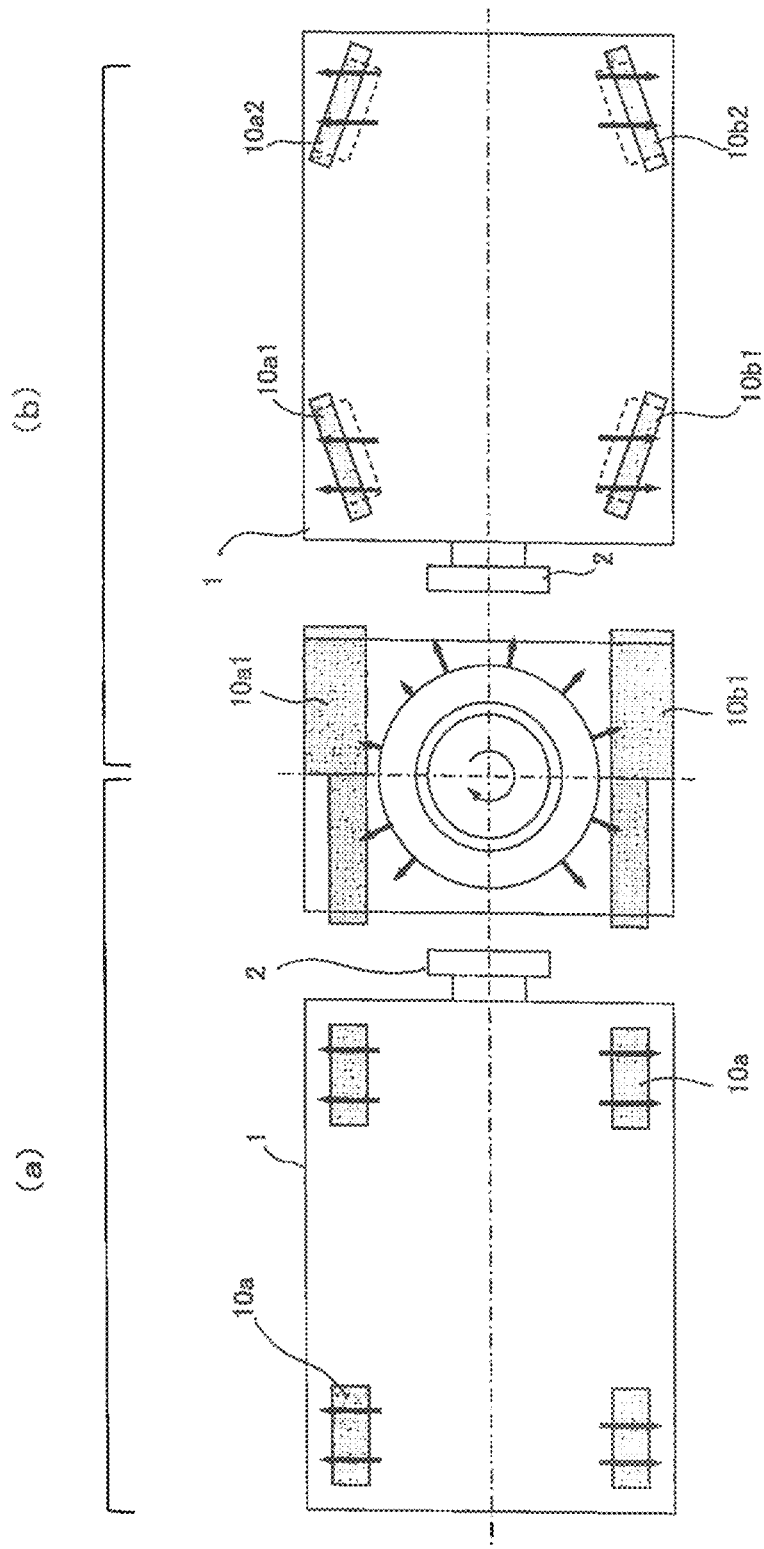

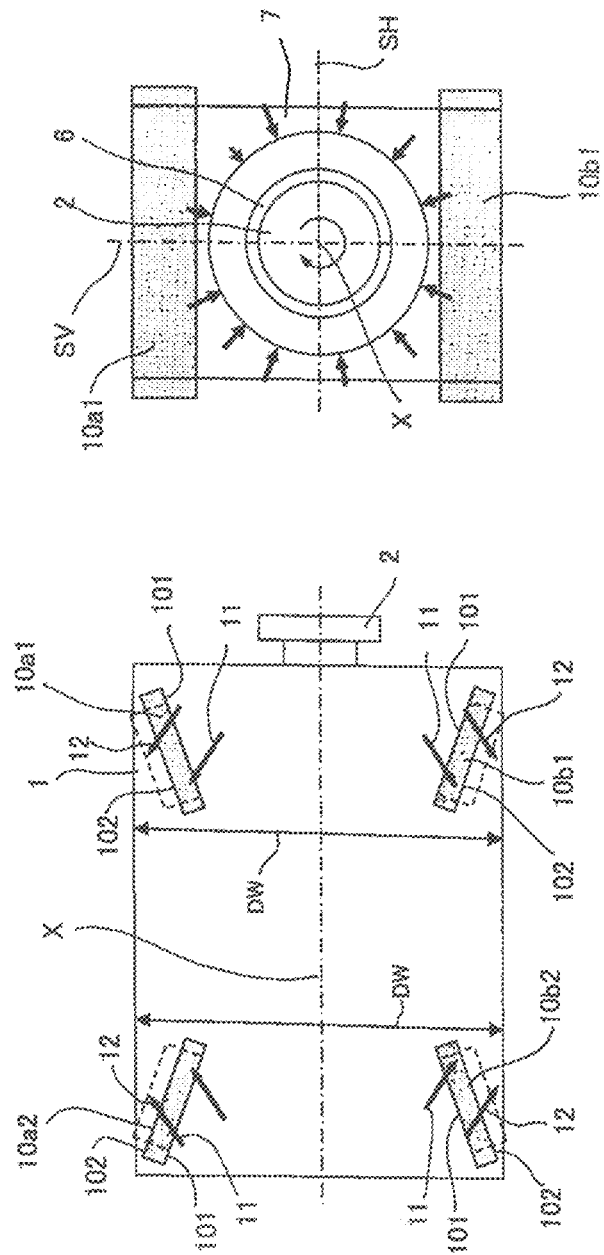

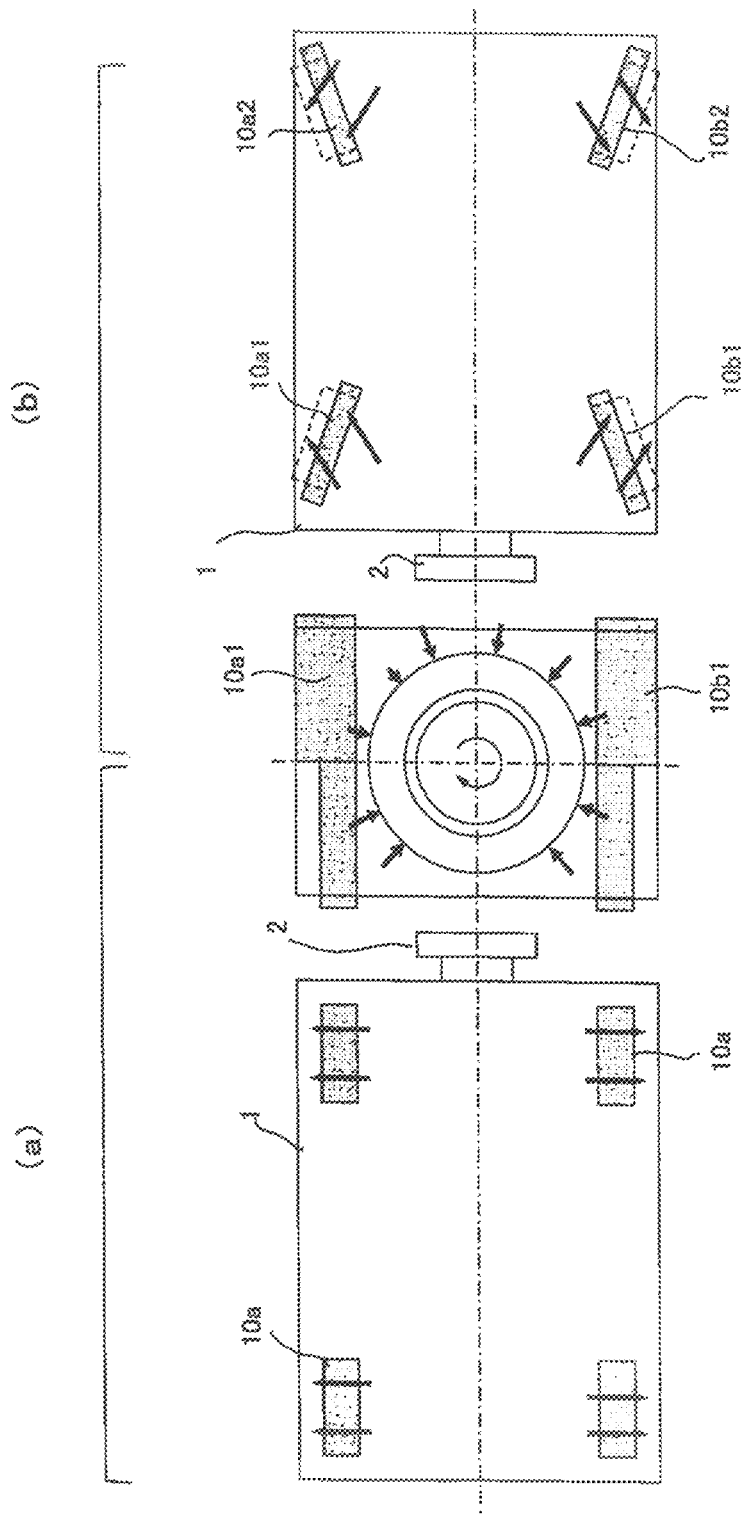

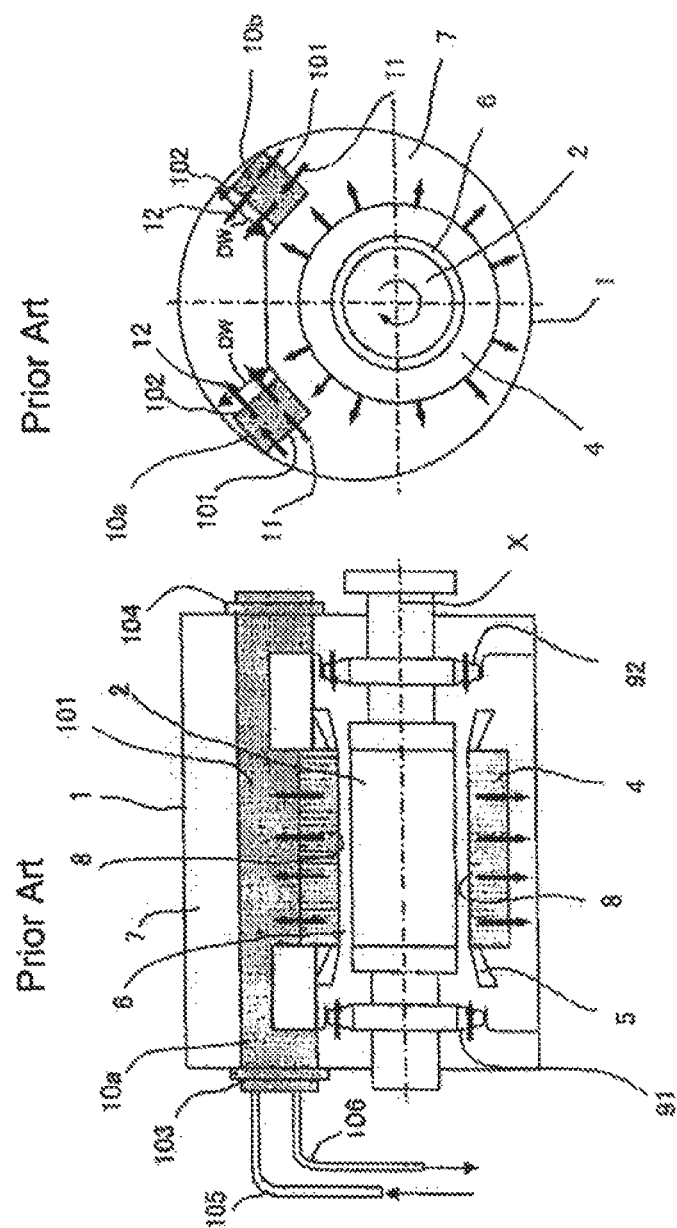

ROTATING ELECTRIC MACHINE INCLUDING A COOLING DEVICE FOR COOLING A FLUID IN THE ROTATING ELECTRIC MACHINE

TECHNICAL FIELD

The present invention relates to a rotating electric machine whose rotor and stator accommodated in the interior of its frame are cooled by a cooling fluid, and more particularly to a rotating electric machine which includes a cooling device in the interior of the frame to cool the cooling fluid.

BACKGROUND ART

A rotating electric machine is well known in which its rotor and stator are housed or accommodated in the interior of its frame, and these rotor and stator are arranged to be cooled by a cooling fluid such as a hydrogen gas or the like being pressurized and sealed in the interior of the frame, for example. Usually, in this kind of rotating electric machine, the cooling fluid in the interior of the frame is cooled by a cooling device(s) mounted in the frame's interior (for example, refer to Patent Document 1, Patent Document 2 and Patent Document 3).

FIG. 28(a) and FIG. 28(b) are configuration diagrams illustrating a conventional rotating electric machine as disclosed in Patent Document 1; FIG. 28(a) is the configuration diagram illustrating it by a vertical or longitudinal section, and FIG. 28(b) is the configuration diagram illustrating it by a cross section. In FIG. 28(a) and FIG. 28(b), a rotor 2 which is accommodated in the interior of a frame 1 cylindrically formed is supported to be rotationally movable by means of bearings (not shown in the figures). A stator 4 which is accommodated in the interior of the frame 1 includes a stator winding(s) 5. In an inside space portion of the stator 4, the rotor 2 is inserted, and an inner circumferential face of the stator 4 opposes to an outer circumferential face of the rotor 2 by means of a predetermined gap 6 therebetween.

The stator 4 includes a plurality of stator ducts 8 that extend in radial directions of the stator 4, and the gap 6 and a frame's internal flow-path 7 in the interior of the frame 1 are allowed to communicate with each other by way of the plurality of stator ducts 8. A pair of cooling fans 91 and 92 fixed on both end portions of the rotor 2 in an axial direction thereof is mounted to oppose to each other on both the end portions in the axial direction of the stator 4 and the rotor 2, and thus the cooling fluid is transported under pressure into the gap 6 in axial directions from both the end portions.

The cooling devices 10a and 10b mounted in the frame's internal flow-path 7 in the interior of the frame 1 are placed on both sides in upper portions of the stator 4 along a direction in which an axis line X of the stator 4 extends. Each of the cooling devices 10a and 10b includes a first end-face portion 101 through which a cooling fluid flows into the cooling device, and a second end-face portion 102 from which the cooling fluid that has been cooled is outflowed. The first end-face portion 101 and the second end-face portion 102 are placed in parallel with each other.

The cooling devices 10a and 10b each include a plurality of cooling pipes (not shown in the figures) which extend along the respective first end-face portion 101 and second end-face portion 102, connecting therebetween. Those cooling pipes are separated for outward paths and inward paths by means of a pair of headers 103 and 104, and connected in parallel with each other. A cooling medium such as a cooling water or the like flowed from an inflow pipe 105 into the header 103 arrives at the header 104 through a plurality of outward cooling pipes and returns to the header 103 through inward cooling pipes, and outflows from an outflow pipe 106 so as to be cooled by an external cooling-medium cooling apparatus (not shown in the figures).

As suitably shown in FIG. 28(b), the first end-face portion 101 of each of the cooling devices 10a and 10b is placed to be perpendicular to an inflow direction 11 of the cooling fluid. In addition, the second end-face portion 102 of each of the cooling devices 10a and 10b is placed to be perpendicular to an outflow direction 12 of the cooling fluid. Moreover, the first and second end-face portions 101 and 102 of each of the cooling devices 10a and 10b are placed to become parallel with a minimum-width's direction DW of the frame's internal flow-path 7 in vicinity to each of the cooling devices 10a and 10b.

In a conventional rotating electric machine configured as described above, the cooling fluid is transported under pressure by means of the rotating cooling fans 91 and 92, and flowed into the gap 6 from both end portions in axial directions of the stator 4 and the rotor 2. The cooling fluid being transported under pressure into the gap 6 flows through a plurality of stator ducts 8, and outflows into the frame's internal flow-path 7. The cooling fluid outflowed into the frame's internal flow-path 7 flows into each of the cooling devices 10a and 10b through their first end-face portions 101 so as to be cooled by them, and outflows from the second end-face portions 102 of the respective cooling devices 10a and 10b into the frame's internal flow-path 7. The cooling fluid outflowed from the second end-face portion 102 of each of the cooling devices 10a and 10b into the frame's internal flow-path 7 is for a second time transported under pressure by means of the cooling fans 91 and 92, and flowed into the gap 6 from both the end portions of the rotor 2 in axial directions thereof. By the cooling fluid that circulates in the interior of the frame 1 as described above, the rotor 2, the stator 4 and the stator winding(s) 5 are cooled.

FIG. 29 is a configuration diagram illustrating another conventional rotating electric machine. In the conventional rotating electric machine illustrated in FIG. 29, the cooling devices 10a and 10b are mounted on both respective side portions of the stator 4. Other constituent items and things are equivalent or similar to those in the conventional rotating electric machine of FIG. 28(a) and FIG. 28(b).

RELATED ART DOCUMENT

Patent Documents

[Patent Document 1] Japanese Laid-Open Patent Publication No. H06-339251
[Patent Document 2] Japanese Laid-Open Patent Publication No. 2007-282366
[Patent Document 3] Japanese Laid-Open Utility Model Publication No. S61-117577

SUMMARY OF THE INVENTION

Problems to be Solved by the Invention

A cooling device in a conventional rotating electric machine configured as described above is placed in such a manner that the end-face portions are set to be perpendicular to the inflow direction and outflow direction of the cooling fluid, so that, in order to increase heat exchange performance of the cooling device, it is required either to increase a frame's internal flow-path area of the cooling device by increasing the frame itself of the rotating electric machine so that an interspace between an inner face portion of the frame and an outer circumferential face of the stator is expanded, or to achieve an increase in volume by increasing a thickness-wise dimension of the cooling device. Moreover, the cooling device in a conventional rotating electric machine is placed in such a manner that the end-face portions are set to become parallel with a minimum-width's direction of the frame's internal flow-path in vicinity to the cooling device, so that, in order to increase the heat exchange performance of the cooling device, it is required either to increase a frame's internal flow-path area of the cooling device by increasing the frame itself of the rotating electric machine so that the interspace between the inner face portion of the frame and the outer circumferential face of the stator is expanded, or to achieve an increase in volume by increasing a thickness-wise dimension of the cooling device.

According to the above, the conventional rotating electric machine requires to make the cooling device large in size in order to enhance heat exchange performance of the cooling device, and as a result, there arises a problem in that the frame itself of the rotating electric machine also becomes large-sized. In addition, when the cooling device cannot be large-sized, there arises a problem in that the heat exchange performance of the cooling device is degraded.

The present invention has been directed at solving these problems in a conventional rotating electric machine described above, and an object of the invention is to provide a rotating electric machine that includes a cooling device(s) being smaller in size and lighter in weight, and also being capable of advancing sufficient heat exchange performance, and that is collectively smaller in size and lighter in weight.

Means for Solving the Problems

A feature resides in that a rotating electric machine according to the present invention is configured as described below.

Namely, the rotating electric machine comprises:
a rotor supported being rotationally movable;
a stator including an inner circumferential face opposing to an outer circumferential face of the rotor by means of a gap therebetween;
a frame accommodating in an interior thereof the rotor and the stator, and forming a frame's internal flow-path that covers at least a portion of an outer circumferential face of the stator; and
at least one cooling device placed in the frame's internal flow-path, for cooling a cooling fluid sealed in the frame's internal flow-path; the rotating electric machine is characterized in that
the at least one cooling device includes a first end-face portion through which the cooling fluid flows into the at least one cooling device, and a second end-face portion formed at a position opposing to the first end-face portion, for flowing the cooling fluid, being cooled, out of the at least one cooling device; and
at least one of the following first item (1) and second item (2) is included:
(1) between the first end-face portion and the second end-face portion, at least one of the end-face portions is placed tilting with respect to a minimum-width's direction of the frame's internal flow-path in vicinity to the at least one cooling device; and (2) between the first end-face portion and the second end-face portion, at least one of the end-face portions is placed tilting with respect to at least one of an inflow direction of the cooling fluid and an outflow direction of the cooling fluid.

Effects of the Invention

According to the rotating electric machine in the present invention, a cooling device placed in a frame's internal flow-path formed within an internal flow-path of the frame, for cooling a cooling fluid therewithin, comprises a first end-face portion through which the cooling fluid flows into the cooling device, and a second end-face portion formed at a position opposing to the first end-face portion, for flowing out of the cooling device the cooling fluid having been cooled; at least one of the end-face portions between the first end-face portion and the second end-face portion is placed tilting with respect to a minimum-width's direction of the frame's internal flow-path in vicinity to the cooling device, or with respect to at least one of an inflow direction of the cooling fluid and an outflow direction of the cooling fluid, so that a frame's internal flow-path area of the cooling device can be increased even when the frame's internal flow-path does not have a sufficient size, and the cooling device can be made smaller in size and lighter in weight, and also made capable of advancing sufficient heat exchange performance; and it is possible to obtain the rotating electric machine that is collectively smaller in size and lighter in weight.

BRIEF DESCRIPTION OF DRAWINGS

FIG. 1(a) and FIG. 1(b) are conceptual diagrams outlining, in contrast to a cooling device of a conventional rotating electric machine, a cooling device of a rotating electric machine according to the present invention, respectively;

FIG. 2(a) and FIG. 2(b) are configuration diagrams illustrating a rotating electric machine according to Embodiment 1 of the present invention;

FIG. 3 is an illustrative diagram for explaining the rotating electric machine according to Embodiment 1 of the present invention, in contrast to a conventional rotating electric machine;

FIG. 5 is an illustrative diagram for explaining the rotating electric machine according to Embodiment 2 of the present invention, in contrast to a conventional rotating electric machine;

FIG. 6(a) and FIG. 6(b) are configuration diagrams illustrating a rotating electric machine according to Embodiment 3 of the present invention;

FIG. 7 is an illustrative diagram for explaining the rotating electric machine according to Embodiment 3 of the present invention, in contrast to a conventional rotating electric machine;

FIG. 8(a) and FIG. 8(b) are configuration diagrams illustrating a rotating electric machine according to Embodiment 4 of the present invention;

FIG. 9 is an illustrative diagram for explaining the rotating electric machine according to Embodiment 4 of the present invention, in contrast to a conventional rotating electric machine;

FIG. 11 is an illustrative diagram for explaining the rotating electric machine according to Embodiment 5 of the present invention, in contrast to a conventional rotating electric machine;

FIG. 12(a) and FIG. 12(b) are configuration diagrams illustrating a rotating electric machine according to Embodiment 6 of the present invention;

FIG. 13 is an illustrative diagram for explaining the rotating electric machine according to Embodiment 6 of the present invention, in contrast to a conventional rotating electric machine;

FIG. 15 is an illustrative diagram for explaining the rotating electric machine according to Embodiment 7 of the present invention, in contrast to a conventional rotating electric machine;

FIG. 17 is an illustrative diagram for explaining the rotating electric machine according to Embodiment 8 of the present invention, in contrast to a conventional rotating electric machine;

FIG. 19 is an illustrative diagram for explaining the rotating electric machine according to Embodiment 9 of the present invention, in contrast to a conventional rotating electric machine;

FIG. 21 is an illustrative diagram for explaining the rotating electric machine according to Embodiment 10 of the present invention, in contrast to a conventional rotating electric machine;

FIG. 22(a) and FIG. 22(b) are configuration diagrams illustrating a rotating electric machine according to Embodiment 11 of the present invention;

FIG. 23 is an illustrative diagram for explaining the rotating electric machine according to Embodiment 11 of the present invention, in contrast to a conventional rotating electric machine;

FIG. 25 is an illustrative diagram for explaining the rotating electric machine according to Embodiment 12 of the present invention, in contrast to a conventional rotating electric machine;

FIG. 26(a) and FIG. 26(b) are configuration diagrams illustrating a rotating electric machine according to Embodiment 13 of the present invention;

FIG. 27 is an illustrative diagram for explaining the rotating electric machine according to Embodiment 13 of the present invention, in contrast to a conventional rotating electric machine;

FIG. 28(a) and FIG. 28(b) are configuration diagrams illustrating a conventional rotating electric machine.

EMBODIMENTS FOR CARRYING OUT THE INVENTION

Figure 4A:
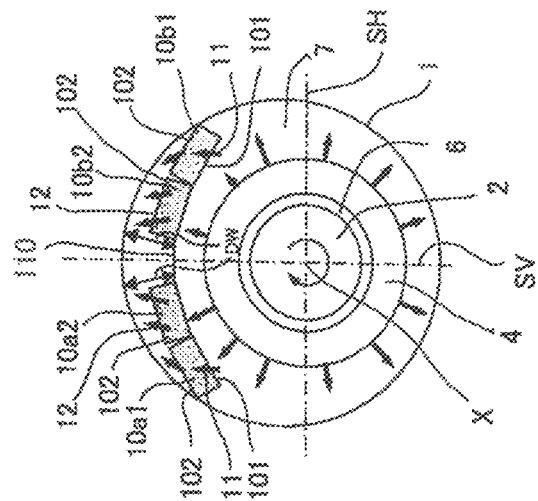
FIG. 4(a) and FIG. 4(b) are configuration diagrams illustrating a rotating electric machine according to Embodiment 2 of the present invention.

First, the explanation will be made for a basic configuration of a cooling device of a rotating electric machine according to the present invention. FIG. 1(a) and FIG. 1(b) are conceptual diagrams outlining, in contrast to a cooling device of a conventional rotating electric machine, a cooling device of the rotating electric machine according to the present invention, respectively; FIG. 1(a) is the cooling device of the conventional rotating electric machine, and FIG. 1(b) is the cooling device of the rotating electric machine according to the present invention. In the cooling device 10 of the conventional rotating electric machine shown in FIG. 1(a), the first end-face portion 101 is placed to be perpendicular to an inflow direction 11 of the cooling fluid that is a high temperature gas. In other words, the first end-face portion 101 is placed in parallel with a first orthogonal surface S1 which is perpendicular to the inflow direction 11 of the cooling fluid. In addition, the second end-face portion 102 is placed to be perpendicular to an outflow direction 12 of the cooling fluid that is a low temperature gas having been cooled. In other words, the second end-face portion 102 is placed in parallel with a second orthogonal surface S2 which is perpendicular to the outflow direction 12 of the cooling fluid. Moreover, in the cooling device 10 of the conventional rotating electric machine shown in FIG. 1(a), the first end-face portion 101 is placed, on a side into which the cooling fluid flows, in parallel with a minimum-width's direction DW1 of frame's internal flow-path 71, and the second end-face portion 102 is placed, on a side from which the cooling fluid outflows, in parallel with a minimum-width's direction DW2 of frame's internal flow-path 72.

For dealing therewith, in the cooling device 10 of the rotating electric machine according to the present invention shown in FIG. 1(b), the first end-face portion 101 is placed to be inclined or tilted with respect to an inflow direction 11 of the cooling fluid, and the second end-face portion 102 is placed to be inclined or tilted with respect to an outflow direction 12 of the cooling fluid. In other words, the first and second end-face portions 101 and 102 are placed to be inclined or tilted with respect to first and second orthogonal surfaces S1 and S2 which are perpendicular to the inflow direction 11 of the cooling fluid and outflow direction 12 thereof, respectively. Note that, the first end-face portion 101 and the second end-face portion 102 are formed at the positions to oppose to each other. In addition, in the cooling device 10 of the rotating electric machine according to the present invention shown in FIG. 1(b), the first end-face portion 101 is placed, on a side into which the cooling fluid flows, to be inclined or tilted with respect to a minimum-width's direction DW1 of frame's internal flow-path 71, and the second end-face portion 102 is placed, on a side from which the cooling fluid outflows, to be inclined or tilted with respect to a minimum-width's direction DW2 of frame's internal flow-path 72. Note that, it may also be possible that the first and second end-face portions 101 and 102 are placed in perpendicular, i.e., tilting to a maximum angle, with respect to the minimum-width's directions DW1 and DW2 of the frame's internal flow-paths, respectively. In order to miniaturize the cooling device 10, it is desirable that the first end-face portion 101 and the second end-face portion 102 are set in parallel with each other; however, it may also be possible to set them not in parallel with each other due to a relationship of a space or the like to mount the cooling device 10. Note that, the frame's internal flow-paths 71 and 72 are formed by internal spaces in the frame 1 as will be described later.

In a case of the cooling device 10 of the conventional rotating electric machine shown in FIG. 1(a), a vertical dimension La of each of the first end-face portion 101 and the second end-face portion 102 is equal to a vertical dimension DW1 of the frame's internal flow-path 71 on a side in which the cooling fluid flows into the cooling device, and to a vertical dimension DW2 (=DW1) of the frame's internal flow-path 72 on aside in which the cooling fluid outflows. An end-face portion area "A" in this conventional cooling device 10 is given: "A"=Vertical dimension of end-face portion La×Horizontal dimension of end-face portion (the dimension perpendicular to the paper; not shown in the figures).

Meanwhile, in a case of the cooling device 10 of the rotating electric machine according to the present invention shown in FIG. 1(b), a vertical dimension Lb of each of the first end-face portion 101 and the second end-face portion 102 is larger than a vertical dimension DW1 of the frame's internal flow-path 71 on a side in which the cooling fluid flows into the cooling device, and larger than a vertical dimension DW2 (=DW1) of the frame's internal flow-path 72 on a side in which the cooling fluid outflows. An end-face portion area "B" in the cooling device 10 of the rotating electric machine according to the present invention is given: "B"=Vertical dimension of end-face portion Lb×Horizontal dimension of end-face portion (the dimension perpendicular to the paper; not shown in the figures).

Therefore, it is clear that, if the horizontal dimensions (described above) of the first end-face portion 101 and second end-face portion 102 of the aforementioned conventional cooling device 10 and the horizontal dimensions (described above) of the first end-face portion 101 and the second end-face portion 102 of the cooling device 10 according to the present invention are the same, the end-face portion area "B" of the cooling device 10 according to the present invention is larger than the end-face portion area "A" of the conventional cooling device 10. If the end-face portion area of the cooling device is increased, the velocity of flow of the cooling fluid that has flowed into the cooling device is decreased, so that the cooling fluid contacts with cooling pipes 107 over a prolonged period of time. As a result, the cooling device 10 according to Embodiment 1 of the present invention shown in FIG. 1(b) achieves a high heat exchange performance in comparison with the conventional cooling device 10 shown in FIG. 1(a).

According to the above, a feature resides in that the cooling device 10 of the rotating electric machine according to the present invention includes a first end-face portion 101 through which the cooling fluid flows from the frame's internal flow-path into the cooling device, and a second end-face portion 102 from which the cooling fluid having been cooled outflows into the frame's internal flow-path; and at least one of the end-face portions between the first end-face portion 101 and the second end-face portion 102 is placed tilting with respect to the minimum-width's directions DW1 and DW2 of the frame's internal flow-paths 71 and 72 in vicinity to the cooling device 10, or at least one of the end-face portions between the first end-face portion 101 and the second end-face portion 102 is placed tilting with respect to at least one of a principal inflow direction 11 of the cooling fluid and a principal outflow direction 12 of the cooling fluid.

Note that, it may also be a possible case in which the inflow direction of the cooling fluid and the outflow direction of the cooling fluid differ from each other; however, the cooling device of the rotating electric machine according to the present invention is configured in such a manner that at least one of the end-face portions between the first end-face portion 101 and the second end-face portion 102 is placed tilting with respect to at least one of an inflow direction of a cooling fluid and an outflow direction of the cooling fluid. In addition, there arises a case in which the inflow direction 11 of the cooling fluid and the outflow direction 12 of the cooling fluid individually include a plurality of directions; however, in the present invention, it may be adopted that the inflow direction of the cooling fluid is in any one of the plurality of those inflow directions, and moreover, it may be adopted that the outflow direction of the cooling fluid is in any one of the plurality of those outflow directions. It is desirable that the inflow direction of the cooling fluid is a direction in which a largest amount of inflow is observed among the plurality of those inflow directions, and that the outflow direction of the cooling fluid is a direction in which a largest amount of outflow is observed among the plurality of those outflow directions.

Embodiment 1

Next, the explanation will be made for a rotating electric machine according to Embodiment 1 of the present invention.

FIG. 2(a) and FIG. 2(b) are configuration diagrams illustrating a rotating electric machine according to Embodiment 1 of the present invention; FIG. 2(a) is the configuration diagram illustrating it by a vertical or longitudinal section, and FIG. 2(b) is the configuration diagram illustrating it by a cross section. In FIG. 2(a) and FIG. 2(b), the rotor 2 being housed or accommodated in the interior of the frame 1 cylindrically formed is supported to be rotationally movable by means of bearings (not shown in the figures). The stator 4 that is housed or accommodated in the interior of the frame 1 includes a stator winding(s) 5 (refer to FIG. 28(a)). In an inside space portion of the stator 4, the rotor 2 is inserted, and an inner circumferential face of the stator 4 opposes to an outer circumferential face of the rotor 2 by means of a predetermined gap 6 therebetween. Internal spaces in the frame 1 form a frame's internal flow-path 7.

The stator 4 includes the plurality of stator ducts (refer to FIG. 28(a)) that extend in radial directions of the stator 4 to allow the gap 6 and the frame's internal flow-path 7 to communicate with each other. The pair of cooling fans (refer to FIG. 28(a)) fixed on both end portions of the rotor 2 in the axial direction thereof is mounted to oppose to each other on both the end portions in the axial direction of the stator 4 and the rotor 2, and thus the cooling fluid is transported under pressure into the gap 6 in axial directions from both the end portions.

A first cooling device 10a is placed on an upper side above a horizontal surface SH including an axis line X of the stator 4 and on one side with respect to a vertical surface SV including the axis line X [at the left side in FIG. 2(b)]. A second cooling device 10b is placed on the upper side above the horizontal surface SH described above and on the other side with respect to the vertical surface SV described above [at the right side in FIG. 2(b)], and is placed interposing an interspace with respect to the first cooling device 10a.

The first cooling device 10a includes the first end-face portion 101 through which the cooling fluid from the frame's internal flow-path 7 flows into the cooling device, and the second end-face portion 102 from which the cooling fluid that has been cooled is outflowed into the frame's internal flow-path 7. The first end-face portion 101 and the second end-face portion 102 are placed in parallel with each other. The first end-face portion 101 is placed tilting with respect to an inflow direction 11 of the cooling fluid. In other words, the first end-face portion 101 is placed tilting with respect to a first orthogonal surface S1 ("S1" in FIG. 1(b))

which is perpendicular to the inflow direction 11 of the cooling fluid. The second end-face portion 102 is placed tilting with respect to an outflow direction 12 of the cooling fluid. In other words, the second end-face portion 102 is placed tilting with respect to a second orthogonal surface S2 ("S2" in FIG. 1(b)) which is perpendicular to the outflow direction 12 of the cooling fluid. In addition, the first and second end-face portions 101 and 102 of the first cooling device 10a are placed tilting with respect to a minimum-width's direction DW of the frame's internal flow-path 7 in vicinity to the cooling device.

The first end-face portion 101 of the first cooling device 10a described above opposes to an outer circumferential face of the stator 4 along a direction in which the axis line X of the stator 4 extends. The second end-face portion 102 opposes to an inner face portion of the frame 1 along a direction in which the axis line X of the stator 4 extends, and also one end-edge of the second end-face portion contacts with the inner face portion of the frame 1.

Meanwhile, the second cooling device 10b includes the first end-face portion 101 through which the cooling fluid flows from the frame's internal flow-path 7 into the second cooling device, and the second end-face portion 102 placed in parallel with this first end-face portion 101, from which the cooling fluid having been cooled outflows into the frame's internal flow-path 7. The first end-face portion 101 is placed tilting with respect to an inflow direction 11 of the cooling fluid. In other words, the first end-face portion 101 is placed tilting with respect to a first orthogonal surface S1 ("S1" in FIG. 1(b)) which is perpendicular to the inflow direction 11 of the cooling fluid. The second end-face portion 102 is placed tilting with respect to an outflow direction 12 of the cooling fluid. In other words, the second end-face portion 102 is placed tilting with respect to a second orthogonal surface S2 ("S2" in FIG. 1(b)) which is perpendicular to the outflow direction 12 of the cooling fluid. In addition, the first and second end-face portions 101 and 102 of the second cooling device 10b are placed tilting with respect to a minimum-width's direction DW of the frame's internal flow-path 7 in vicinity to the cooling device.

The first end-face portion 101 of the second cooling device 10b described above opposes to the outer circumferential face of the stator 4 along a direction in which the axis line X of the stator 4 extends. The second end-face portion 102 opposes to an inner face portion of the frame 1 along a direction in which the axis line X of the stator 4 extends, and also one end-edge of the second end-face portion contacts with the inner face portion of the frame 1.

A partition plate 110 is mounted to bridge the first cooling device 10a and the second cooling device 10b, so that the first end-face portion 101 and the second end-face portion 102 of each of the cooling devices 10a and 10b are separated to each other so as not to mix a high-temperature cooling fluid from the stator 4 with a low-temperature cooling fluid cooled by each of the cooling devices 10a and 10b.

The first and second cooling devices 10a and 10b each include a plurality of cooling pipes (refer to the cooling pipes 107 in FIG. 1(b)) which extend along the respective first end-face portion 101 and second end-face portion 102, connecting therebetween. Those cooling pipes are separated for outward paths and inward paths by means of a pair of headers 103 and 104, and connected in parallel with each other. A cooling medium such as a cooling water or the like flowed from the inflow pipe 105 into the header 103 arrives at the header 104 through a plurality of outward cooling pipes and returns to the header 103 through inward cooling pipes, and outflows from the outflow pipe 106 so as to be cooled by an external cooling-medium cooling apparatus (not shown in the figures).

In the rotating electric machine configured as described above according to Embodiment 1 of the present invention, a low-temperature cooling fluid cooled by the first and second cooling devices 10a and 10b is transported under pressure from both end portions of the rotor 2 and stator 4 in axial directions thereof by means of the cooling fans (refer to FIG. 28(a)), and flowed into the gap 6. The cooling fluid transported under pressure into the gap 6 flows through the plurality of stator ducts, and outflows into the lower portion of frame's internal flow-path 7 surrounded by the first and second cooling devices 10a and 10b, and the partition plate 110; and subsequently, the cooling fluid flows through the first end-face portion 101 of each of the cooling devices 10a and 10b into the interiors of respective cooling devices 10a and 10b so as to be cooled by the aforementioned cooling pipes, and outflows from the second end-face portion 102 of each of the cooling devices 10a and 10b into the upper portion of frame's internal flow-path 7 surrounded by the first and second cooling devices 10a and 10b, and the partition plate 110.

The low-temperature cooling fluid outflowed into the upper portion of frame's internal flow-path 7 above the partition plate 110 is for a second time transported under pressure from both end portions of the rotor 2 in axial directions thereof into the gap 6 by means of the cooling fans. By the cooling fluid that circulates in the interior of the frame 1 as described above, the rotor 2, the stator 4 and the stator winding(s) 5 are cooled.

Note that, the circulating direction of the cooling fluid may be adopted so that those directions indicated by the arrows in FIG. 2(b) are reversed. In this case, the placement of the first end-face portion 101 and the second end-face portion 102 in each of the first and second cooling devices 10a and 10b takes a reversed placement with respect to that shown in FIG. 2(a) and FIG. 2(b), and also directions in which the cooling fluid is transported under pressure by means of the cooling fans are in reversed relation to those described above.

FIG. 3 is an illustrative configuration diagram for explaining the rotating electric machine according to Embodiment 1 of the present invention, in contrast to a conventional rotating electric machine whose cooling devices are placed as shown in FIG. 1(a); part (a) of FIG. 3 shows the conventional rotating electric machine, and part (b) of FIG. 3, the rotating electric machine according to Embodiment 1 of the present invention. In comparison with the conventional rotating electric machine shown in part (a) of FIG. 3, the rotating electric machine shown in part (b) of FIG. 3 according to Embodiment 1 of the present invention is configured to place the cooling devices as described above, so that the cooling devices can be made smaller in size and lighter in weight, and also made capable of advancing sufficient heat exchange performance; and as a result, the outer dimensions of the frame 1 can also be reduced, and it is possible to obtain a rotating electric machine that is collectively smaller in size and lighter in weight.

As described above, the rotating electric machine according to Embodiment 1 of the present invention includes the following features.

(1) There included are a first cooling device placed on an upper side above a horizontal surface including an axis line of a stator and on one side with respect to a vertical surface including the axis line; and a second cooling device placed on the upper side above the horizontal surface and on the other side with respect to the vertical surface, and placed interposing an interspace with respect to the first cooling device.

(2) The first and second cooling devices each include a first end-face portion and a second end-face portion: between the first end-face portion and the second end-face portion of the first cooling device, one of the end-face portions opposes to an outer circumferential face of the stator along a direction in which the axis line extends, and the other end-face portion opposes to an inner face portion of the frame along a direction in which the axis line extends; and, between the first end-face portion and the second end-face portion of the second cooling device, one of the end-face portions opposes to the outer circumferential face of the stator along a direction in which the axis line extends, and the other end-face portion opposes to an inner face portion of the frame along a direction in which the axis line extends.

(3) The first and second cooling devices are individually provided with the basic configuration of the cooling device of the rotating electric machine according to the present invention described referring to FIG. 1(*b*).

(4) The frame is cylindrically formed.

Embodiment 2

Next, the explanation will be made for a rotating electric machine according to Embodiment 2 of the present invention. The rotating electric machine according to Embodiment 2 of the present invention is a rotating electric machine in which the first and second cooling devices 10*a* and 10*b* in Embodiment 1 described above are individually divided on a set of two basis, so that the machine collectively includes first through fourth cooling devices.

FIG. 4(*a*) and FIG. 4(*b*) are configuration diagrams illustrating the rotating electric machine according to Embodiment 2 of the present invention; FIG. 4(*a*) is the configuration diagram illustrating it by a longitudinal section, and FIG. 4(*b*) is the configuration diagram illustrating it by a cross section. In FIG. 4(*a*) and FIG. 4(*b*), a first cooling device 10*a*1 is placed on an upper side above a horizontal surface SH including the axis line X of the stator 4 and on one side with respect to a vertical surface SV including the axis line X [at the left side in FIG. 4(*b*)]. A second cooling device 10*a*2 is placed on the upper side above the horizontal surface SH including the axis line X of the stator 4 and on the aforementioned one side with respect to the vertical surface SV including the axis line X, and is also placed toward the side of the vertical surface SV than the first cooling device 10*a*1. The first and second cooling devices 10*a*1 and 10*a*2 are angled to some extent in a circumferential direction of the stator 4, and interconnected to each other.

A third cooling device 10*b*1 is placed on the upper side above the horizontal surface SH described above and on the other side with respect to the vertical surface SV described above [at the right side in FIG. 4(*b*)]; and a fourth cooling device 10*b*2 is placed on the upper side above the horizontal surface SH including the axis line X of the stator 4 and on the aforementioned other side with respect to the vertical surface SV including the axis line X, and is also placed toward the side of the vertical surface SV than the third cooling device 10*b*1. The third and fourth cooling devices 10*b*1 and 10*b*2 are angled to some extent in the circumferential direction of the stator 4, and interconnected to each other.

The first and second cooling devices 10*a*1 and 10*a*2 each include the first end-face portion 101 through which the cooling fluid from the frame's internal flow-path 7 flows into each cooling device, and the second end-face portion 102 from which the cooling fluid that has been cooled is outflowed into the frame's internal flow-path 7. The first end-face portion 101 and the second end-face portion 102 are placed in parallel with each other. The first end-face portion 101 of each of the first and second cooling devices 10*a*1 and 10*a*2 is placed tilting with respect to an inflow direction 11 of the cooling fluid. In other words, the first end-face portion is placed tilting with respect to a first orthogonal surface S1 ("S1" in FIG. 1(*b*)) which is perpendicular to the inflow direction 11 of the cooling fluid. In addition, the second end-face portion 102 of each of the first and second cooling devices 10*a*1 and 10*a*2 is placed tilting with respect to an outflow direction 12 of the cooling fluid. In other words, the second end-face portion is placed tilting with respect to a second orthogonal surface S2 ("S2" in FIG. 1(*b*)) which is perpendicular to the outflow direction 12 of the cooling fluid. Moreover, the first and second end-face portions 101 and 102 of each of the first and second cooling devices 10*a*1 and 10*a*2 are placed tilting with respect to a minimum-width's direction DW of the frame's internal flow-path 7 in vicinity to the cooling devices.

The first end-face portion 101 of each of the first and second cooling devices 10*a*1 and 10*a*2 opposes to an outer circumferential face of the stator 4 along a direction in which the axis line X of the stator 4 extends, and each of the second end-face portions 102 opposes to an inner face portion of the frame 1 along a direction in which the axis line X of the stator 4 extends. In addition, on a side of the second end-face portion 102 of the first cooling device 10*a*1, one end-edge of the second end-face portion contacts with the inner face portion of the frame 1.

Meanwhile, the third and fourth cooling devices 10*b*1 and 10*b*2 each include the first end-face portion 101 through which the cooling fluid from the frame's internal flow-path 7 flows into each cooling device, and the second end-face portion 102 from which the cooling fluid that has been cooled is outflowed into the frame's internal flow-path 7. The first end-face portion 101 and the second end-face portion 102 are placed in parallel with each other. The first end-face portion 101 of each of the third and fourth cooling devices 10*b*1 and 10*b*2 is placed tilting with respect to an inflow direction 11 of the cooling fluid. In other words, the first end-face portion is placed tilting with respect to a first orthogonal surface S1 ("S1" in FIG. 1(*b*)) which is perpendicular to the inflow direction 11 of the cooling fluid. Moreover, the second end-face portion 102 of each of the third and fourth cooling devices 10*b*1 and 10*b*2 is placed tilting with respect to an outflow direction 12 of the cooling fluid. In other words, the second end-face portion is placed tilting with respect to a second orthogonal surface S2 ("S2" in FIG. 1(*b*)) which is perpendicular to the outflow direction 12 of the cooling fluid. In addition, the first and second end-face portions 101 and 102 of each of the third and fourth cooling devices 10*b*1 and 10*b*2 are placed tilting with respect to a minimum-width's direction DW of the frame's internal flow-path 7 in vicinity to the cooling devices.

The first end-face portion 101 of each of the third and fourth cooling devices 10*b*1 and 10*b*2 opposes to the outer circumferential face of the stator 4 along a direction in which the axis line X of the stator 4 extends, and each of the second end-face portions 102 opposes to an inner face portion of the frame 1 along a direction in which the axis line X of the stator 4 extends. In addition, on a side of the second end-face portion 102 of the third cooling device 10*b*1, one end-edge of the second end-face portion contacts with the inner face portion of the frame 1.

The partition plate 110 is mounted to bridge the first and second cooling devices 10a1 and 10a2, and the third and fourth cooling devices 10b1 and 10b2, so that the first end-face portion 101 and the second end-face portion 102 of each of the cooling devices 10a1, 10a2, 10b1 and 10b2 are separated to each other so as not to mix a high-temperature cooling fluid from the stator 4 with a low-temperature cooling fluid cooled by each of the cooling devices 10a1, 10a2, 10b1 and 10b2.

The first through fourth cooling devices 10a1, 10a2, 10b1 and 10b2 each include a plurality of cooling pipes (corresponding to the cooling pipes 107 in FIG. 1(b)) which extend along the respective first end-face portion 101 and second end-face portion 102, connecting therebetween; however, these configurations and other constituent items are equivalent or similar to those shown in FIG. 1(b), and those in Embodiment 1 described above.

In the rotating electric machine configured as described above according to Embodiment 2 of the present invention, a low-temperature cooling fluid cooled by the first through fourth cooling devices 10a1, 10a2, 10b1 and 10b2 is transported under pressure from both end portions of the rotor 2 and stator 4 in axial directions thereof by means of the cooling fans (refer to FIG. 28(a)), and flowed into the gap 6. The cooling fluid transported under pressure into the gap 6 flows through the plurality of stator ducts (refer to FIG. 28(a)), and outflows into the lower portion of frame's internal flow-path 7 surrounded by the first through fourth cooling devices 10a1, 10a2, 10b1 and 10b2, and the partition plate 110; and subsequently, the cooling fluid flows through the first end-face portion 101 of each of the cooling devices 10a1, 10a2, 10b1 and 10b2 into the interiors of respective cooling devices so as to be cooled by the aforementioned cooling pipes, and outflows from the second end-face portion 102 of each of the cooling devices 10a1, 10a2, 10b1 and 10b2 into the upper portion of frame's internal flow-path 7 surrounded by the first through fourth cooling devices 10a1, 10a2, 10b1 and 10b2, and the partition plate 110.

The low-temperature cooling fluid outflowed into the upper portion of frame's internal flow-path 7 above the partition plate 110 is for a second time transported under pressure from both end portions of the rotor 2 in axial directions thereof into the gap 6 by means of the cooling fans. By the cooling fluid that circulates in the interior of the frame 1 as described above, the rotor 2, the stator 4 and the stator winding(s) 5 are cooled.

Figure 4B:
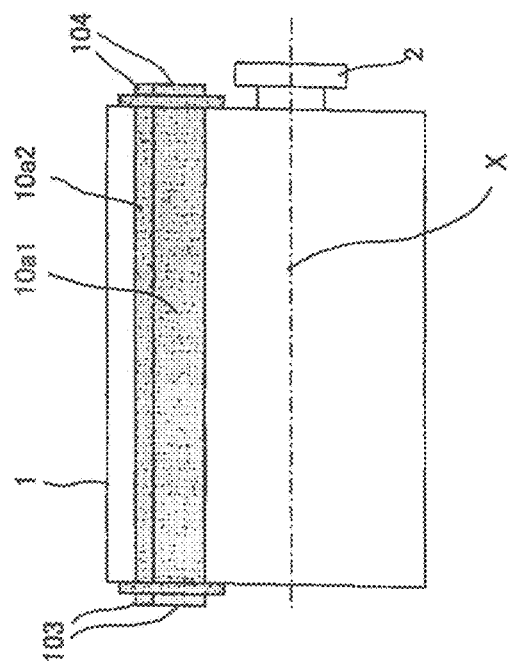

Note that, the circulating direction of the cooling fluid may be adopted so that those directions indicated by the arrows in FIG. 4(b) are reversed. In this case, the placement of the first end-face portion 101 and the second end-face portion 102 in each of the first through fourth cooling devices 10a1, 10a2, 10b1 and 10b2 takes a reversed placement with respect to that shown in FIG. 4(a) and FIG. 4(b), and also directions in which the cooling fluid is transported under pressure by means of the cooling fans are in reversed relation to those described above.

FIG. 5 is an illustrative configuration diagram for explaining the rotating electric machine according to Embodiment 2 of the present invention, in contrast to a conventional rotating electric machine whose cooling devices are placed as shown in FIG. 1(a); part (a) of FIG. 5 shows the conventional rotating electric machine, and part (b) of FIG. 5, the rotating electric machine according to Embodiment 2 of the present invention. In comparison with the conventional rotating electric machine shown in part (a) of FIG. 5, the rotating electric machine shown in part (b) of FIG. 5 according to Embodiment 2 of the present invention is configured to place the cooling devices as described above, so that the cooling devices can be made smaller in size and lighter in weight, and also made capable of advancing sufficient heat exchange performance; and as a result, the outer dimensions of the frame 1 can also be reduced, and it is possible to obtain a rotating electric machine that is collectively smaller in size and lighter in weight.

As described above, the rotating electric machine according to Embodiment 2 of the present invention includes the following features.
(1) There included are a first cooling device and a second cooling device which are placed on an upper side above a horizontal surface including an axis line of a stator and on one side with respect to a vertical surface including the axis line, and are arranged side by side in a circumferential direction of the stator; and a third cooling device and a fourth cooling device which are placed on the upper side above the horizontal surface and on the other side with respect to the vertical surface, and are arranged side by side in a circumferential direction of the stator.
(2) The first through fourth cooling devices each include a first end-face portion and a second end-face portion: between the first end-face portions and the second end-face portions of the respective first through fourth cooling devices, one of the end-face portions opposes to an outer circumferential face of the stator along a direction in which the axis line extends, and the other end-face portion opposes to an inner face portion of the frame along a direction in which the axis line extends.
(3) The first and second cooling devices are angled in a circumferential direction of the stator and interconnected to each other, and the third and fourth cooling devices are angled in the circumferential direction of the stator and interconnected to each other.
(4) The first through fourth cooling devices are individually provided with the basic configuration of the cooling device of the rotating electric machine according to the present invention described referring to FIG. 1(b).
(5) The frame is cylindrically formed.

Embodiment 3

Next, the explanation will be made for a rotating electric machine according to Embodiment 3 of the present invention.

FIG. 6(a) and FIG. 6(b) are configuration diagrams illustrating a rotating electric machine according to Embodiment 3 of the present invention; FIG. 6(a) is the configuration diagram illustrating it by a longitudinal section, and FIG. 6(b) is the configuration diagram illustrating it by a cross section.

In FIG. 6(a) and FIG. 6(b), the first cooling device 10a1 is placed on an upper side above a horizontal surface SH including the axis line X of the stator 4 and on one side with respect to a vertical surface SV including the axis line X [at the left side in FIG. 6(b)]. The second cooling device 10b1 is placed on the upper side above the horizontal surface SH including the axis line X of the stator 4 and on the other side with respect to the vertical surface SV including the axis line X [at the right side in FIG. 6(b)].

The third cooling device 10a2 is placed on a lower side below the horizontal surface SH described above and on the aforementioned one side with respect to the aforementioned vertical surface SV described above. The fourth cooling device 10b2 is placed on the lower side below the horizontal surface SH including the axis line X of the stator 4 and on the aforementioned other side with respect to the vertical surface SV including the axis line X. The first through fourth cooling devices 10a1, 10b1, 10a2 and 10b2 are placed interposing interspaces to one another.

The first through fourth cooling devices 10a1, 10b1, 10a2 and 10b2 each include the first end-face portion 101 through which the cooling fluid flows from the frame's internal flow-path 7, and the second end-face portion 102, placed in parallel with this first end-face portion 101, from which the cooling fluid having been cooled outflows into the frame's internal flow-path 7. The first end-face portion 101 of each of the first through fourth cooling devices 10a1, 10b1, 10a2 and 10b2 is placed tilting with respect to an inflow direction 11 of the cooling fluid. In other words, the first end-face portion is placed tilting with respect to a first orthogonal surface S1 ("S1" in FIG. 1(b)) which is perpendicular to the inflow direction 11 of the cooling fluid. In addition, the second end-face portion 102 of each of the first through fourth cooling devices 10a1, 10b1, 10a2 and 10b2 is placed tilting with respect to an outflow direction 12 of the cooling fluid. In other words, the second end-face portion is placed tilting with respect to a second orthogonal surface S2 ("S2" in FIG. 1(b)) which is perpendicular to the outflow direction 12 of the cooling fluid. Moreover, the first and second end-face portions 101 and 102 of each of the first through fourth cooling devices 10a1, 10b1, 10a2 and 10b2 are placed tilting with respect to a minimum-width's direction DW of the frame's internal flow-path 7 in vicinity to the cooling devices.

Each of the first end-face portions 101 of the first and second cooling devices 10a1 and 10b1 opposes to an outer circumferential face of the stator 4 along a direction in which the axis line X of the stator 4 extends, and each of the second end-face portions 102 opposes to an inner face portion of the frame 1 along a direction in which the axis line X of the stator 4 extends. In addition, each of the first end-face portions 101 of the third and fourth cooling devices 10a2 and 10b2 opposes to the outer circumferential face of the stator 4 along a direction in which the axis line X of the stator 4 extends, and each of the second end-face portions 102 opposes to an inner face portion of the frame 1, or to a floor surface side on which the rotating electric machine is mounted, along a direction in which the axis line X of the stator 4 extends. On a side of the second end-face portion 102 of each of the first through fourth cooling devices 10a1, 10b1, 10a2 and 10b2, one end-edge of the second end-face portion contacts with the inner face portion of the frame 1.

A first partition plate 110 is mounted to bridge the first cooling device 10a1 and the second cooling device 10b1, so that the first end-face portion 101 and the second end-face portion 102 of each of the cooling devices 10a1 and 10b1 are separated to each other so as not to mix a high-temperature cooling fluid from the stator 4 with a low-temperature cooling fluid cooled by each of the cooling devices 10a1 and 10b1.

A second partition plate 111 is mounted to bridge the third cooling device 10a2 and the fourth cooling device 10b2, so that the first end-face portion 101 and the second end-face portion 102 of each of the cooling devices 10a2 and 10b2 are separated to each other so as not to mix a high-temperature cooling fluid from the stator 4 with a low-temperature cooling fluid cooled by each of the cooling devices 10a2 and 10b2.

The first through fourth cooling devices 10a1, 10b1, 10a2 and 10b2 each include a plurality of cooling pipes (corresponding to the cooling pipes 107 in FIG. 1(b)) which extend along the respective first end-face portion 101 and second end-face portion 102, connecting therebetween; however, these configurations and other constituent items are equivalent or similar to those shown in FIG. 1(b), and those in Embodiment 1 described above.

In the rotating electric machine configured as described above according to Embodiment 3 of the present invention, a low-temperature cooling fluid cooled by the first through fourth cooling devices 10a1, 10b1, 10a2 and 10b2 is transported under pressure from both end portions of the rotor 2 and stator 4 in axial directions thereof by means of cooling fans (not shown in the figures), and flowed into the gap 6. The cooling fluid transported under pressure into the gap 6 flows through the plurality of stator ducts, and outflows into the frame's internal flow-path 7 surrounded by the first through fourth cooling devices 10a1, 10b1, 10a2 and 10b2, and the first and second partition plates 110 and 111; and subsequently, the cooling fluid flows through the first end-face portion 101 of each of the cooling devices 10a1, 10b1, 10a2 and 10b2 into the interiors of respective cooling devices so as to be cooled by the aforementioned cooling pipes. And then the cooling fluid outflows from the second end-face portion 102 of each of the first and second cooling devices 10a1 and 10b1 into the upper portion of frame's internal flow-path 7 above the first and second cooling devices 10a1 and 10b1, and the first partition plate 110, and also outflows from the second end-face portion 102 of each of the third and fourth cooling devices 10a2 and 10b2 into the lower portion of frame's internal flow-path 7 below the third and fourth cooling devices 10a2 and 10b2, and the second partition plate 111.

The aforementioned cooling fluid outflowed from the second end-face portion 102 of each of the cooling devices 10a1, 10b1, 10a2 and 10b2 is for a second time transported under pressure from both end portions of the rotor 2 in axial directions thereof into the gap 6 by means of the cooling fans. By the cooling fluid that circulates in the interior of the frame 1 as described above, the rotor 2, the stator 4 and the stator winding(s) 5 are cooled.

Note that, the circulating direction of the cooling fluid may be adopted so that those directions indicated by the arrows in FIG. 6(b) are reversed. In this case, the placement of the first end-face portion 101 and the second end-face portion 102 in each of the first through fourth cooling devices 10a1, 10b1, 10a2 and 10b2 takes a reversed placement with respect to that shown in FIG. 6(a) and FIG. 6(b), and also directions in which the cooling fluid is transported under pressure by means of the cooling fans are in reversed relation to those described above.

FIG. 7 is an illustrative configuration diagram for explaining the rotating electric machine according to Embodiment 3 of the present invention, in contrast to a conventional rotating electric machine whose cooling devices are placed as shown in FIG. 1(a); part (a) of FIG. 7 shows the conventional rotating electric machine, and part (b) of FIG. 7, the rotating electric machine according to Embodiment 3 of the present invention. In comparison with the conventional rotating electric machine shown in part (a) of FIG. 7, the rotating electric machine shown in part (b) of FIG. 7 according to Embodiment 3 of the present invention is configured to place the cooling devices as described above, so that the cooling devices can be made smaller in size and lighter in weight, and also made capable of advancing sufficient heat exchange performance; and as a result, the outer dimensions of the frame 1 can also be reduced, and it is possible to obtain a rotating electric machine that is collectively smaller in size and lighter in weight.

As described above, the rotating electric machine according to Embodiment 3 of the present invention includes the following features.

(1) There included are a first cooling device placed on an upper side above a horizontal surface including an axis-line of a stator and on one side with respect to a vertical surface including the axis line, and a second cooling device placed on the upper side above the horizontal surface and on the other side with respect to the vertical surface; and a third cooling device placed on a lower side below the horizontal surface and on one side with respect to the vertical surface, and a fourth cooling device placed on the lower side below the horizontal surface and on the other side with respect to the vertical surface.

(2) The first through fourth cooling devices each include a first end-face portion and a second end-face portion: between the first end-face portion and the second end-face portion of the respective first and second cooling devices, one of the end-face portions opposes to an outer circumferential face of the stator along a direction in which the axis line extends, and the other end-face portion opposes to an inner face portion of the frame along a direction in which the axis line extends; and, between the first end-face portion and the second end-face portion of the respective third and fourth cooling devices, one of the end-face portions opposes to the outer circumferential face of the stator along a direction in which the axis line extends, and the other end-face portion opposes to an inner face portion of the frame, or to a floor surface side on which the stator is mounted, along a direction in which the axis line extends.

(3) The first through fourth cooling devices are placed interposing interspaces to one another; and both the first end-face portions or both the second end-face portions of the first and third cooling devices oppose to each other interposing the stator therebetween, and both the first end-face portions or both the second end-face portions of the second and fourth cooling devices oppose to each other interposing the stator therebetween.

(4) The first through fourth cooling devices are individually provided with the basic configuration of the cooling device of the rotating electric machine according to the present invention described referring to FIG. 1(*b*).

(5) The frame is cylindrically formed.

Embodiment 4

Next, the explanation will be made for a rotating electric machine according to Embodiment 4 of the present invention.

FIG. 8(*a*) and FIG. 8(*b*) are configuration diagrams illustrating a rotating electric machine according to Embodiment 4 of the present invention; FIG. 8(*a*) is the configuration diagram illustrating it by a longitudinal section, and FIG. 8(*b*) is the configuration diagram illustrating it by a cross section.

In FIG. 8(*a*) and FIG. 8(*b*), the first cooling device 10*a*1 is placed on an upper side above a horizontal surface SH including the axis line X of the stator 4 and on one side with respect to a vertical surface SV including the axis line X [at the left side in FIG. 8(*b*)]. The second cooling device 10*b*1 is placed on the upper side above the horizontal surface SH including the axis line X of the stator 4 and on the other side with respect to the vertical surface SV including the axis line X [at the right side in FIG. 8(*b*)].

The third cooling device 10*a*2 is placed on a lower side below the horizontal surface SH described above and on the aforementioned one side with respect to the vertical surface SV described above. The fourth cooling device 10*b*2 is placed on the lower side below the horizontal surface SH including the axis line X of the stator 4 and on the aforementioned other side with respect to the vertical surface SV including the axis line X. The first through fourth cooling devices 10*a*1, 10*b*1, 10*a*2 and 10*b*2 are placed interposing interspaces to one another.

According to the above, the first and third cooling devices 10*a*1 and 10*a*2 are arranged upward and downward interposing an interspace to each other on one side portion of the stator 4 [in FIG. 8(*b*), at the left side of the figure]; and the second and fourth cooling devices 10*b*1 and 10*b*2 are arranged upward and downward interposing an interspace to each other on the other side portion of the stator 4 [in FIG. 8(*b*), at the right side of the figure].

The first through fourth cooling devices 10*a*1, 10*b*1, 10*a*2 and 10*b*2 each include the first end-face portion 101 through which the cooling fluid from the frame's internal flow-path 7 flows into each cooling device, and the second end-face portion 102 from which the cooling fluid that has been cooled is outflowed into the frame's internal flow-path 7. The first end-face portion 101 and the second end-face portion 102 are placed in parallel with each other. The first end-face portion 101 of each of the first through fourth cooling devices 10*a*1, 10*b*1, 10*a*2 and 10*b*2 is placed tilting with respect to an inflow direction 11 of the cooling fluid. In other words, the first end-face portion is placed tilting with respect to a first orthogonal surface S1 ("S1" in FIG. 1(*b*)) which is perpendicular to the inflow direction 11 of the cooling fluid. In addition, the second end-face portion 102 of each of the first through fourth cooling devices 10*a*1, 10*b*1, 10*a*2 and 10*b*2 is placed tilting with respect to an outflow direction 12 of the cooling fluid. In other words, the second end-face portion is placed tilting with respect to a second orthogonal surface S2 ("S2" in FIG. 1(*b*)) which is perpendicular to the outflow direction 12 of the cooling fluid. Moreover, the first and second end-face portions 101 and 102 of each of the first through fourth cooling devices 10*a*1, 10*b*1, 10*a*2 and 10*b*2 are placed tilting with respect to a minimum-width's direction DW of the frame's internal flow-path 7 in vicinity to the cooling devices.

Each of the first end-face portions 101 of the first through fourth cooling devices 10*a*1, 10*b*1, 10*a*2 and 10*b*2 opposes to an outer circumferential face of the stator 4 along a direction in which the axis line X of the stator 4 extends, and each of the second end-face portions 102 opposes to an inner face portion of the frame 1 along a direction in which the axis line X of the stator 4 extends. In addition, on a side of the second end-face portion 102 of each of the first through fourth cooling devices 10*a*1, 10*b*1, 10*a*2 and 10*b*2, one end-edge of the second end-face portion contacts with the inner face portion of the frame 1.

The first partition plate 110 is mounted to bridge the first cooling device 10*a*1 and the third cooling device 10*a*2, so that the first end-face portion 101 and the second end-face portion 102 of each of the cooling devices 10*a*1 and 10*a*2 are separated to each other so as not to mix a high-temperature cooling fluid from the stator 4 with a low-temperature cooling fluid cooled by each of the cooling devices 10*a*1 and 10*a*2.

The second partition plate 111 is mounted to bridge the second cooling device 10*b*1 and the fourth cooling device 10*b*2, so that the first end-face portion 101 and the second end-face portion 102 of each of the cooling devices 10*b*1 and 10*b*2 are separated to each other so as not to mix a high-temperature cooling fluid from the stator 4 with a low-temperature cooling fluid cooled by each of the cooling devices 10b1 and 10b2.

The first through fourth cooling devices 10a1, 10b1, 10a2 and 10b2 each include a plurality of cooling pipes (corresponding to the cooling pipes 107 in FIG. 1(b)) which extend along the respective first end-face portion 101 and second end-face portion 102, connecting therebetween; however, these configurations and other constituent items are equivalent or similar to those shown in FIG. 1(b), and those in Embodiment 1 described above.

In the rotating electric machine configured as described above according to Embodiment 4 of the present invention, a low-temperature cooling fluid cooled by the first through fourth cooling devices 10a1, 10b1, 10a2 and 10b2 is transported under pressure from both end portions of the rotor 2 and stator 4 in axial directions thereof by means of cooling fans (not shown in the figures), and flowed into the gap 6. The cooling fluid transported under pressure into the gap 6 flows through the plurality of stator ducts, and outflows into the frame's internal flow-path 7 surrounded by the first through fourth cooling devices 10a1, 10b1, 10a2 and 10b2, and the first and second partition plates 110 and 111; and subsequently, the cooling fluid flows through the first end-face portion 101 of each of the cooling devices 10a1, 10b1, 10a2 and 10b2 into the interiors of respective cooling devices so as to be cooled by the aforementioned cooling pipes, and outflows from the second end-face portion 102 of each of the first through fourth cooling devices 10a1, 10b1, 10a2 and 10b2 into the frame's internal flow-path 7.

The aforementioned cooling fluid outflowed from the second end-face portion 102 of each of the cooling devices 10a1, 10b1, 10a2 and 10b2 is for a second time transported under pressure from both end portions of the rotor 2 in axial directions thereof into the gap 6 by means of the cooling fans. By the cooling fluid that circulates in the interior of the frame 1 as described above, the rotor 2, the stator 4 and the stator winding(s) 5 are cooled.

Note that, the circulating direction of the cooling fluid may be adopted so that those directions indicated by the arrows in FIG. 8(b) are reversed. In this case, the placement of the first end-face portion 101 and the second end-face portion 102 in each of the first through fourth cooling devices 10a1, 10b1, 10a2 and 10b2 takes a reversed placement with respect to that shown in FIG. 8(a) and FIG. 8(b), and also directions in which the cooling fluid is transported under pressure by means of the cooling fans are in reversed relation to those described above.

FIG. 9 is an illustrative configuration diagram for explaining the rotating electric machine according to Embodiment 4 of the present invention, in contrast to a conventional rotating electric machine whose cooling devices are placed as shown in FIG. 1(a); part (a) of FIG. 9 shows the conventional rotating electric machine, and part (b) of FIG. 9, the rotating electric machine according to Embodiment 4 of the present invention. In comparison with the conventional rotating electric machine shown in part (a) of FIG. 9, the rotating electric machine shown in part (b) of FIG. 9 according to Embodiment 4 of the present invention is configured to place the cooling devices as described above, so that the cooling devices can be made smaller in size and lighter in weight, and also made capable of advancing sufficient heat exchange performance; and as a result, the outer dimensions of the frame 1 can also be reduced, and it is possible to obtain a rotating electric machine that is collectively smaller in size and lighter in weight.

As described above, the rotating electric machine according to Embodiment 4 of the present invention includes the following features.

(1) There included are a first cooling device placed on an upper side above a horizontal surface including an axis-line of a stator and on one side with respect to a vertical surface including the axis line, and a second cooling device placed on the upper side above the horizontal surface and on the other side with respect to the vertical surface; and a third cooling device placed on a lower side below the horizontal surface and on one side with respect to the vertical surface, and a fourth cooling device placed on the lower side below the horizontal surface and on the other side with respect to the vertical surface.

(2) The first through fourth cooling devices each include a first end-face portion and a second end-face portion: between the first end-face portion and the second end-face portion of the respective first through fourth cooling devices, one of the end-face portions opposes to an outer circumferential face of the stator along a direction in which the axis line extends, and the other end-face portion opposes to an inner face portion of the frame along a direction in which the axis line extends.

(3) The first through fourth cooling devices are placed interposing interspaces to one another; and both the first end-face portions or both the second end-face portions of the first and second cooling devices oppose to each other interposing the stator therebetween, and both the first end-face portions or both the second end-face portions of the third and fourth cooling devices oppose to each other interposing the stator therebetween.

(4) The first through fourth cooling devices are individually provided with the basic configuration of the cooling device of the rotating electric machine according to the present invention described referring to FIG. 1(b).

(5) The frame is cylindrically formed.

Embodiment 5

Next, the explanation will be made for a rotating electric machine according to Embodiment 5 of the present invention.

Figure 10B:
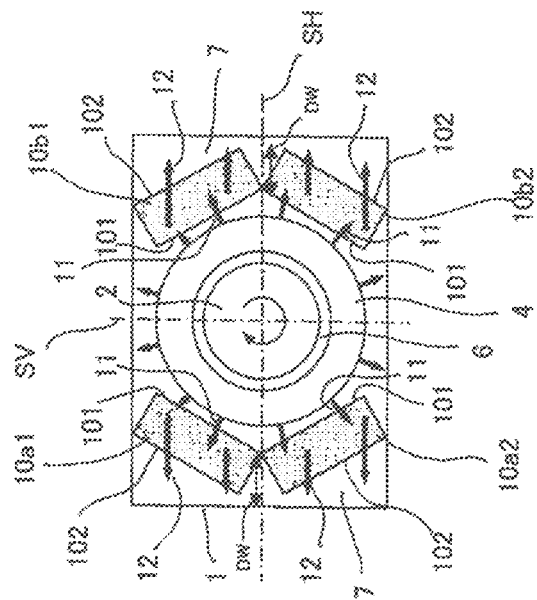
FIG. 10(a) and FIG. 10(b) are configuration diagrams illustrating a rotating electric machine according to Embodiment 5 of the present invention.
Figure 10A:
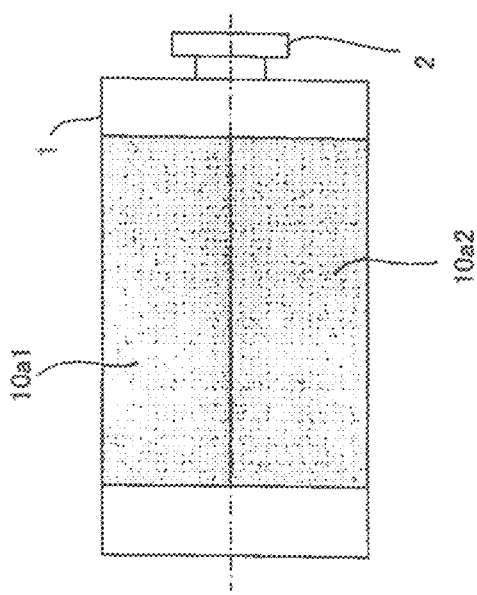

FIG. 10(a) and FIG. 10(b) are configuration diagrams illustrating a rotating electric machine according to Embodiment 5 of the present invention; FIG. 10(a) is the configuration diagram illustrating it by a longitudinal section, and FIG. 10(b) is the configuration diagram illustrating it by a cross section.

In FIG. 10(a) and FIG. 10(b), the frame 1 that accommodates the rotor 2 and the stator 4 is formed in a rectangular box shape. The first cooling device 10a1 is placed on an upper side above a horizontal surface SH including the axis line X of the stator 4 and on one side with respect to a vertical surface SV including the axis line X [at the left side in FIG. 10(b)]. The second cooling device 10b1 is placed on the upper side above the horizontal surface SH including the axis line X of the stator 4 and on the other side with respect to the vertical surface SV including the axis line X [at the right side in FIG. 10(b)].

The third cooling device 10a2 is placed on a lower side below the horizontal surface SH described above and on the aforementioned one side with respect to the vertical surface SV described above. The fourth cooling device 10b2 is placed on the lower side below the horizontal surface SH including the axis line X of the stator 4 and on the aforementioned other side with respect to the vertical surface SV including the axis line X.

The first and third cooling devices 10*a*1 and 10*a*2 are arranged upward and downward interconnecting and angling to each other on one side portion of the stator 4 [in FIG. 10(*b*), at the left side of the figure]; and the second and fourth cooling devices 10*b*1 and 10*b*2 are arranged upward and downward interconnecting and angling to each other on the other side portion of the stator 4 [in FIG. 10(*b*), at the right side of the figure].

The first through fourth cooling devices 10*a*1, 10*b*1, 10*a*2 and 10*b*2 each include the first end-face portion 101 through which the cooling fluid from the frame's internal flow-path 7 flows into each cooling device, and the second end-face portion 102 from which the cooling fluid that has been cooled is outflowed into the frame's internal flow-path 7. The first end-face portion 101 and the second end-face portion 102 are placed in parallel with each other. The first end-face portion 101 of each of the first through fourth cooling devices 10*a*1, 10*b*1, 10*a*2 and 10*b*2 is placed tilting with respect to an inflow direction 11 of the cooling fluid. In other words, the first end-face portion is placed tilting with respect to a first orthogonal surface S1 ("S1" in FIG. 1(*b*)) which is perpendicular to the inflow direction 11 of the cooling fluid. In addition, the second end-face portion 102 of each of the first through fourth cooling devices 10*a*1, 10*b*1, 10*a*2 and 10*b*2 is placed tilting with respect to an outflow direction 12 of the cooling fluid. In other words, the second end-face portion is placed tilting with respect to a second orthogonal surface S2 ("S2" in FIG. 1(*b*)) which is perpendicular to the outflow direction 12 of the cooling fluid. Moreover, the first and second end-face portions 101 and 102 of each of the first through fourth cooling devices 10*a*1, 10*b*1, 10*a*2 and 10*b*2 are placed tilting with respect to a minimum-width's direction DW of the frame's internal flow-path 7 in vicinity to the cooling devices.

Each of the first end-face portions 101 of the first through fourth cooling devices 10*a*1, 10*b*1, 10*a*2 and 10*b*2 opposes to an outer circumferential face of the stator 4 along a direction in which the axis line X of the stator 4 extends, and each of the second end-face portions 102 opposes to an inner face portion of the frame 1 along a direction in which the axis line X of the stator 4 extends. In addition, on a side of the second end-face portion 102 of each of the first through fourth cooling devices 10*a*1, 10*b*1, 10*a*2 and 10*b*2, one end-edge of the second end-face portion contacts with the inner face portion of the frame 1.

The first through fourth cooling devices 10*a*1, 10*b*1, 10*a*2 and 10*b*2 each include a plurality of cooling pipes (corresponding to the cooling pipes 107 in FIG. 1(*b*)) which extend along the respective first end-face portion 101 and second end-face portion 102, connecting therebetween; however, these configurations and other constituent items are equivalent or similar to those shown in FIG. 1(*b*), and those in Embodiment 1 described above.

In the rotating electric machine configured as described above according to Embodiment 5 of the present invention, a low-temperature cooling fluid cooled by the first through fourth cooling devices 10*a*1, 10*b*1, 10*a*2 and 10*b*2 is transported under pressure from both end portions of the rotor 2 and stator 4 in axial directions thereof by means of cooling fans (not shown in the figures), and flowed into the gap 6. The cooling fluid transported under pressure into the gap 6 flows through the plurality of stator ducts, and outflows into the frame's internal flow-path 7 surrounded by the first through fourth cooling devices 10*a*1, 10*b*1, 10*a*2 and 10*b*2; and subsequently, the cooling fluid flows through the first end-face portion 101 of each of the cooling devices 10*a*1, 10*b*1, 10*a*2 and 10*b*2 into the interiors of respective cooling devices so as to be cooled by the aforementioned cooling pipes, and outflows from the second end-face portion 102 of each of the first through fourth cooling devices 10*a*1, 10*b*1, 10*a*2 and 10*b*2 into the frame's internal flow-path 7 on the inner face side of the frame 1.

The aforementioned cooling fluid outflowed from the second end-face portion 102 of each of the cooling devices 10*a*1, 10*b*1, 10*a*2 and 10*b*2 is for a second time transported under pressure from both end portions of the rotor 2 in axial directions thereof into the gap 6 by means of the cooling fans. By the cooling fluid that circulates in the interior of the frame 1 as described above, the rotor 2, the stator 4 and the stator winding(s) 5 are cooled.

Note that, the circulating direction of the cooling fluid may be adopted so that those directions indicated by the arrows in FIG. 10(*b*) are reversed. In this case, the placement of the first end-face portion 101 and the second end-face portion 102 in each of the first through fourth cooling devices 10*a*1, 10*b*1, 10*a*2 and 10*b*2 takes a reversed placement with respect to that shown in FIG. 10(*a*) and FIG. 10(*b*), and also directions in which the cooling fluid is transported under pressure by means of the cooling fans are in reversed relation to those described above.

FIG. 11 is an illustrative configuration diagram for explaining the rotating electric machine according to Embodiment 5 of the present invention, in contrast to a conventional rotating electric machine whose cooling devices are placed as shown in FIG. 1(*a*); part (a) of FIG. 11 shows the conventional rotating electric machine, and part (b) of FIG. 11, the rotating electric machine according to Embodiment 5 of the present invention. In comparison with the conventional rotating electric machine shown in part (a) of FIG. 11, the rotating electric machine shown in part (b) of FIG. 11 according to Embodiment 5 of the present invention is configured to place the cooling devices as described above, so that the cooling devices can be made smaller in size and lighter in weight, and also made capable of advancing sufficient heat exchange performance; and as a result, the outer dimensions of the frame 1 can also be made smaller than those in a conventional case as indicated by the broken line, and it is possible to obtain a rotating electric machine that is collectively smaller in size and lighter in weight.

As described above, the rotating electric machine according to Embodiment 5 of the present invention includes the following features.

(1) There included are a first cooling device placed on an upper side above a horizontal surface including an axis line of a stator and on one side with respect to a vertical surface including the axis line, and a second cooling device placed on the upper side above the horizontal surface and on the other side with respect to the vertical surface; and a third cooling device placed on a lower side below the horizontal surface and on one side with respect to the vertical surface, and a fourth cooling device placed on the lower side below the horizontal surface and on the other side with respect to the vertical surface.

(2) The first through fourth cooling devices each include a first end-face portion and a second end-face portion: between the first end-face portion and the second end-face portion of the respective first through fourth cooling devices, one of the end-face portions opposes to an outer circumferential face of the stator along a direction in which the axis line extends, and the other end-face portion opposes to an inner face portion of the frame along a direction in which the axis line extends.

(3) The first and third cooling devices are mutually angled in a circumferential direction of the stator, and interconnected to each other; and the second and fourth cooling devices are mutually angled in the circumferential direction of the stator, and interconnected to each other.

(4) The first through fourth cooling devices are individually provided with the basic configuration of the cooling device of the rotating electric machine according to the present invention described referring to FIG. 1(b).

(5) The frame is formed in a rectangular box shape.

Embodiment 6

Next, the explanation will be made for a rotating electric machine according to Embodiment 6 of the present invention.

FIG. 12(a) and FIG. 12(b) are configuration diagrams illustrating a rotating electric machine according to Embodiment 6 of the present invention; FIG. 12(a) is the configuration diagram illustrating it by a longitudinal section, and FIG. 12(b) is the configuration diagram illustrating it by a cross section.

In FIG. 12(a) and FIG. 12(b), the frame 1 that accommodates the rotor 2 and the stator 4 is formed in a rectangular box shape. The first cooling device 10a is placed on an upper side above a horizontal surface SH including the axis line X of the stator 4 and on one side with respect to a vertical surface SV including the axis line X [at the left side in FIG. 12(b)]. The second cooling device 10b is placed on the upper side above the horizontal surface SH described above and on the other side with respect to the vertical surface SV described above [at the right side in FIG. 12(b)], and is placed interposing an interspace with respect to the first cooling device 10a.

The first cooling device 10a includes the first end-face portion 101 through which the cooling fluid from the frame's internal flow-path 7 flows into the cooling device, and the second end-face portion 102 from which the cooling fluid that has been cooled is outflowed into the frame's internal flow-path 7. The first end-face portion 101 and the second end-face portion 102 are placed in parallel with each other. The first end-face portion 101 is placed tilting with respect to an inflow direction 11 of the cooling fluid. In other words, the first end-face portion is placed tilting with respect to a first orthogonal surface S1 ("S1" in FIG. 1(b)) which is perpendicular to the inflow direction 11 of the cooling fluid. In addition, the second end-face portion 102 of the first cooling device 10a is placed tilting with respect to an outflow direction 12 of the cooling fluid. In other words, the second end-face portion is placed tilting with respect to a second orthogonal surface S2 ("S2" in FIG. 1(b)) which is perpendicular to the outflow direction 12 of the cooling fluid. Moreover, the first and second end-face portions 101 and 102 of the first cooling device 10a are placed tilting with respect to a minimum-width's direction DW of the frame's internal flow-path 7 in vicinity to the cooling device.

The first end-face portion 101 of the first cooling device 10a described above opposes to an outer circumferential face of the stator 4 along a direction in which the axis line X of the stator 4 extends. The second end-face portion 102 opposes to an inner face portion of the frame 1 along a direction in which the axis line X of the stator 4 extends, and also both end-edges of the second end-face portion contact with the inner face portion of the frame 1 so that the end-edges interpose therebetween a corner of the inner face portion of the frame 1.

Meanwhile, the second cooling device 10b includes the first end-face portion 101 through which the cooling fluid from the frame's internal flow-path 7 flows into the cooling device, and the second end-face portion 102 from which the cooling fluid that has been cooled is outflowed into the frame's internal flow-path 7. The first end-face portion 101 and the second end-face portion 102 are placed in parallel with each other. The first end-face portion 101 of the second cooling device 10b is placed tilting with respect to an inflow direction 10 of the cooling fluid. In other words, the first end-face portion is placed tilting with respect to a first orthogonal surface S1 ("S1" in FIG. 1(b)) which is perpendicular to the inflow direction 11 of the cooling fluid. Moreover, the second end-face portion 102 of the second cooling device 10b is placed tilting with respect to an outflow direction 12 of the cooling fluid. In other words, the second end-face portion is placed tilting with respect to a second orthogonal surface S2 ("S2" in FIG. 1(b)) which is perpendicular to the outflow direction 12 of the cooling fluid. Moreover, the first and second end-face portions 101 and 102 of the second cooling device 10b are placed tilting with respect to a minimum-width's direction DW of the frame's internal flow-path 7 in vicinity to the cooling device.

The first end-face portion 101 of the second cooling device 10b described above opposes to the outer circumferential face of the stator 4 along a direction in which the axis line X of the stator 4 extends. The second end-face portion 102 opposes to an inner face portion of the frame 1 along a direction in which the axis line X of the stator 4 extends, and also both end-edges of the second end-face portion contact with the inner face portion of the frame 1 so that the end-edges interpose therebetween a corner of the inner face portion of the frame 1.

The partition plate 110 is mounted to bridge the first cooling device 10a and the second cooling device 10b, so that the first end-face portion 101 and the second end-face portion 102 of each of the cooling devices 10a and 10b are separated to each other so as not to mix a high-temperature cooling fluid from the stator 4 with a low-temperature cooling fluid cooled by each of the cooling devices 10a and 10b.

The first and second cooling devices 10a and 10b each include a plurality of cooling pipes (corresponding to the cooling pipes 107 in FIG. 1(b)) which extend along the respective first end-face portion 101 and second end-face portion 102, connecting therebetween; however, these configurations and other constituent items are equivalent or similar to those shown in FIG. 1(b), and those in Embodiment 1 described above.

In the rotating electric machine configured as described above according to Embodiment 6 of the present invention, a low-temperature cooling fluid cooled by the first and second cooling devices 10a and 10b is transported under pressure from both end portions of the rotor 2 and stator 4 in axial directions thereof by means of cooling fans (not shown in the figures), and flowed into the gap 6. The cooling fluid transported under pressure into the gap 6 flows through the plurality of stator ducts, and outflows into the lower portion of frame's internal flow-path 7 surrounded by the first and second cooling devices 10a and 10b, and the partition plate 110; and subsequently, the cooling fluid flows through the first end-face portion 101 of each of the cooling devices 10a and 10b into the interior of each of the cooling devices 10a and 10b so as to be cooled by the aforementioned cooling pipes, and outflows from the second end-face portion 102 of each of the cooling devices 10a and 10b into the frame's internal flow-path 7 formed at a respective corner of the inner face portion of the frame 1.

The low-temperature cooling fluid outflowed into the frame's internal flow-path 7 formed at the corners of the inner face portion of the frame 1 is for a second time transported under pressure from both end portions of the rotor 2 in axial directions thereof into the gap 6 by means of the cooling fans. By the cooling fluid that circulates in the interior of the frame 1 as described above, the rotor 2, the stator 4 and the stator winding(s) 5 are cooled.

Note that, the circulating direction of the cooling fluid may be adopted so that those directions indicated by the arrows in FIG. 12(*b*) are reversed. In this case, the placement of the first end-face portion 101 and the second end-face portion 102 in each of the first and second cooling devices 10*a* and 10*b* takes a reversed placement with respect to that shown in FIG. 12(*a*) and FIG. 12(*b*), and also directions in which the cooling fluid is transported under pressure by means of the cooling fans are in reversed relation to those described above.

FIG. 13 is an illustrative configuration diagram for explaining the rotating electric machine according to Embodiment 6 of the present invention, in contrast to a conventional rotating electric machine whose cooling devices are placed as shown in FIG. 1(*a*); part (a) of FIG. 13 shows the conventional rotating electric machine, and part (b) of FIG. 13, the rotating electric machine according to Embodiment 6 of the present invention. In comparison with the conventional rotating electric machine shown in part (a) of FIG. 13, the rotating electric machine shown in part (b) of FIG. 13 according to Embodiment 6 of the present invention is configured to place the cooling devices as described above, so that the cooling devices can be made smaller in size and lighter in weight, and also made capable of advancing sufficient heat exchange performance; and as a result, the outer dimensions of the frame 1 can also be made smaller than those in a conventional case as indicated by the broken line, and it is possible to obtain a rotating electric machine that is collectively smaller in size and lighter in weight.

As described above, the rotating electric machine according to Embodiment 6 of the present invention includes the following features.

(1) There included are a first cooling device placed on an upper side above a horizontal surface including an axis-line of a stator and on one side with respect to a vertical surface including the axis line; and a second cooling device placed on the upper side above the horizontal surface and on the other side with respect to the vertical surface, and placed interposing an interspace with respect to the first cooling device.

(2) The first and second cooling devices each include a first end-face portion and a second end-face portion: between the first end-face portion and the second end-face portion of the first cooling device, one of the end-face portions opposes to an outer circumferential face of the stator along a direction in which the axis line extends, and the other end-face portion opposes to an inner face portion of the frame along a direction in which the axis line extends; and, between the first end-face portion and the second end-face portion of the second cooling device, one of the end-face portions opposes to the outer circumferential face of the stator along a direction in which the axis line extends, and the other end-face portion opposes to an inner face portion of the frame along a direction in which the axis line extends.

(3) The first and second cooling devices are individually provided with the basic configuration of the cooling device of the rotating electric machine according to the present invention described referring to FIG. 1(*b*).

(4) The frame is formed in a rectangular box shape.

Embodiment 7

Next, the explanation will be made for a rotating electric machine according to Embodiment 7 of the present invention. The rotating electric machine according to Embodiment 7 of the present invention is a rotating electric machine in which the first and second cooling devices 10*a* and 10*b* in Embodiment 6 described above are individually divided on a set of two basis, so that the machine collectively includes first through fourth cooling devices.

Figure 14A:
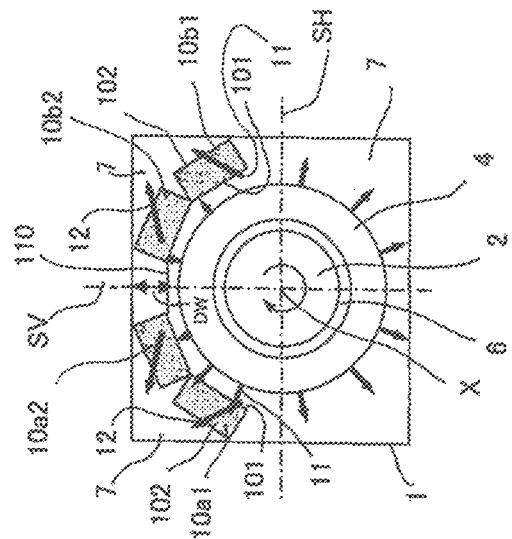
FIG. 14(a) and FIG. 14(b) are configuration diagrams illustrating a rotating electric machine according to Embodiment 7 of the present invention.

FIG. 14(*a*) and FIG. 14(*b*) are configuration diagrams illustrating the rotating electric machine according to Embodiment 7 of the present invention; FIG. 14(*a*) is the configuration diagram illustrating it by a longitudinal section, and FIG. 14(*b*) is the configuration diagram illustrating it by a cross section.

In FIG. 14(*a*) and FIG. 14(*b*), the frame 1 that accommodates the rotor 2 and the stator 4 is formed in a rectangular box shape. The first cooling device 10*a*1 is placed on an upper side above a horizontal surface SH including the axis line X of the stator 4 and on one side with respect to a vertical surface SV including the axis line X [at the left side in FIG. 14(*b*)]. The second cooling device 10*a*2 is placed on the upper side above the horizontal surface SH including the axis line X of the stator 4 and on the aforementioned one side with respect to the vertical surface SV including the axis line X, and is also placed toward the side of the vertical surface SV than the first cooling device 10*a*1. The first and second cooling devices 10*a*1 and 10*a*2 are angled to some extent in a circumferential direction of the stator 4, and interconnected to each other.

The third cooling device 10*b*1 is placed on the upper side above the horizontal surface SH described above and on the other side with respect to the vertical surface SV described above [at the right side in FIG. 14(*b*)]. The fourth cooling device 10*b*2 is placed on the upper side above the horizontal surface SH including the axis line X of the stator 4 and on the aforementioned other side with respect to the vertical surface SV including the axis line X, and is also placed toward the side of the vertical surface SV than the third cooling device 10*b*1. The third and fourth cooling devices 10*b*1 and 10*b*2 are angled to some extent in the circumferential direction of the stator 4, and interconnected to each other.

The first and second cooling devices 10*a*1 and 10*a*2 each include the first end-face portion 101 through which the cooling fluid from the frame's internal flow-path 7 flows into each cooling device, and the second end-face portion 102 from which the cooling fluid that has been cooled is outflowed into the frame's internal flow-path 7. The first end-face portion 101 and the second end-face portion 102 are placed in parallel with each other. The first end-face portion 101 of each of the first and second cooling devices 10*a*1 and 10*a*2 is placed tilting with respect to an inflow direction 11 of the cooling fluid. In other words, the first end-face portion is placed tilting with respect to a first orthogonal surface S1 ("S1" in FIG. 1(*b*)) which is perpendicular to the inflow direction 11 of the cooling fluid. In addition, the second end-face portion 102 of each of the first and second cooling devices 10*a*1 and 10*a*2 is placed tilting with respect to an outflow direction 12 of the cooling fluid. In other words, the second end-face portion is placed tilting with respect to a second orthogonal surface S2 ("S2" in FIG. 1(*b*)) which is perpendicular to the outflow direction 12 of the cooling fluid. Moreover, the first and second end-face portions 101 and 102 of each of the first and second cooling devices 10*a*1 and 10*a*2 are placed tilting with respect to a minimum-width's direction DW of the frame's internal flow-path 7 in vicinity to the cooling devices.

The first end-face portion 101 of each of the first and second cooling devices 10a1 and 10a2 opposes to an outer circumferential face of the stator 4 along a direction in which the axis line X of the stator 4 extends, and each of the second end-face portions 102 opposes to an inner face portion of the frame 1 along a direction in which the axis line X of the stator 4 extends. In addition, one of end-edges on the side in the second end-face portion 102 of each of the first and second cooling devices 10a1 and 10a2 contacts with the inner face portion of the frame 1 so as to interpose a corner of the inner face portion between the end-edges.

Meanwhile, the third and fourth cooling devices 10b1 and 10b2 each include the first end-face portion 101 through which the cooling fluid from the frame's internal flow-path 7 flows into each cooling device, and the second end-face portion 102 from which the cooling fluid that has been cooled is outflowed into the frame's internal flow-path 7. The first end-face portion 101 and the second end-face portion 102 are placed in parallel with each other. The first end-face portion 101 of each of the third and fourth cooling devices 10b1 and 10b2 is placed tilting with respect to an inflow direction 11 of the cooling fluid. In other words, the first end-face portion is placed tilting with respect to a first orthogonal surface S1 ("S1" in FIG. 1(b)) which is perpendicular to the inflow direction 11 of the cooling fluid. Moreover, the second end-face portions 102 of each of the third and fourth cooling devices 10b1 and 10b2 is placed tilting with respect to an outflow direction 12 of the cooling fluid. In other words, the second end-face portions is placed tilting with respect to a second orthogonal surface S2 ("S2" in FIG. 1(b)) which is perpendicular to the outflow direction 12 of the cooling fluid. Moreover, the first and second end-face portions 101 and 102 of each of the third and fourth cooling devices 10b1 and 10b2 are placed tilting with respect to the minimum-width's direction DW of the frame's internal flow-path 7 in vicinity to the cooling devices.

The first end-face portion 101 of each of the first and second cooling devices 10b1 and 10b2 opposes to the outer circumferential face of the stator 4 along a direction in which the axis line X of the stator 4 extends, and each of the second end-face portions 102 opposes to an inner face portion of the frame 1 along a direction in which the axis line X of the stator 4 extends. In addition, one of end-edges on the side in the second end-face portions 102 of each of the first and second cooling devices 10b1 and 10b2 contacts with the inner face portion of the frame 1 so as to interpose a corner of the inner face portion between the end-edges.

The partition plate 110 is mounted to bridge the first and second cooling devices 10a1 and 10a2, and the third and fourth cooling devices 10b1 and 10b2, so that the first end-face portion 101 and the second end-face portion 102 of each of the cooling devices 10a1, 10a2, 10b1 and 10b2 are separated to each other so as not to mix a high-temperature cooling fluid from the stator 4 with a low-temperature cooling fluid cooled by each of the cooling devices 10a1, 10a2, 10b1 and 10b2.

The first through fourth cooling devices 10a1, 10a2, 10b1 and 10b2 each include a plurality of cooling pipes (corresponding to the cooling pipes 107 in FIG. 1(b)) which extend along the respective first end-face portion 101 and second end-face portion 102, connecting therebetween; however, these configurations and other constituent items are equivalent or similar to those shown in FIG. 1(b), and those in Embodiment 1 described above.

In the rotating electric machine configured as described above according to Embodiment 7 of the present invention, a low-temperature cooling fluid cooled by the first through fourth cooling devices 10a1, 10a2, 10b1 and 10b2 is transported under pressure from both end portions of the rotor 2 and stator 4 in axial directions thereof by means of cooling fans (not shown in the figures), and flowed into the gap 6. The cooling fluid transported under pressure into the gap 6 flows through the plurality of stator ducts, and outflows into the lower portion of frame's internal flow-path 7 surrounded by the first through fourth cooling devices 10a1, 10a2, 10b1 and 10b2, and the partition plate 110; and subsequently, the cooling fluid flows through the first end-face portion 101 of each of the cooling devices 10a1, 10a2, 10b1 and 10b2 into the interiors of respective cooling devices so as to be cooled by the aforementioned cooling pipes. And then the cooling fluid outflows from the second end-face portion 102 of each of the first and second cooling devices 10a1 and 10a2 into the frame's internal flow-path 7, and also outflows from the second end-face portion 102 of each of the third and fourth cooling devices 10b1 and 10b2 into the frame's internal flow-path 7.

The low-temperature cooling fluid outflowed into the frame's internal flow-path 7 is for a second time transported under pressure from both end portions of the rotor 2 in axial directions thereof into the gap 6 by means of the cooling fans. By the cooling fluid that circulates in the interior of the frame 1 as described above, the rotor 2, the stator 4 and the stator winding(s) 5 are cooled.

Figure 14B:
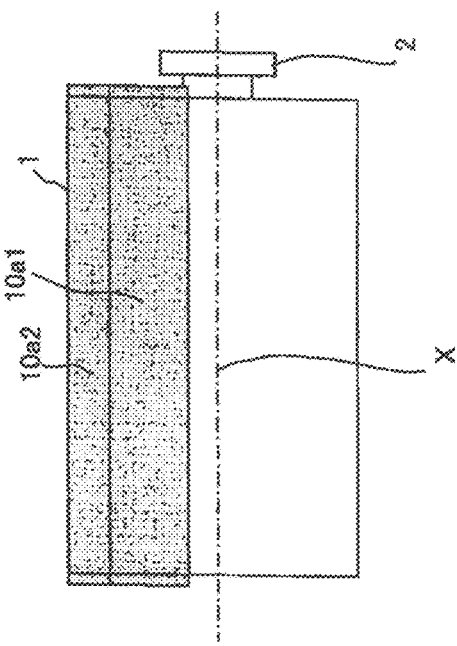

Note that, the circulating direction of the cooling fluid may be adopted so that those directions indicated by the arrows in FIG. 14(b) are reversed. In this case, the placement of the first end-face portion 101 and the second end-face portion 102 in each of the first through fourth cooling devices 10a1, 10a2, 10b1 and 10b2 takes a reversed placement with respect to that shown in FIG. 14(a) and FIG. 14(b), and also directions in which the cooling fluid is transported under pressure by means of the cooling fans are in reversed relation to those described above.

FIG. 15 is an illustrative configuration diagram for explaining the rotating electric machine according to Embodiment 7 of the present invention, in contrast to a conventional rotating electric machine whose cooling devices are placed as shown in FIG. 1(a); part (a) of FIG. 15 shows the conventional rotating electric machine, and part (b) of FIG. 15, the rotating electric machine according to Embodiment 7 of the present invention. In comparison with the conventional rotating electric machine shown in part (a) of FIG. 15, the rotating electric machine shown in part (b) of FIG. 15 according to Embodiment 7 of the present invention is configured to place the cooling devices as described above, so that the cooling devices can be made smaller in size and lighter in weight, and also made capable of advancing sufficient heat exchange performance; and as a result, the outer dimensions of the frame 1 can also be made smaller than those in a conventional case as indicated by the broken line, and it is possible to obtain a rotating electric machine that is collectively smaller in size and lighter in weight.

As described above, the rotating electric machine according to Embodiment 7 of the present invention includes the following features.

(1) There included are a first cooling device and a second cooling device which are placed on an upper side above a horizontal surface including an axis-line of a stator and on one side with respect to a vertical surface including the axis line, and are arranged side by side in a circumferential direction of the stator; and a third cooling device and a fourth cooling device which are placed on the upper side above the horizontal surface and on the other side with respect to the vertical surface, and are arranged side by side in a circumferential direction of the stator.

(2) The first through fourth cooling devices each include a first end-face portion and a second end-face portion: between the first end-face portion and the second end-face portion of the respective first through fourth cooling devices, one of the end-face portions opposes to an outer circumferential face of the stator along a direction in which the axis line extends, and the other end-face portion opposes to an inner face portion of the frame along a direction in which the axis line extends.

(3) The first and second cooling devices are angled in a circumferential direction of the stator and interconnected to each other, and the third and fourth cooling devices are angled in the circumferential direction of the stator and interconnected to each other.

(4) The first through fourth cooling devices are individually provided with the basic configuration of the cooling device of the rotating electric machine according to the present invention described referring to FIG. 1(b).

(5) The frame is formed in a rectangular box shape.

Embodiment 8

Next, the explanation will be made for a rotating electric machine according to Embodiment 8 of the present invention.

Figure 16A:
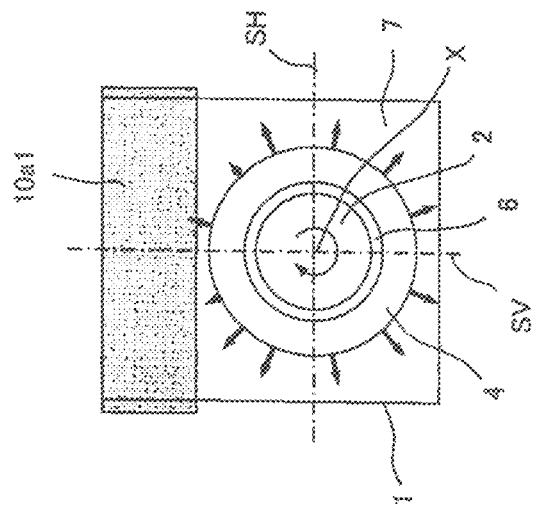
FIG. 16(a) and FIG. 16(b) are configuration diagrams illustrating a rotating electric machine according to Embodiment 8 of the present invention.
Figure 16B:
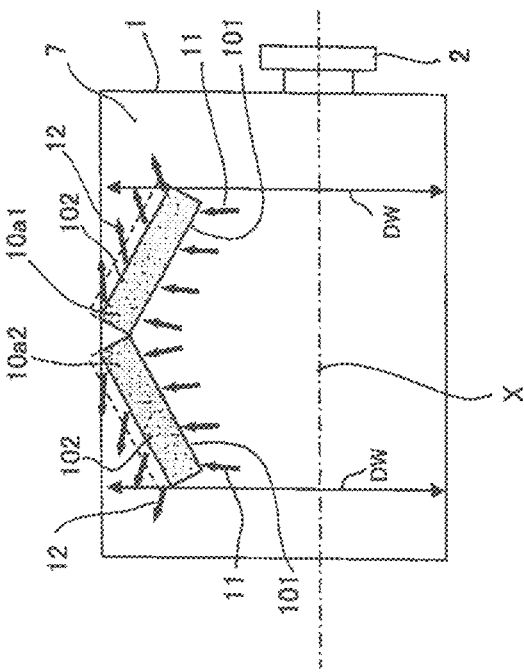

FIG. 16(a) and FIG. 16(b) are configuration diagrams illustrating a rotating electric machine according to Embodiment 8 of the present invention; FIG. 16(a) is the configuration diagram illustrating it by a longitudinal section, and FIG. 16(b) is the configuration diagram illustrating it by a cross section. In FIG. 16(a) and FIG. 16(b), the frame 1 that accommodates the rotor 2 and the stator 4 is formed in a rectangular box shape.

In FIG. 16(a) and FIG. 16(b), the first cooling device 10a1 is placed on an upper side above a horizontal surface SH including the axis line X of the stator 4 and on the upper side above the uppermost portion of an outer circumferential face of a stator 4, and provided with a width-wise dimension equal to a horizontal width of the frame 1. This first cooling device 10a1 is placed tilting with respect to the axis line X of the stator 4. The second cooling device 10a2 is placed on the upper side above the horizontal surface SH described above and on the upper side above the uppermost portion of the outer circumferential face of the stator 4, and provided with a width-wise dimension equal to the horizontal width of the frame 1. This second cooling device 10a2 is placed tilting with respect to the axis line X of the stator 4. The tilting directions of the first and second cooling devices 10a1 and 10a2 are reversed to each other; and the first and second cooling devices 10a1 and 10a2 are angled with respect to a direction in which the axis-line X extends, and interconnected to each other.

The first cooling device 10a1 includes the first end-face portion 101 through which the cooling fluid from the frame's internal flow-path 7 flows into the cooling device, and the second end-face portion 102 from which the cooling fluid that has been cooled is outflowed into the frame's internal flow-path 7. The first end-face portion 101 and the second end-face portion 102 are placed in parallel with each other. The first end-face portion 101 is placed tilting with respect to an inflow direction 11 of the cooling fluid. In other words, the first end-face portion is placed tilting with respect to a first orthogonal surface S1 ("S1" in FIG. 1(b)) which is perpendicular to the inflow direction 11 of the cooling fluid. In addition, the second end-face portion 102 of the first cooling device 10a1 is placed tilting with respect to an outflow direction 12 of the cooling fluid. In other words, the second end-face portion is placed tilting with respect to a second orthogonal surface S2 ("S2" in FIG. 1(b)) which is perpendicular to the outflow direction 12 of the cooling fluid, and one end-edge of the second end-face portion contacts with an inner face portion of the frame 1. Moreover, the first and second end-face portions 101 and 102 of the first cooling device 10a1 are placed tilting with respect to a minimum-width's direction DW of the frame's internal flow-path 7.

The first end-face portion 101 of the first cooling device 10a1 described above opposes to an outer circumferential face of the stator 4 along a direction in which the axis line X of the stator 4 extends, and the second end-face portion 102 opposes to the inner face portion of the frame 1 along a direction in which the axis line X of the stator 4 extends.

Meanwhile, the second cooling device 10a2 includes the first end-face portion 101 through which the cooling fluid from the frame's internal flow-path 7 flows into the cooling device, and the second end-face portion 102 from which the cooling fluid that has been cooled is outflowed into the frame's internal flow-path 7. The first end-face portion 101 and the second end-face portion 102 are placed in parallel with each other. The first end-face portion 101 of the second cooling device 10a2 is placed tilting with respect to a first orthogonal surface S1 ("S1" in FIG. 1(b)) which is perpendicular to the inflow direction 11 of the cooling fluid. Moreover, the second end-face portion 102 of the second cooling device 10a2 is placed tilting with respect to a second orthogonal surface S2 ("S2" in FIG. 1(b)) which is perpendicular to the outflow direction 12 of the cooling fluid, and one end-edge of the second end-face portion contacts with an inner face portion of the frame 1. Furthermore, the first and second end-face portions 101 and 102 of the second cooling device 10a2 are placed tilting with respect to a minimum-width's direction DW of the frame's internal flow-path 7, namely, to an orientation or direction of a frame's internal flow-path width being perpendicular to a direction in which the axis line X of the stator 4 extends.

The first end-face portion 101 of the second cooling device 10a2 described above opposes to the outer circumferential face of the stator 4 along a direction in which the axis line X of the stator 4 extends, and the second end-face portion 102 opposes to the inner face portion of the frame 1 along a direction in which the axis line X of the stator 4 extends.

The first and second cooling devices 10a1 and 10a2 each include a plurality of cooling pipes (corresponding to the cooling pipes 107 in FIG. 1(b)) which extend along the respective first end-face portion 101 and second end-face portion 102, connecting therebetween; however, these configurations and other constituent items are equivalent or similar to those shown in FIG. 1(b), and those in Embodiment 1 described above.

In the rotating electric machine configured as described above according to Embodiment 8 of the present invention, a low-temperature cooling fluid cooled by the first and second cooling devices 10a1 and 10a2 is transported under pressure from both end portions of the rotor 2 and stator 4 in axial directions thereof by means of cooling fans (not shown in the figures), and flowed into the gap 6. The cooling fluid transported under pressure into the gap 6 flows through the plurality of stator ducts, and outflows into the lower portion of frame's internal flow-path 7 below the first and second cooling devices 10a1 and 10a2; and subsequently, the cooling fluid flows, approximately in vertical directions as indicated by the arrows, through the first end-face portion 101 of each of the cooling devices 10a1 and 10a2 into the interiors of respective cooling devices so as to be cooled by the aforementioned cooling pipes, and outflows from the second end-face portion 102 of each of the cooling devices 10a1 and 10a2 into the frame's internal flow-path 7.

The low-temperature cooling fluid outflowed into the frame's internal flow-path 7 formed at the corners of the inner face portion of the frame 1 is for a second time transported under pressure from both end portions of the rotor 2 in axial directions thereof into the gap 6 by means of the cooling fans. By the cooling fluid that circulates in the interior of the frame 1 as described above, the rotor 2, the stator 4 and the stator winding(s) 5 are cooled.

Note that, the circulating direction of the cooling fluid may be adopted so that those directions indicated by the arrows in FIG. 16(a) and FIG. 16(b) are reversed. In this case, the placement of the first end-face portion 101 and the second end-face portion 102 in each of the first and second cooling devices 10a1 and 10a2 takes a reversed placement with respect to that shown in FIG. 16(a) and FIG. 16(b), and also directions in which the cooling fluid is transported under pressure by means of the cooling fans are in reversed relation to those described above.

FIG. 17 is an illustrative configuration diagram for explaining the rotating electric machine according to Embodiment 8 of the present invention, in contrast to a conventional rotating electric machine whose cooling devices are placed as shown in FIG. 1(a); part (a) of FIG. 17 shows the conventional rotating electric machine, and part (b) of FIG. 17, the rotating electric machine according to Embodiment 8 of the present invention. In comparison with the conventional rotating electric machine shown in part (a) of FIG. 17, the rotating electric machine shown in part (b) of FIG. 17 according to Embodiment 8 of the present invention is configured to place the cooling devices as described above, so that sizes of the cooling devices can be made smaller than those in conventional cases as indicated by the broken lines, and as a result, it is possible to obtain a rotating electric machine that includes the cooling devices having high heat exchange performance without increasing the outer dimensions of the frame 1.

As described above, the rotating electric machine according to Embodiment 8 of the present invention includes the following features.
(1) There included are first and second cooling devices placed on an upper side above the uppermost portion of an outer circumferential face of a stator, and arranged side by side in, being angled with respect to, a direction in which an axis-line of the stator extends.
(2) The first and second cooling devices each include a first end-face portion and a second end-face portion: between the first end-face portion and the second end-face portion of the respective first and second cooling devices, one of the end-face portions opposes to an outer circumferential face of the stator, and the other end-face portion opposes to an inner face portion of the frame.
(3) The first and second cooling devices are interconnected to each other in a direction in which the axis-line extends.
(4) The first and second cooling devices are individually provided with the basic configuration of the cooling device of the rotating electric machine according to the present invention described referring to FIG. 1(b).
(5) The frame is formed in a rectangular box shape.

Embodiment 9

Next, the explanation will be made for a rotating electric machine according to Embodiment 9 of the present invention.

Figure 18B:
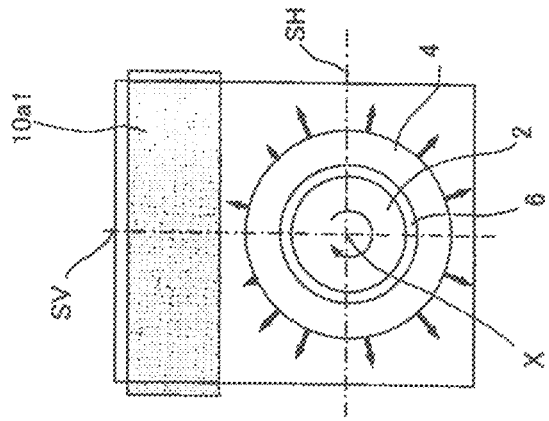
FIG. 18(a) and FIG. 18(b) are configuration diagrams illustrating a rotating electric machine according to Embodiment 9 of the present invention.
Figure 18A:
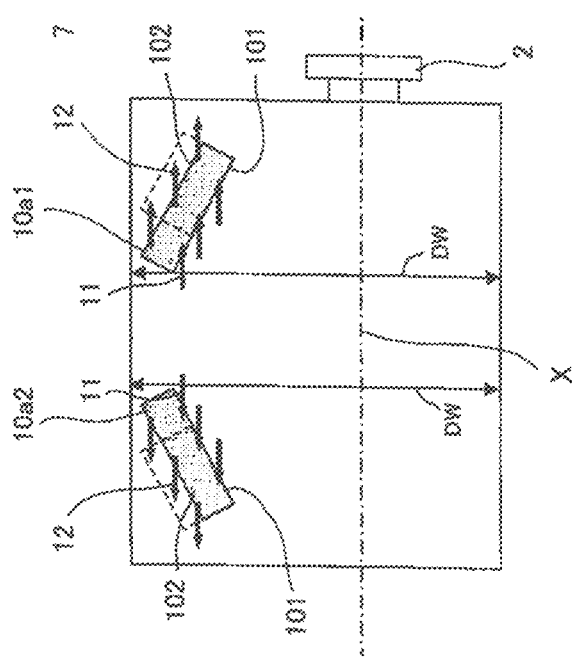

FIG. 18(a) and FIG. 18(b) are configuration diagrams illustrating a rotating electric machine according to Embodiment 9 of the present invention; FIG. 18(a) is the configuration diagram illustrating it by a longitudinal section, and FIG. 18(b) is the configuration diagram illustrating it by a cross section. The rotating electric machine according to Embodiment 9 of the present invention is a rotating electric machine in which the first and second cooling devices of the rotating electric machine in Embodiment 8 are not mutually interconnected, but are separated to each other.

In FIG. 18(a) and FIG. 18(b), the frame 1 that accommodates the rotor 2 and the stator 4 is formed in a rectangular box shape. The first cooling device 10a1 is placed on an upper side above a horizontal surface SH including the axis line X of the stator 4 and on the upper side above the uppermost portion of an outer circumferential face of the stator 4, and provided with a width-wise dimension equal to a horizontal width of the frame 1. This first cooling device 10a1 is placed tilting with respect to the axis line X of the stator 4. The second cooling device 10a2 is placed on the upper side above the horizontal surface SH described above and on the upper side above the uppermost portion of the outer circumferential face of the stator 4, and provided with a width-wise dimension equal to the horizontal width of the frame 1. This second cooling device 10a2 is placed tilting with respect to the axis line X of the stator 4. The tilting directions of the first and second cooling devices 10a1 and 10a2 are reversed to each other. The first and second cooling devices 10a1 and 10a2 are angled with respect to a direction in which the axis-line X extends, and separated to each other.

The first cooling device 10a1 includes the first end-face portion 101 through which the cooling fluid from the frame's internal flow-path 7 flows into the cooling device, and the second end-face portion 102 from which the cooling fluid that has been cooled is outflowed into the frame's internal flow-path 7. The first end-face portion 101 and the second end-face portion 102 are placed in parallel with each other. The first end-face portion 101 is placed tilting with respect to an inflow direction 11 of the cooling fluid. In other words, the first end-face portion is placed tilting with respect to a first orthogonal surface S1 ("S1" in FIG. 1(b)) which is perpendicular to the inflow direction 11 of the cooling fluid. In addition, the second end-face portion 102 of the first cooling device 10a1 is placed tilting with respect to an outflow direction 12 of the cooling fluid. In other words, the second end-face portion is placed tilting with respect to a second orthogonal surface S2 ("S2" in FIG. 1(b)) which is perpendicular to the outflow direction 12 of the cooling fluid. Moreover, the first and second end-face portions 101 and 102 of the first cooling device 10a1 are placed tilting with respect to a minimum-width's direction DW of the frame's internal flow-path 7.

The first end-face portion 101 of the first cooling device 10a1 described above opposes to an outer circumferential face of the stator 4 along a direction in which the axis line X of the stator 4 extends, and the second end-face portion 102 opposes to an inner face portion of the frame 1 along a direction in which the axis line X of the stator 4 extends.

Meanwhile, the second cooling device 10a2 includes the first end-face portion 101 through which the cooling fluid from the frame's internal flow-path 7 flows into the cooling device, and the second end-face portion 102 from which the cooling fluid that has been cooled is outflowed into the frame's internal flow-path 7. The first end-face portion 101 and the second end-face portion 102 are placed in parallel with each other. The first end-face portion 101 of the second cooling device 10a2 is placed tilting with respect to a first orthogonal surface S1 ("S1" in FIG. 1(b)) which is perpendicular to the inflow direction 11 of the cooling fluid. Moreover, the second end-face portion 102 of the second cooling device 10a2 is placed tilting with respect to a second orthogonal surface S2 ("S2" in FIG. 1(b)) which is perpendicular to the outflow direction 12 of the cooling fluid. Furthermore, the first and second end-face portions 101 and 102 of the second cooling device 10a2 are placed tilting with respect to a minimum-width's direction DW of the frame's internal flow-path 7, namely, to an orientation or direction of a frame's internal flow-path width being perpendicular to a direction in which the axis line X of the stator 4 extends.

The first end-face portion 101 of the second cooling device 10a2 described above opposes to the outer circumferential face of the stator 4 along a direction in which the axis line X of the stator 4 extends, and the second end-face portion 102 opposes to an inner face portion of the frame 1 along a direction in which the axis line X of the stator 4 extends.

The first and second cooling devices 10a1 and 10a2 each include a plurality of cooling pipes (corresponding to the cooling pipes 107 in FIG. 1(b)) which extend along the respective first end-face portion 101 and second end-face portion 102, connecting therebetween; however, these configurations and other constituent items are equivalent or similar to those shown in FIG. 1(b), and those in Embodiment 1 described above.

In the rotating electric machine configured as described above according to Embodiment 9 of the present invention, a low-temperature cooling fluid cooled by the first and second cooling devices 10a1 and 10a2 is transported under pressure from both end portions of the rotor 2 and stator 4 in axial directions thereof by means of cooling fans (not shown in the figures), and flowed into the gap 6. The cooling fluid transported under pressure into the gap 6 flows through the plurality of stator ducts, and outflows into the lower portion of frame's internal flow-path 7 below the first and second cooling devices 10a1 and 10a2; and subsequently, the cooling fluid flows, approximately in horizontal directions as indicated by the arrows, through the first end-face portion 101 of each of the cooling devices 10a1 and 10a2 into the interiors of respective cooling devices so as to be cooled by the aforementioned cooling pipes, and outflows from the second end-face portion 102 of each of the cooling devices 10a1 and 10a2 into the frame's internal flow-path 7.

The low-temperature cooling fluid outflowed into the frame's internal flow-path 7 formed at the corners of the inner face portion of the frame 1 is for a second time transported under pressure from both end portions of the rotor 2 in axial directions thereof into the gap 6 by means of the cooling fans. By the cooling fluid that circulates in the interior of the frame 1 as described above, the rotor 2, the stator 4 and the stator winding(s) 5 are cooled.

Note that, the circulating direction of the cooling fluid may be adopted so that those directions indicated by the arrows in FIG. 18(a) and FIG. 18(b) are reversed. In this case, the placement of the first end-face portion 101 and the second end-face portion 102 in each of the first and second cooling devices 10a1 and 10a2 takes a reversed placement with respect to that shown in FIG. 18(a) and FIG. 18(b), and also directions in which the cooling fluid is transported under pressure by means of the cooling fans are in reversed relation to those described above.

FIG. 19 is an illustrative configuration diagram for explaining the rotating electric machine according to Embodiment 9 of the present invention, in contrast to a conventional rotating electric machine whose cooling devices are placed as shown in FIG. 1(a); part (a) of FIG. 19 shows the conventional rotating electric machine, and part (b) of FIG. 19, the rotating electric machine according to Embodiment 9 of the present invention. In comparison with the conventional rotating electric machine shown in part (a) of FIG. 19, the rotating electric machine shown in part (b) of FIG. 19 according to Embodiment 9 of the present invention is configured to place the cooling devices as described above, so that sizes of the cooling devices can be made smaller than those in conventional cases as indicated by the broken lines, and as a result, it is possible to obtain a rotating electric machine that includes the cooling devices having high heat exchange performance without increasing the outer dimensions of the frame 1.

As described above, the rotating electric machine according to Embodiment 9 of the present invention includes the following features.

(1) There included are first and second cooling devices placed on an upper side above the uppermost portion of an outer circumferential face of a stator, and arranged side by side in, being angled with respect to, a direction in which an axis-line of the stator extends.

(2) The first and second cooling devices each include a first end-face portion and a second end-face portion: between the first end-face portion and the second end-face portion of the respective first and second cooling devices, one of the end-face portions opposes to an outer circumferential face of the stator, and the other end-face portion opposes to an inner face portion of the frame.

(3) The first and second cooling devices are separated to each other in a direction in which the axis-line extends.

(4) The first and second cooling devices are individually provided with the basic configuration of the cooling device of the rotating electric machine according to the present invention described referring to FIG. 1(b).

(5) The frame is formed in a rectangular box shape.

Embodiment 10

Next, the explanation will be made for a rotating electric machine according to Embodiment 10 of the present invention.

Figure 20A:
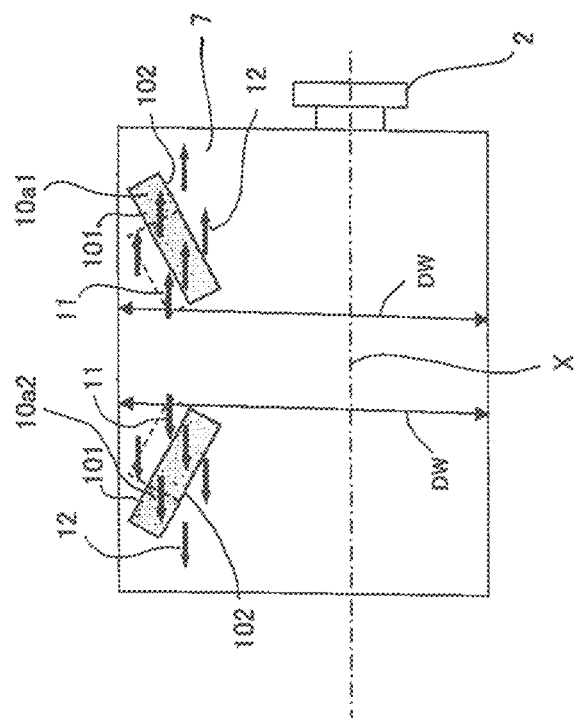
FIG. 20(a) and FIG. 20(b) are configuration diagrams illustrating a rotating electric machine according to Embodiment 10 of the present invention.
Figure 20B:
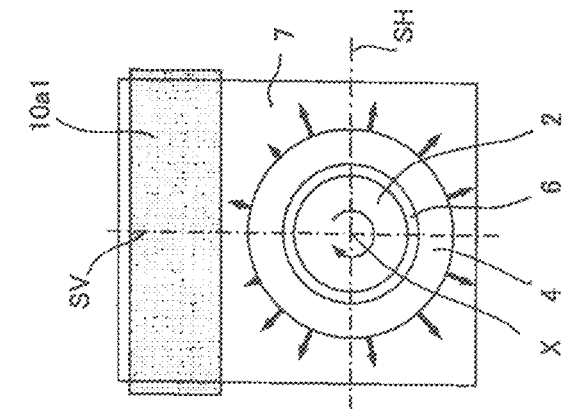

FIG. 20(a) and FIG. 20(b) are configuration diagrams illustrating a rotating electric machine according to Embodiment 10 of the present invention; FIG. 20(a) is the configuration diagram illustrating it by a longitudinal section, and FIG. 20(b) is the configuration diagram illustrating it by a cross section.

In FIG. 20(a) and FIG. 20(b), the frame 1 that accommodates the rotor 2 and the stator 4 is formed in a rectangular box shape. The first cooling device 10a1 is placed on an upper side above a horizontal surface SH including the axis line X of the stator 4 and on the upper side above the uppermost portion of an outer circumferential face of the stator 4, and provided with a width-wise dimension equal to a horizontal width of the frame 1. This first cooling device 10a1 is placed tilting with respect to the axis line X of the stator 4. The second cooling device 10a2 is placed on the upper side above the horizontal surface SH described above and on the upper side above the uppermost portion of the outer circumferential face of the stator 4, and provided with a width-wise dimension equal to the horizontal width of the frame 1. This second cooling device 10a2 is placed tilting with respect to the axis line X of the stator 4. The tilting directions of the first and second cooling devices 10a1 and 10a2 are reversed to each other. The first and second cooling devices 10a1 and 10a2 are angled with respect to a direction in which the axis-line X extends, and separated to each other.

The first cooling device 10a1 includes the first end-face portion 101 through which the cooling fluid from the frame's internal flow-path 7 flows into the cooling device, and the second end-face portion 102 from which the cooling fluid that has been cooled is outflowed into the frame's internal flow-path 7. The first end-face portion 101 and the second end-face portion 102 are placed in parallel with each other. The first end-face portion 101 is placed tilting with respect to an inflow direction 11 of the cooling fluid. In other words, the first end-face portion is placed tilting with respect to a first orthogonal surface S1 ("S1" in FIG. 1(b)) which is perpendicular to the inflow direction 11 of the cooling fluid. In addition, the second end-face portion 102 of the first cooling device 10a1 is placed tilting with respect to an outflow direction 12 of the cooling fluid. In other words, the second end-face portion is placed tilting with respect to a second orthogonal surface S2 ("S2" in FIG. 1(b)) which is perpendicular to the outflow direction 12 of the cooling fluid. Moreover, the first and second end-face portions 101 and 102 of the first cooling device 10a1 are placed tilting with respect to a minimum-width's direction DW of the frame's internal flow-path 7.

The first end-face portion 101 of the first cooling device 10a1 described above opposes to an inner face portion of the frame 1 along a direction in which the axis line X of the stator 4 extends, and the second end-face portion 102 opposes to an outer circumferential face of the stator 4 along a direction in which the axis line X of the stator 4 extends.

Meanwhile, the second cooling device 10a2 includes the first end-face portion 101 through which the cooling fluid from the frame's internal flow-path 7 flows into the cooling device, and the second end-face portion 102 from which the cooling fluid that has been cooled is outflowed into the frame's internal flow-path 7. The first end-face portion 101 and the second end-face portion 102 are placed in parallel with each other. The first end-face portion 101 of the second cooling device 10a2 is placed tilting with respect to an inflow direction 11 of the cooling fluid. In other words, the first end-face portion is placed tilting with respect to a first orthogonal surface S1 ("S1" in FIG. 1(b)) which is perpendicular to the inflow direction 11 of the cooling fluid. Moreover, the second end-face portion 102 of the second cooling device 10a2 is placed tilting with respect to an outflow direction 12 of the cooling fluid. In other words, the second end-face portion is placed tilting with respect to a second orthogonal surface S2 ("S2" in FIG. 1(b)) which is perpendicular to the outflow direction 12 of the cooling fluid. Moreover, the first and second end-face portions 101 and 102 of the second cooling device 10a2 are placed tilting with respect to a minimum-width's direction DW of the frame's internal flow-path 7.

The first end-face portion 101 of the second cooling device 10a2 described above opposes to an inner face portion of the frame 1 along a direction in which the axis line X of the stator 4 extends, and the second end-face portion 102 opposes to the outer circumferential face of the stator 4 along a direction in which the axis line X of the stator 4 extends.

The placement of the first end-face portion 101 and the second end-face portion 102 of each of the first and second cooling devices 10a1 and 10a2 in Embodiment 10 is reversed to that of the first end-face portion 101 and the second end-face portion 102 of each of the first and second cooling devices 10a1 and 10a2 in the case of Embodiment 9 described above.

The first and second cooling devices 10a and 10b each include a plurality of cooling pipes (corresponding to the cooling pipes 107 in FIG. 1(b)) which extend along the respective first end-face portion 101 and second end-face portion 102, connecting therebetween; however, these configurations and other constituent items are equivalent or similar to those shown in FIG. 1(b), and those in Embodiment 1 described above.

In the rotating electric machine configured as described above according to Embodiment 10 of the present invention, a low-temperature cooling fluid cooled by the first and second cooling devices 10a1 and 10a2 is transported under pressure from both end portions of the rotor 2 and stator 4 in axial directions thereof by means of cooling fans (not shown in the figures), and flowed into the gap 6. The cooling fluid transported under pressure into the gap 6 flows through the plurality of stator ducts, and outflows into the lower portion of frame's internal flow-path 7 below the first and second cooling devices 10a1 and 10a2; and subsequently, the cooling fluid flows, approximately in horizontal directions as indicated by the arrows, through the first end-face portion 101 of each of the cooling devices 10a1 and 10a2 into the interiors of respective cooling devices so as to be cooled by the aforementioned cooling pipes, and outflows from the second end-face portion 102 of each of the cooling devices 10a1 and 10a2 into the frame's internal flow-path 7.

The low-temperature cooling fluid outflowed into the frame's internal flow-path 7 is for a second time transported under pressure from both end portions of the rotor 2 in axial directions thereof into the gap 6 by means of the cooling fans. By the cooling fluid that circulates in the interior of the frame 1 as described above, the rotor 2, the stator 4 and the stator winding(s) 5 are cooled.

Note that, the circulating direction of the cooling fluid may be adopted so that those directions indicated by the arrows in FIG. 20(a) and FIG. 20(b) are reversed. In this case, the placement of the first end-face portion 101 and the second end-face portion 102 in each of the first and second cooling devices 10a1 and 10a2 takes a reversed placement with respect to that shown in FIG. 20(a) and FIG. 20(b), and also directions in which the cooling fluid is transported under pressure by means of the cooling fans are in reversed relation to those described above.

FIG. 21 is an illustrative configuration diagram for explaining the rotating electric machine according to Embodiment 10 of the present invention, in contrast to a conventional rotating electric machine whose cooling devices are placed as shown in FIG. 1(a); part (a) of FIG. 21 shows the conventional rotating electric machine, and part (b) of FIG. 21, the rotating electric machine according to Embodiment 10 of the present invention. In comparison with the conventional rotating electric machine shown in part (a) of FIG. 21, the rotating electric machine shown in part (b) of FIG. 21 according to Embodiment 10 of the present invention is configured to place the cooling devices as described above, so that sizes of the cooling devices can be made smaller than those in conventional cases as indicated by the broken lines, and as a result, it is possible to obtain a rotating electric machine that includes the cooling devices having high heat exchange performance without increasing the outer dimensions of the frame 1.

As described above, the rotating electric machine according to Embodiment 10 of the present invention includes the following features.

(1) There included are first and second cooling devices placed on an upper side above the uppermost portion of an outer circumferential face of a stator, and arranged side by side in, being angled with respect to, a direction in which an axis-line of the stator extends.
(2) The first and second cooling devices each include a first end-face portion and a second end-face portion: between the first end-face portion and the second end-face portion of the respective first and second cooling devices, one of the end-face portions opposes to the outer circumferential face of the stator, and the other end-face portion opposes to an inner face portion of the frame.
(3) The first and second cooling devices are separated to each other in a direction in which the axis-line extends.
(4) The first and second cooling devices are individually provided with the basic configuration of the cooling device of the rotating electric machine according to the present invention described referring to FIG. 1(b).
(5) The frame is formed in a rectangular box shape.

Embodiment 11

Next, the explanation will be made for a rotating electric machine according to Embodiment 11 of the present invention.

FIG. 22(a) and FIG. 22(b) are configuration diagrams illustrating a rotating electric machine according to Embodiment 11 of the present invention; FIG. 22(a) is the configuration diagram illustrating it by a longitudinal section, and FIG. 22(b) is the configuration diagram illustrating it by a cross section.

In FIG. 22(a) and FIG. 22(b), the frame 1 that accommodates the rotor 2 and the stator 4 is formed in a rectangular box shape. The first cooling device 10a1 is placed on a lower side below a horizontal surface SH including the axis line X of the stator 4 and on a lower side below the lowermost portion of an outer circumferential face of the stator 4, and provided with a width-wise dimension equal to a horizontal width of the frame 1. This first cooling device 10a1 is placed tilting with respect to the axis line X of the stator 4. The second cooling device 10a2 is placed on the lower side below the horizontal surface SH described above including the axis line X of the stator 4 and on the lower side below the lowermost portion of the outer circumferential face of the stator 4, and provided with a width-wise dimension equal to the horizontal width of the frame 1. This second cooling device 10a2 is placed tilting with respect to the axis line X of the stator 4. The tilting directions of the first and second cooling devices 10a1 and 10a2 are reversed to each other. The first and second cooling devices 10a1 and 10a2 are angled with respect to a direction in which the axis-line X extends, and separated to each other.

The third cooling device 10a3 is placed on the lower side below the horizontal surface SH including the axis line X of the stator 4 and on the lower side below the lowermost portion of the outer circumferential face of the stator 4, and provided with a width-wise dimension equal to the horizontal width of the frame 1. This third cooling device 10a3 is placed tilting with respect to the axis line X of the stator 4. The fourth cooling device 10a4 is placed on the lower side below the horizontal surface SH described above including the axis line X of the stator 4 and on the lower side below the lowermost portion of the outer circumferential face of the stator 4, and provided with a width-wise dimension equal to the horizontal width of the frame 1. This fourth cooling device 10a4 is placed tilting with respect to the axis line X of the stator 4. The tilting directions of the third and fourth cooling devices 10a3 and 10a4 are reversed to each other. The third and fourth cooling devices 10a3 and 10a4 are angled with respect to a direction in which the axis-line X extends, and separated to each other.

A set of the first and second cooling devices 10a1 and 10a2, and that of the third and fourth cooling devices 10a3 and 10a4 described above are placed being separated to each other in a direction in which the axis-line X extends.

The first through fourth cooling devices 10a1, 10a2, 10a3 and 10a4 each include the first end-face portion 101 through which the cooling fluid flows from the frame's internal flow-path 7, and the second end-face portion 102, placed in parallel with this first end-face portion 101, from which the cooling fluid having been cooled outflows into the frame's internal flow-path 7. The first end-face portion 101 is placed tilting with respect to an inflow direction 11 of the cooling fluid. In other words, the first end-face portion is placed tilting with respect to a first orthogonal surface S1 ("S1" in FIG. 1(b)) which is perpendicular to the inflow direction 11 of the cooling fluid. In addition, the second end-face portion 102 is placed tilting with respect to an outflow direction 12 of the cooling fluid. In other words, the second end-face portion is placed tilting with respect to a second orthogonal surface S2 ("S2" in FIG. 1(b)) which is perpendicular to the outflow direction 12 of the cooling fluid. Moreover, the first and second end-face portions 101 and 102 of each of the first through fourth cooling devices 10a1, 10a2, 10a3 and 10a4 are placed tilting with respect to a minimum-width's direction DW of the frame's internal flow-path 7.

The first end-face portion 101 of the first cooling device 10a1 described above opposes to an outer circumferential face of the stator 4 along a direction in which the axis line X of the stator 4 extends, and the second end-face portion 102 opposes to an inner face portion of the frame 1, or to a floor surface side on which the stator 4 is mounted, along a direction in which the axis line X of the stator 4 extends.

The first through fourth cooling devices 10a1, 10a2, 10a3 and 10a4 each include a plurality of cooling pipes (corresponding to the cooling pipes 107 in FIG. 1(b)) which extend along the respective first end-face portion 101 and second end-face portion 102, connecting therebetween; however, these configurations and other constituent items are equivalent or similar to those shown in FIG. 1(b), and those in Embodiment 1 described above.

In the rotating electric machine configured as described above according to Embodiment 11 of the present invention, a low-temperature cooling fluid cooled by the first through fourth cooling devices 10a1, 10a2, 10a3 and 10a4 is transported under pressure from both end portions of the rotor 2 and stator 4 in axial directions thereof by means of cooling fans (not shown in the figures), and flowed into the gap 6. The cooling fluid transported under pressure into the gap 6 flows through the plurality of stator ducts, and outflows into the lower portion of frame's internal flow-path 7 above each of the cooling devices 10a1, 10a2, 10a3 and 10a4; and subsequently, the cooling fluid flows, approximately in vertically downward directions as indicated by the arrows, through the first end-face portion 101 of each of the cooling devices 10a1, 10a2, 10a3 and 10a4 into the interiors of respective cooling devices so as to be cooled by the aforementioned cooling pipes, and outflows, correspondingly in vertically downward directions, from the second end-face portion 102 of each of the cooling devices 10a1, 10a2, 10a3 and 10a4 into the frame's internal flow-path 7.

The low-temperature cooling fluid outflowed into the frame's internal flow-path 7 is for a second time transported under pressure from both end portions of the rotor 2 in axial directions thereof into the gap 6 by means of the cooling fans. By the cooling fluid that circulates in the interior of the frame 1 as described above, the rotor 2, the stator 4 and the stator winding(s) 5 are cooled.

Note that, the circulating direction of the cooling fluid may be adopted so that those directions indicated by the arrows in FIG. 22(a) and FIG. 22(b) are reversed. In this case, the placement of the first end-face portion 101 and the second end-face portion 102 in each of the first through fourth cooling devices 10a1, 10a2, 10a3 and 10a4 takes a reversed placement with respect to that shown in FIG. 22(a) and FIG. 22(b), and also directions in which the cooling fluid is transported under pressure by means of the cooling fans are in reversed relation to those described above.

FIG. 23 is an illustrative configuration diagram for explaining the rotating electric machine according to Embodiment 11 of the present invention, in contrast to a conventional rotating electric machine whose cooling devices are placed as shown in FIG. 1(a); part (a) of FIG. 23 shows the conventional rotating electric machine, and part (b) of FIG. 23, the rotating electric machine according to Embodiment 11 of the present invention. In comparison with the conventional rotating electric machine shown in part (a) of FIG. 23, the rotating electric machine shown in part (b) of FIG. 23 according to Embodiment 11 of the present invention is configured to place the cooling devices as described above, so that it is possible to obtain a rotating electric machine that includes the cooling devices having high heat exchange performance without increasing the outer dimensions of the frame 1.

As described above, the rotating electric machine according to Embodiment 11 of the present invention includes the following features.
(1) There included are first through fourth cooling devices placed on a lower side below the lowermost portion of an outer circumferential face of a stator, and arranged side by side in, being angled with respect to, a direction in which an axis-line of the stator extends.
(2) The first through fourth cooling devices each include a first end-face portion and a second end-face portion: between the first end-face portion and the second end-face portion of the respective first through fourth cooling devices, one of the end-face portions opposes to an outer circumferential face of the stator along a direction in which the axis line extends, and the other end-face portion opposes to a floor surface side on which the stator is mounted along a direction in which the axis line extends.
(3) The first and second cooling devices are interconnected to each other in a direction in which the axis-line extends, and also the third and fourth cooling devices are interconnected to each other in a direction in which the axis-line extends.
(4) A set of the first and second cooling devices, and that of the third and fourth cooling devices are placed being separated to each other in a direction in which the axis-line extends.
(5) The first through fourth cooling devices are individually provided with the basic configuration of the cooling device of the rotating electric machine according to the present invention described referring to FIG. 1(b).
(6) The frame is formed in a rectangular box shape.

Embodiment 12

Next, the explanation will be made for a rotating electric machine according to Embodiment 12 of the present invention.

Figure 24B:
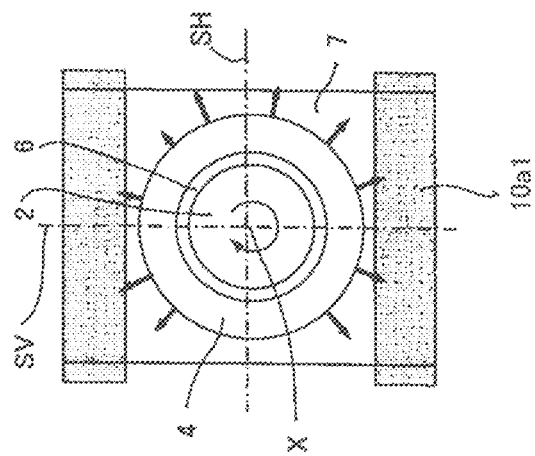
FIG. 24(a) and FIG. 24(b) are configuration diagrams illustrating a rotating electric machine according to Embodiment 12 of the present invention.
Figure 24A:
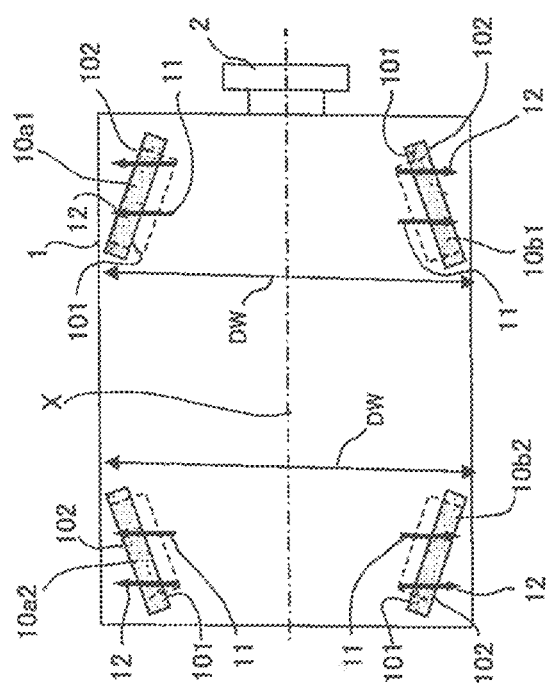
Figure 29:
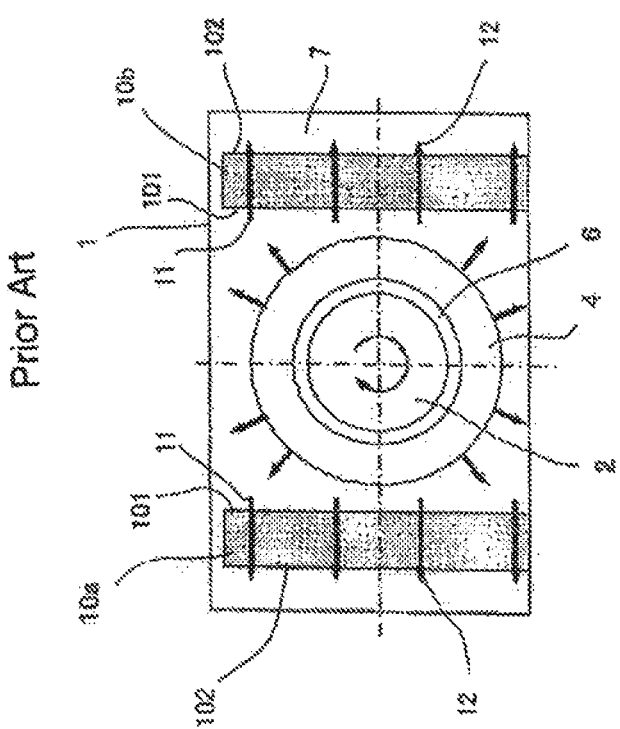
FIG. 29 is a configuration diagram illustrating another conventional rotating electric machine.

FIG. 24(a) and FIG. 24(b) are configuration diagrams illustrating a rotating electric machine according to Embodiment 12 of the present invention; FIG. 24(a) is the configuration diagram illustrating it by a longitudinal section, and FIG. 24(b) is the configuration diagram illustrating it by a cross section.

In FIG. 24(a) and FIG. 24(b), the frame 1 that accommodates the rotor 2 and the stator 4 is formed in a rectangular box shape. The first cooling device 10a1 is placed on an upper side above a horizontal surface SH including the axis line X of the stator 4 and on the upper side above the uppermost portion of an outer circumferential face of the stator 4, and provided with a width-wise dimension equal to a horizontal width of the frame 1. This first cooling device 10a1 is placed tilting with respect to the axis line X of the stator 4. The second cooling device 10a2 is placed on the upper side above the horizontal surface SH described above and on the upper side above the uppermost portion of the outer circumferential face of the stator 4, and provided with a width-wise dimension equal to the horizontal width of the frame 1. This second cooling device 10a2 is placed tilting with respect to the axis line X of the stator 4. The tilting directions of the first and second cooling devices 10a1 and 10a2 are reversed to each other. In addition, the first and second cooling devices 10a1 and 10a2 are angled with respect to a direction in which the axis-line X extends, and separated to each other.

The first and second cooling devices 10a1 and 10a2 each include the first end-face portion 101 through which the cooling fluid from the frame's internal flow-path 7 flows into each cooling device, and the second end-face portion 102 from which the cooling fluid that has been cooled is outflowed into the frame's internal flow-path 7. The first end-face portion 101 and the second end-face portion 102 are placed in parallel with each other. The first end-face portion 101 is placed tilting with respect to an inflow direction 11 of the cooling fluid. In other words, the first end-face portion is placed tilting with respect to a first orthogonal surface S1 ("S1" in FIG. 1(b)) which is perpendicular to the inflow direction 11 of the cooling fluid. In addition, the second end-face portion 102 of each of the first and second cooling devices 10a1 and 10a2 is placed tilting with respect to an outflow direction 12 of the cooling fluid. In other words, the second end-face portion is placed tilting with respect to a second orthogonal surface S2 ("S2" in FIG. 1(b)) which is perpendicular to the outflow direction 12 of the cooling fluid. Moreover, the first and second end-face portions 101 and 102 of each of the first and second cooling devices 10a1 and 10a2 are placed tilting with respect to a minimum-width's direction DW of the frame's internal flow-path 7.

The first end-face portion 101 of each of the first and second cooling devices 10a1 and 10a2 described above opposes to an outer circumferential face of the stator 4 along a direction in which the axis line X of the stator 4 extends, and their second end-face portion 102 opposes to an inner face portion of the frame 1 along a direction in which the axis line X of the stator 4 extends.

The third cooling device 10b1 is placed on a lower side below a horizontal surface SH including the axis line X of the stator 4 and on a lower side below the lowermost portion of an outer circumferential face of the stator 4, and provided with a width-wise dimension equal to a horizontal width of the frame 1. This third cooling device 10b1 is placed tilting with respect to the axis line X of the stator 4. The fourth cooling device 10b2 is placed on the lower side below the horizontal surface SH described above including the axis line X of the stator 4 and on the lower side below the lowermost portion of the outer circumferential face of the stator 4, and provided with a width-wise dimension equal to the horizontal width of the frame 1. This fourth cooling device 10*b*2 is placed tilting with respect to the axis line X of the stator 4. The tilting directions of the third and fourth cooling devices 10*b*1 and 10*b*2 are reversed to each other. In addition, the third and fourth cooling devices 10*b*1 and 10*b*2 are angled with respect to a direction in which the axis-line X extends, and separated to each other.

The third and fourth cooling devices 10*b*1 and 10*b*2 each include the first end-face portion 101 through which the cooling fluid from the frame's internal flow-path 7 flows into each cooling device, and the second end-face portion 102 from which the cooling fluid that has been cooled is outflowed into the frame's internal flow-path 7. The first end-face portion 101 and the second end-face portion 102 are placed in parallel with each other. The first end-face portion 101 of each of the third and fourth cooling devices 10*b*1 and 10*b*2 is placed tilting with respect to an inflow direction 11 of the cooling fluid. In other words, the first end-face portion is placed tilting with respect to a first orthogonal surface S1 ("S1" in FIG. 1(*b*)) which is perpendicular to the inflow direction 11 of the cooling fluid. In addition, the second end-face portion 102 of each of the third and fourth cooling devices 10*b*1 and 10*b*2 is placed tilting with respect to an outflow direction 12 of the cooling fluid. In other words, the second end-face portion is placed tilting with respect to a second orthogonal surface S2 ("S2" in FIG. 1(*b*)) which is perpendicular to the outflow direction 12 of the cooling fluid. Moreover, the first and second end-face portions 101 and 102 of each of the third and fourth cooling devices 10*b*1 and 10*b*2 are placed tilting with respect to a minimum-width's direction DW of the frame's internal flow-path 7.

The first end-face portion 101 of each of the third and fourth cooling devices 10*b*1 and 10*b*2 described above opposes to the outer circumferential face of the stator 4 along a direction in which the axis line X of the stator 4 extends, and their second end-face portion 102 opposes to an inner face portion of the frame 1, or to a floor surface side on which the stator 4 is mounted, along a direction in which the axis line X of the stator 4 extends. The first through fourth cooling devices 10*a*1, 10*a*2, 10*b*1 and 10*b*2 each include a plurality of cooling pipes (corresponding to the cooling pipes 107 in FIG. 1(*b*)) which extend along the respective first end-face portion 101 and second end-face portion 102, connecting therebetween; however, these configurations and other constituent items are equivalent or similar to those shown in FIG. 1(*b*), and those in Embodiment 1 described above.

In the rotating electric machine configured as described above according to Embodiment 12 of the present invention, a low-temperature cooling fluid cooled by the first through fourth cooling devices 10*a*1, 10*a*2, 10*b*1 and 10*b*2 is transported under pressure from both end portions of the rotor 2 and stator 4 in axial directions thereof by means of cooling fans (not shown in the figures), and flowed into the gap 6. The cooling fluid transported under pressure into the gap 6 flows through the plurality of stator ducts, and outflows into the lower portion of frame's internal flow-path 7 below the first and second cooling devices 10*a*1 and 10*a*2 and also outflows into the upper portion of frame's internal flow-path 7 above the third and fourth cooling devices 10*b*1 and 10*b*2; the cooling fluid flows, approximately in vertical directions as indicated by the arrows, through the first end-face portion 101 of each of the cooling devices 10*a*1, 10*a*2, 10*b*1 and 10*b*2 into the interiors of respective cooling devices so as to be cooled by the aforementioned cooling pipes, and correspondingly outflows from the second end-face portion 102 of each of the cooling devices 10*a*1, 10*a*2, 10*b*1 and 10*b*2 into the frame's internal flow-path 7.

The low-temperature cooling fluid outflowed into the frame's internal flow-path 7 is for a second time transported under pressure from both end portions of the rotor 2 in axial directions thereof into the gap 6 by means of the cooling fans. By the cooling fluid that circulates in the interior of the frame 1 as described above, the rotor 2, the stator 4 and the stator winding(s) 5 are cooled.

Note that, the circulating direction of the cooling fluid may be adopted so that those directions indicated by the arrows in FIG. 24(*a*) and FIG. 24(*b*) are reversed. In this case, the placement of the first end-face portion 101 and the second end-face portion 102 in each of the first through fourth cooling devices 10*a*1, 10*a*2, 10*b*1 and 10*b*2 takes a reversed placement with respect to that shown in FIG. 24(*a*) and FIG. 24(*b*), and also directions in which the cooling fluid is transported under pressure by means of the cooling fans are in reversed relation to those described above.

FIG. 25 is an illustrative configuration diagram for explaining the rotating electric machine according to Embodiment 12 of the present invention, in contrast to a conventional rotating electric machine whose cooling devices are placed as shown in FIG. 1(*a*); part (a) of FIG. 25 shows the conventional rotating electric machine, and part (b) of FIG. 25, the rotating electric machine according to Embodiment 12 of the present invention. In comparison with the conventional rotating electric machine shown in part (a) of FIG. 25, the rotating electric machine shown in part (b) of FIG. 25 according to Embodiment 12 of the present invention is configured to place the cooling devices as described above, so that sizes of the cooling devices can be made smaller than those in conventional cases as indicated by the broken lines, and as a result, it is possible to obtain a rotating electric machine that includes the cooling devices having high heat exchange performance without increasing the outer dimensions of the frame 1.

As described above, the rotating electric machine according to Embodiment 12 of the present invention includes the following features.

(1) There included are first and second cooling devices placed on an upper side above the uppermost portion of an outer circumferential face of a stator, and arranged side by side in, being angled with respect to, a direction in which an axis-line of the stator extends; and third and fourth cooling devices placed on a lower side below the lowermost portion of the outer circumferential face of the stator, and arranged side by side in, being angled with respect to, a direction in which the axis-line of the stator extends.

(2) The first through fourth cooling devices each include a first end-face portion and a second end-face portion: between the first end-face portion and the second end-face portion of the respective first and second cooling devices, one of the end-face portions opposes to an outer circumferential face of the stator along a direction in which the axis line extends, and the other end-face portion opposes to an inner face portion of the frame along a direction in which the axis line extends; and between the first end-face portion and the second end-face portion of the respective third and fourth cooling devices, one of the end-face portions opposes to the outer circumferential face of the stator along a direction in which the axis line extends, and the other end-face portion opposes to an inner face portion of the frame, or to a floor surface side on which the stator is mounted, along a direction in which the axis line extends.
(3) The first and second cooling devices are separated to each other in a direction in which the axis-line extends, and also the third and fourth cooling devices are separated to each other in a direction in which the axis-line extends.
(4) The first through fourth cooling devices are individually provided with the basic configuration of the cooling device of the rotating electric machine according to the present invention described referring to FIG. 1(b).
(5) The frame is formed in a rectangular box shape.

Embodiment 13

Next, the explanation will be made for a rotating electric machine according to Embodiment 13 of the present invention.

FIG. 26(a) and FIG. 26(b) are configuration diagrams illustrating a rotating electric machine according to Embodiment 13 of the present invention; FIG. 26(a) is the configuration diagram illustrating it by a longitudinal section, and FIG. 26(b) is the configuration diagram illustrating it by a cross section.

In FIG. 26(a) and FIG. 26(b), the frame 1 that accommodates the rotor 2 and the stator 4 is formed in a rectangular box shape. The first cooling device 10a1 is placed on an upper side above a horizontal surface SH including the axis line X of the stator 4 and on the upper side above the uppermost portion of an outer circumferential face of the stator 4, and provided with a width-wise dimension equal to a horizontal width of the frame 1. This first cooling device 10a1 is placed tilting with respect to the axis line X of the stator 4. The second cooling device 10a2 is placed on the upper side above the horizontal surface SH described above and on the upper side above the uppermost portion of the outer circumferential face of the stator 4, and provided with a width-wise dimension equal to the horizontal width of the frame 1. This second cooling device 10a2 is placed tilting with respect to the axis line X of the stator 4. The tilting directions of the first and second cooling devices 10a1 and 10a2 are reversed to each other. In addition, the first and second cooling devices 10a1 and 10a2 are angled with respect to a direction in which the axis-line X extends, and separated to each other.

The first and second cooling devices 10a1 and 10a2 each include the first end-face portion 101 through which the cooling fluid from the frame's internal flow-path 7 flows into each cooling device, and the second end-face portion 102 from which the cooling fluid that has been cooled is outflowed into the frame's internal flow-path 7. The first end-face portion 101 and the second end-face portion 102 are placed in parallel with each other. The first end-face portion 101 of each of the first and second cooling devices 10a1 and 10a2 is placed tilting with respect to an inflow direction 11 of the cooling fluid. In other words, the first end-face portion is placed tilting with respect to a first orthogonal surface S1 ("S1" in FIG. 1(b)) which is perpendicular to the inflow direction 11 of the cooling fluid. In addition, the second end-face portion 102 of each of the first and second cooling devices 10a1 and 10a2 is placed tilting with respect to an outflow direction 12 of the cooling fluid. In other words, the second end-face portion is placed tilting with respect to a second orthogonal surface S2 ("S2" in FIG. 1(b)) which is perpendicular to the outflow direction 12 of the cooling fluid. Moreover, the first and second end-face portions 101 and 102 of each of the first and second cooling devices 10a1 and 10a2 are placed tilting with respect to a minimum-width's direction DW of the frame's internal flow-path 7.

The first end-face portion 101 of each of the first and second cooling devices 10a1 and 10a2 described above oppose to an outer circumferential face of the stator 4 along a direction in which the axis line X of the stator 4 extends, and their second end-face portion 102 oppose to an inner face portion of the frame 1 along a direction in which the axis line X of the stator 4 extends.

The third cooling device 10b1 is placed on a lower side below a horizontal surface SH including the axis line X of the stator 4 and on a lower side below the lowermost portion of an outer circumferential face of the stator 4, and provided with a width-wise dimension equal to a horizontal width of the frame 1. This third cooling device 10b1 is placed tilting with respect to the axis line X of the stator 4. The fourth cooling device 10b2 is placed on the lower side below the horizontal surface SH described above including the axis line X of the stator 4 and on the lower side below the lowermost portion of the outer circumferential face of the stator 4, and provided with a width-wise dimension equal to the horizontal width of the frame 1. This fourth cooling device 10b2 is placed tilting with respect to the axis line X of the stator 4. The tilting directions of the third and fourth cooling devices 10b1 and 10b2 are reversed to each other. In addition, the third and fourth cooling devices 10b1 and 10b2 are angled with respect to a direction in which the axis-line X extends, and separated to each other.

The third and fourth cooling devices 10b1 and 10b2 each includes the first end-face portion 101 through which the cooling fluid from the frame's internal flow-path 7 flows into the cooling device, and the second end-face portion 102 from which the cooling fluid that has been cooled is outflowed into the frame's internal flow-path 7. The first end-face portion 101 and the second end-face portion 102 are placed in parallel with each other. The first end-face portion 101 of each of the third and fourth cooling devices 10b1 and 10b2 is placed tilting with respect to an inflow direction 11 of the cooling fluid. In other words, the first end-face portion is placed tilting with respect to a first orthogonal surface S1 ("S1" in FIG. 1(b)) which is perpendicular to the inflow direction 11 of the cooling fluid. In addition, the second end-face portion 102 of each of the third and fourth cooling devices 10b1 and 10b2 is placed tilting with respect to an outflow direction 12 of the cooling fluid. In other words, the second end-face portion is placed tilting with respect to a second orthogonal surface S2 ("S2" in FIG. 1(b)) which is perpendicular to the outflow direction 12 of the cooling fluid. Moreover, the first and second end-face portions 101 and 102 of each of the third and fourth cooling devices 10b1 and 10b2 are placed tilting with respect to a minimum-width's direction DW of the frame's internal flow-path 7.

The first end-face portions 101 of the third and fourth cooling devices 10b1 and 10b2 described above oppose to the outer circumferential face of the stator 4 along a direction in which the axis line X of the stator 4 extends, and their second end-face portions 102 oppose to an inner face portion of the frame 1, or to a floor surface side on which the stator 4 is mounted, along a direction in which the axis line X of the stator 4 extends.

The first through fourth cooling devices 10a1, 10a2, 10b1 and 10b2 each include a plurality of cooling pipes (corresponding to the cooling pipes 107 in FIG. 1(b)) which extend along the respective first end-face portion 101 and second end-face portion 102, connecting therebetween;

however, these configurations and other constituent items are equivalent or similar to those shown in FIG. 1(b), and those in Embodiment 1 described above.

In the rotating electric machine configured as described above according to Embodiment 13 of the present invention, a low-temperature cooling fluid cooled by the first through fourth cooling devices 10a1, 10a2, 10b1 and 10b2 flows from the outer circumferential face of the stator 4 into the gap 6 by way of the plurality of stator ducts, and outflows, under suction by means of cooling fans (not shown in the figures), from the gap 6 into the frame's internal flow-path 7 by way of both end portions of the rotor 2 and stator 4 in axial directions thereof. The high-temperature cooling fluid outflowed into the frame's internal flow-path 7 flows into each of the cooling devices 10a1, 10a2, 10b1 and 10b2 through their first end-face portions 101 in the directions of arrows so as to be cooled by the aforementioned cooling pipes, and correspondingly outflows from the second end-face portions 102 of the respective cooling devices 10a1, 10a2, 10b1 and 10b2 into the frame's internal flow-path 7.

The low-temperature cooling fluid outflowed into the frame's internal flow-path 7 flows for a second time from the outer circumferential face of the stator 4 into the gap 6 by way of the plurality of stator ducts. By the cooling fluid that circulates in the interior of the frame 1 as described above, the rotor 2, the stator 4 and the stator winding(s) 5 are cooled.

Note that, the circulating direction of the cooling fluid may be adopted so that those directions indicated by the arrows in FIG. 26(a) and FIG. 26(b) are reversed. In this case, the placement of the first end-face portion 101 and the second end-face portion 102 in each of the first through fourth cooling devices 10a1, 10a2, 10b1 and 10b2 takes a reversed placement with respect to that shown in FIG. 26(a) and FIG. 26(b), and also directions in which the cooling fluid is transported under pressure by means of the cooling fans are in reversed relation to those described above.

FIG. 27 is an illustrative configuration diagram for explaining the rotating electric machine according to Embodiment 13 of the present invention, in contrast to a conventional rotating electric machine whose cooling devices are placed as shown in FIG. 1(a); part (a) of FIG. 27 shows the conventional rotating electric machine, and part (b) of FIG. 27, the rotating electric machine according to Embodiment 13 of the present invention. In comparison with the conventional rotating electric machine shown in part (a) of FIG. 27, the rotating electric machine shown in part (b) of FIG. 27 according to Embodiment 13 of the present invention is configured to place the cooling devices as described above, so that sizes of the cooling devices can be made smaller than those in conventional cases as indicated by the broken lines, and as a result, it is possible to obtain a rotating electric machine that includes the cooling devices having high heat exchange performance without increasing the outer dimensions of the frame 1.

As described above, the rotating electric machine according to Embodiment 13 of the present invention includes the following features.

(1) There included are first and second cooling devices placed on an upper side above the uppermost portion of an outer circumferential face of a stator, and arranged side by side in, being angled with respect to, a direction in which an axis-line of the stator extends; and third and fourth cooling devices placed on a lower side below the lowermost portion of the outer circumferential face of the stator, and arranged side by side in, being angled with respect to, a direction in which the axis-line of the stator extends.

(2) The first through fourth cooling devices each include a first end-face portion and a second end-face portion: between the first end-face portion and the second end-face portion of the respective first and second cooling devices, one of the end-face portions opposes to an outer circumferential face of the stator along a direction in which the axis line extends, and the other end-face portion opposes to an inner face portion of the frame along a direction in which the axis line extends; and, between the first end-face portion and the second end-face portion of the respective third and fourth cooling devices, one of the end-face portions opposes to the outer circumferential face of the stator along a direction in which the axis line extends, and the other end-face portion opposes to an inner face portion of the frame, or to a floor surface side on which the stator is mounted, along a direction in which the axis line extends.

(3) The first and second cooling devices are separated to each other in a direction in which the axis-line extends, and also the third and fourth cooling devices are separated to each other in a direction in which the axis-line extends.

(4) The first through fourth cooling devices are individually provided with the basic configuration of the cooling device of the rotating electric machine according to the present invention described referring to FIG. 1(b).

(5) The frame is formed in a rectangular box shape.

Note that, in each of the embodiments described above, it may be possible that the cooling fluid sealed within the frame is a hydrogen gas; however the fluid is not limited to it, and another cooling fluid may be adopted. In addition, the frame is not limited to the cylindrical shape or box shape as described above, but other shapes may be adopted.

Moreover, in the present invention, each of the embodiments can be freely combined, appropriately modified and/or eliminated without departing from the scope of the invention.

INDUSTRIAL APPLICABILITY

The rotating electric machine according to the present invention can be utilized in a field of rotating electric machines such as motors and generators, and particularly in the field of large-size rotating electric machine (s) installed on a floor surface.

EXPLANATION OF NUMERALS AND SYMBOLS

Numeral "1" designates a frame; "2," rotor; "4," stator; "5," stator winding; "6," gap;
"7," "71," "72," frame's internal flow-path; "8," stator duct; "91," "92," cooling fan; "10a," "10a1," "10a2," "10a3," "10a4," "10b," "10b1," "10b2," cooling device;
"101," first end-face portion; "102," second end-face portion; "103," "104," header;
"105," inflow pipe; "106," outflow pipe; "107," cooling pipe; and "110," "111," partition plate.

What is claimed is:
1. A rotating electric machine comprising:
a rotor supported being rotationally movable;
a stator including an inner circumferential face opposing to an outer circumferential face of the rotor by means of a gap therebetween;
a frame accommodating in an interior thereof the rotor and the stator, and forming a frame's internal flow-path on an inner peripheral surface of the frame that faces and covers at least a portion of an outer circumferential face of the stator; and at least one cooling device placed in the frame's internal flow-path, for cooling a cooling fluid sealed in the frame's internal flow-path; the rotating electric machine characterized in that the at least one cooling device includes a first end-face portion through which the cooling fluid flows into the at least one cooling device, and a second end-face portion formed at a position opposing to the first end-face portion, for flowing the cooling fluid, being cooled, out of the at least one cooling device; and at least one of the following first item (1) and second item (2) is included:

(1) between the first end-face portion and the second end-face portion, at least one of the end-face portions is placed tilting with respect to a minimum-width's direction of the frame's internal flow-path adjacent to the at least one cooling device; and (2) between the first end-face portion and the second end-face portion, at least one of the end-face portions is placed tilting with respect to at least one of an inflow direction of the cooling fluid and an outflow direction of the cooling fluid.

2. The rotating electric machine as set forth in claim 1, wherein the at least one cooling device comprises a first cooling device placed on an upper side above a horizontal surface including an axis-line of the stator and on one side with respect to a vertical surface including the axis line, and a second cooling device placed on the upper side above the horizontal surface and on the other side with respect to the vertical surface, placed interposing an interspace with respect to the first cooling device; and the first and second cooling devices each include the first end-face portion and the second end-face portion:

between the first end-face portion and the second end-face portion of the first cooling device, one of the end-face portions opposes to an outer circumferential face of the stator along a direction in which the axis-line extends, and the other end-face portion opposes to an inner face portion of the frame along a direction in which the axis-line extends; and between the first end-face portion and the second end-face portion of the second cooling device, one of the end-face portions opposes to an outer circumferential face of the stator along a direction in which the axis-line extends, and the other end-face portion opposes to an inner face portion of the frame along a direction in which the axis-line extends.

3. The rotating electric machine as set forth in claim 1, wherein the at least one cooling device comprises a first cooling device and a second cooling device which are placed on an upper side above a horizontal surface including an axis line of the stator and on one side with respect to a vertical surface including the axis line, and are arranged side by side in a circumferential direction of the stator, and a third cooling device and a fourth cooling device which are placed on the upper side above the horizontal surface and on the other side with respect to the vertical surface, and are arranged side by side in a circumferential direction of the stator; and the first through fourth cooling devices each include the first end-face portion and the second end-face portion:

between the first end-face portion and the second end-face portion of the respective first through fourth cooling devices, one of the end-face portions opposes to an outer circumferential face of the stator along a direction in which the axis-line extends, and the other end-face portion opposes to an inner face portion of the frame along a direction in which the axis-line extends.

4. The rotating electric machine as set forth in claim 3, wherein the first and second cooling devices are angled in a circumferential direction of the stator, and interconnected to each other; and the third and fourth cooling devices are angled in a circumferential direction of the stator, and interconnected to each other.

5. The rotating electric machine as set forth in claim 1, wherein the at least one cooling device comprises a first cooling device placed on an upper side above a horizontal surface including an axis line of the stator and on one side with respect to a vertical surface including the axis line, a second cooling device placed on the upper side above the horizontal surface and on the other side with respect to the vertical surface, a third cooling device placed on a lower side below the horizontal surface and on one side with respect to the vertical surface, and a fourth cooling device placed on the lower side below the horizontal surface and on the other side with respect to the vertical surface; and the first through fourth cooling devices each include the first end-face portion and the second end-face portion:

between the first end-face portion and the second end-face portion of the respective first and second cooling devices, one of the end-face portions opposes to an outer circumferential face of the stator along a direction in which the axis-line extends, and the other end-face portion opposes to an inner face portion of the frame along a direction in which the axis-line extends; and between the first end-face portion and the second end-face portion of the respective third and fourth cooling devices, one of the end-face portions opposes to an outer circumferential face of the stator along a direction in which the axis-line extends, and the other end-face portion opposes to an inner face portion of the frame, or to a floor surface side on which the stator is mounted, along a direction in which the axis-line extends.

6. The rotating electric machine as set forth in claim 5, wherein the first through fourth cooling devices are placed interposing interspaces to one another; and both the first end-face portions or both the second end-face portions of the first and third cooling devices oppose to each other interposing the stator therebetween, and both the first end-face portions or both the second end-face portions of the second and fourth cooling devices oppose to each other interposing the stator therebetween.

7. The rotating electric machine as set forth in claim 5, wherein the first through fourth cooling devices are placed interposing interspaces to one another; and both the first end-face portions or both the second end-face portions of the first and second cooling devices oppose to each other interposing the stator therebetween, and both the first end-face portions or both the second end-face portions of the third and fourth cooling devices oppose to each other interposing the stator therebetween.

8. The rotating electric machine as set forth in claim 5, wherein the first and third cooling devices are mutually angled in a circumferential direction of the stator, and interconnected to each other, and the second and fourth cooling devices are mutually angled in a circumferential direction of the stator, and interconnected to each other.

9. The rotating electric machine as set forth in claim 1, wherein the at least one cooling device comprises first and second cooling devices placed on an upper side above an uppermost portion of an outer circumferential face of the stator, and arranged side by side in, being angled with respect to, a direction in which an axis-line of the stator extends; and the first and second cooling devices each include the first end-face portion and the second end-face portion:

between the first end-face portion and the second end-face portion of the respective first and second cooling devices, one of the end-face portions opposes to an outer circumferential face of the stator, and the other end-face portion opposes to an inner face portion of the frame.

10. The rotating electric machine as set forth in claim 9, wherein the first and second cooling devices are interconnected to each other in a direction in which the axis-line extends.

11. The rotating electric machine as set forth in claim 9, wherein the first and second cooling devices are placed being separated to each other in a direction in which the axis-line extends.

12. The rotating electric machine as set forth in claim 1, wherein the at least one cooling device comprises first through fourth cooling devices placed on a lower side below a lowermost portion of an outer circumferential face of the stator, and arranged side by side in, being angled with respect to, a direction in which an axis-line of the stator extends; and the first through fourth cooling devices each include the first end-face portion and the second end-face portion:

between the first end-face portion and the second end-face portion of the respective first through fourth cooling devices, one of the end-face portions opposes to an outer circumferential face of the stator along a direction in which the axis line extends, and the other end-face portion opposes to a floor surface side on which the stator is mounted, along a direction in which the axis line extends.

13. The rotating electric machine as set forth in claim 1, wherein the at least one cooling device comprises first and second cooling devices placed on an upper side above an uppermost portion of an outer circumferential face of the stator, and arranged side by side in, being angled with respect to, a direction in which an axis-line of the stator extends, and third and fourth cooling devices placed on a lower side below a lowermost portion of the outer circumferential face of the stator, and arranged side by side in, being angled with respect to, a direction in which an axis-line of the stator extends; and the first through fourth cooling devices each include the first end-face portion and the second end-face portion:

between the first end-face portion and the second end-face portion of the respective first and second cooling devices, one of the end-face portions opposes to an outer circumferential face of the stator along a direction in which the axis line extends, and the other end-face portion opposes to an inner face portion of the frame along a direction in which the axis line extends; and between the first end-face portion and the second end-face portion of the respective third and fourth cooling devices, one of the end-face portions opposes to an outer circumferential face of the stator along a direction in which the axis line extends, and the other end-face portion opposes to an inner face portion of the frame, or to a floor surface side on which the stator is mounted, along a direction in which the axis line extends.

14. The rotating electric machine as set forth in claim 1, wherein the at least one cooling device comprises a plurality of cooling pipes through which a cooling medium is flowed to cool the cooling fluid, and the plurality of cooling pipes is placed to extend along the first end-face portion and the second end-face portion, connecting therebetween.

15. The rotating electric machine as set forth in claim 1, wherein a rotor's shaft comprises a pair of cooling fans being mounted thereon to oppose to each other in both end portions of the rotor in an axial direction thereof;

the stator comprises a plurality of stator ducts extending in radial directions of the stator, and allowing the gap and the frame's internal flow-path to communicate with each other; and the cooling fluid being transported under pressure by means of each of the cooling fans flows from both end portions in an axial direction of the rotor into the gap, and outflows from the gap into the frame's internal flow-path by way of the plurality of stator ducts.

16. The rotating electric machine as set forth in claim 1, wherein an inner face portion of the frame comprises a shape being curved in a circumferential direction of the stator.

17. The rotating electric machine as set forth in claim 16, wherein the frame comprises an outer face portion of the same shape as the inner face portion.

18. The rotating electric machine as set forth in claim 1, wherein an inner face portion of the frame comprises a pair of planar inner lateral-face portions opposing to each other with the stator interposed therebetween, and extending along a direction in which an axis line of the stator extends, and a planar inner upper-face portion being interconnected at upper ends of the pair of inner lateral-face portions, and horizontally extending.

19. The rotating electric machine as set forth in claim 18, wherein the frame comprises an outer face portion of the same shape as the inner face portion.

* * * * *